(12) United States Patent
Fazal et al.

(10) Patent No.: US 9,740,992 B2
(45) Date of Patent: Aug. 22, 2017

(54) DATA WAREHOUSE SYSTEM

(75) Inventors: Thomas Fazal, Ottawa (CA); David Strutt, Ottawa (CA); Robert Gibb, Ottawa (CA); Michael Armstrong, Nepean (CA); Michael Adendorff, Ottawa (CA); Robert Helal, Orleans (CA)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 12/559,222

(22) Filed: Sep. 14, 2009

(65) Prior Publication Data

US 2010/0070421 A1     Mar. 18, 2010

Related U.S. Application Data

(62) Division of application No. 09/987,905, filed on Nov. 16, 2001, now abandoned.

(60) Provisional application No. 60/262,361, filed on Jan. 19, 2001.

(30) Foreign Application Priority Data

Mar. 1, 2001 (CA) ..................... 2339063
May 31, 2001 (CA) ..................... 2349277

(51) Int. Cl.
*G06Q 10/06* (2012.01)
*G06F 17/30* (2006.01)
*G06Q 10/10* (2012.01)

(52) U.S. Cl.
CPC ....... *G06Q 10/06* (2013.01); *G06F 17/30563* (2013.01); *G06Q 10/063* (2013.01); *G06Q 10/067* (2013.01); *G06Q 10/103* (2013.01)

(58) Field of Classification Search
USPC ........ 705/1.1, 7.11; 707/769, 600, 756, 803, 707/793, 802
See application file for complete search history.

(56) References Cited

U.S. PATENT DOCUMENTS

| | | | |
|---|---|---|---|
| 5,781,911 | A | 7/1998 | Young et al. |
| 6,044,374 | A | 3/2000 | Nesamoney et al. |
| 6,161,103 | A | 12/2000 | Rauer et al. |
| 6,208,990 | B1 | 3/2001 | Suresh et al. |
| 6,212,524 | B1 | 4/2001 | Weissman et al. |

(Continued)

FOREIGN PATENT DOCUMENTS

| | | |
|---|---|---|
| CA | 2363404 | 7/2002 |
| WO | WO 00/42553 | 7/2000 |

OTHER PUBLICATIONS

Chaudhuri, S. And Dayal, Umeshwar "An overview of data warehousing and OLAP technology", ACM SIGMOD Record vol. 26 Issue 1, Mar. 1997 pp. 65-74.*

(Continued)

*Primary Examiner* — Mark A Fleischer
(74) *Attorney, Agent, or Firm* — Shumaker & Sieffert, P.A.

(57) ABSTRACT

A data warehouse system for managing performance of organizations is provided. The data warehouse system comprises a data model for storing data representing dimensions and measures applicable for multiple organizations, and a configuration unit for setting the placeholders such that the data model represents the particular organization. The data model has placeholders settable such that the data model represents a particular organization.

19 Claims, 61 Drawing Sheets

(56) References Cited

U.S. PATENT DOCUMENTS

| | | | |
|---|---|---|---|
| 6,366,922 | B1 | 4/2002 | Althoff |
| 6,377,934 | B1 | 4/2002 | Chen et al. |
| 6,477,536 | B1 | 11/2002 | Pasumansky et al. |
| 6,668,253 | B1 * | 12/2003 | Thompson ............ G06Q 10/06 |
| 6,968,312 | B1 * | 11/2005 | Jordan ............... G06Q 10/0639 |
| | | | 705/7.38 |
| 7,003,504 | B1 * | 2/2006 | Angus ............... G06F 17/30563 |
| 7,003,560 | B1 * | 2/2006 | Mullen .................. G06Q 10/06 |
| | | | 709/223 |
| 2001/0047372 | A1 * | 11/2001 | Gorelik et al. ............... 707/514 |
| 2002/0029207 | A1 * | 3/2002 | Bakalash et al. ................. 707/1 |
| 2002/0099563 | A1 | 7/2002 | Adendorff et al. |
| 2002/0099581 | A1 * | 7/2002 | Chu ....................... G06Q 30/02 |
| | | | 707/600 |
| 2002/0133368 | A1 | 9/2002 | Strutt et al. |

OTHER PUBLICATIONS

Smyth, A. and Hayford, W. by Visible Systems Corporation, "A Visible Solution Paper: Visible Universal Model", downloaded and available on the Internet as of Nov. 4, 2006.*
Kimball, R., "The Data Warehouse Toolkit" Practical Techniques for Building Dimensional Data Warehouses, published by John Wiley & Sons, Inc., 1996.
Kimball, R. et al., "The Data Warehouse, Lifecycle Toolkit", published by John Wiley & Sons, Inc., 1998.
Kimball, R., "The Data Warehouse Toolkit—Practical Techniques for Building Dimensional Data Warehouses", 1996 (John Wiley & Sons, Inc.).
Sen, Arun and Jacob, Varghese S., "Industrial Strength Data Warehousing", Communications of the ACM, Special Issue on Warehousing, Sep. 1998, pp. 29-31.
Bontempo and Zagelow, "The IBM Data Warehouse Architecture", Communications of the ACM, Sep. 1998, vol. 41, No. 9.
Kimball et al., "The Data Warehouse Lifecycle Toolkit", Wiley, 1998, front matter only.
Kimball, Ralph, "The Data Warehouse Toolkit", Wiley, 1996, front matter only.
Silverston et al., "The Data Model Resource Book: A Library of Logical Data Models and Data Warehouse Designs", Wiley 1997, Abstract and Table of Contents.
Ballard et al., "Data Modeling Techniques for Data Warehousing", IBM Redbook, Feb. 1998.
Ong, "The Evolution of a Data Warehouse Architecture—One Size Fits All", Aurora Consulting Pty. Ltd., Nov. 1998.
Gutierrez and Marotta, "An Overview of Data Warehouse Design Approaches and Techniques", Oct. 2000.
Winter, "The Current and Future Role of Data Warehousing in Corporate Application Architecture", Institute of Information Management, Univ. of St. Gallen, Proceedings ICSS, 2001.
Power, D.J., "A Brief History of Decision Support Systems", DSSResources.com, May 2003.
Derbyshire, "An Architecture for a Business Data Warehouse", ICL Systems Journal, May 1996.
Sen et al., "Industrial Strength Data Warehousing", Communications of the ACM, Sep. 1998, vol. 41, No. 9, pp. 29-31.
Cognos/IBM/Microsoft: Business Intelligence, BYTEbeat, week of May 24, 1999, www.monitor.ca/monitor/issues/vol6iss10/bytebeat. html.
"Cognos Launches New e-Business Intelligence Unit", Burlington, Mass., Jan. 31, 2000, www.apps.cognos.com/news/releases/20000/rel_284.html.
Cognos Annual Report for Fiscal Year Ending Feb. 29, 2000 (http://www.sec.gov/Archieves/edgar/data/746782/0000950109000002355/0000950109-00-002355.txt.
"Constructing the Integrated Data Warehouse with Cognos e-Applications" (Cognos Whiter Paper), Sep. 2000.
Cognos e-Applications, general brochure dated Aug. 2000.
"Cognos Launches e-Applications for J.D. Edwards", article data Mar. 22, 2000.
"Cognos Customizes Suite for J.D. Edwards Applications", InformationWeek.com, Mar. 27, 2000.
"Cognos introduces e-Applications for Oracle", press release dated Apr. 26, 2000.
"Cognos e-Applications Give 'Clicks and Mortar' Businesses Integrated View of Business Performance", press release dated Jun. 14, 2000.
"Cognos e-Commerce Analysis Turns Web Sites into Profitable Sales Channels", press release dated Jun. 14, 2000.
Cognos e-Applications—"Cognos Financial Analysis e-Application", financial analysis brochure dated Sep. 21, 2000.
Cognos e-Applications—"Report Administration Guide Sales Analysis for J.D. Edwards", dated Jul. 18, 2000.
Cognos e-Applications—"Installation and Configuration Guide Sales Analysis for J.D. Edwards", dated Jul. 19, 2000.
Cognos e-Applications—"Administrator's Guide Sales Analysis for J.D. Edwards", dated Jul. 20, 2000.
"Selecting Enterprise Business Intelligence for the Supply Chain", article dated Apr. 13, 2000.
"Cognos Performance Applications", slide presentation dated Sep. 2004.
"Cognos Launches New e-Business Intelligence Applications Unit", article dated Jan. 31, 2000.
Cognos BI Applications—"What Will Pave the way to Competitive Advantage Leveraging SAP Deal", slide presentation dated Jun. 13, 1999.
"Cognos Introduces Unparalleled Foundation for End-to-End Business Intelligence", DecisionStream Announcement of Jul. 6, 1999.
Cognos BI Applications—"Installation and Configuration Guide", dated Aug. 26, 1999.
Cognos BI Applications—"Analytical Reports for Financial Analysis", dated Jun. 3, 1999.
"Cognos Introduces First End-to-End Platform for True Enterprise Business Intelligence Solutions", press release dated Sep. 17, 1999.
"Rottenberg to Head New Cognos e-Business Intelligence Applications Unit", article dated Jan. 26, 2000.
Cognos e-Applications—"SeeBusiness", slide presentation dated Mar. 24, 2000.
Cognos e-Applications—"Installation and Configuration Guide Inventory Analysis for SAP/R3", dated Jun. 16, 2000.
Cognos e-Applications—"System Guide Financial Analysis for SAP/R3", dated Jul. 7, 2000.
Cognos e-Applications—"Report Administration Guide Sales Analysis for SAP/R3", dated Jun. 30, 2000.
Cognos e-Applications—"Installation and Configuration Guide Sales Analysis for SAP/R3", dated May 31, 2000.
Cognos e-Applications—"System Guide Sales Analysis for SAP/R3", dated Apr. 25, 2000.
Cognos e-Applications—"Administrator's Guide Inventory Analysis for SAP/R3", dated Jun. 20, 2000.
Cognos e-Applications—"Installation and Configuration Guide Inventory Analysis for SAP/R3", dated May 31, 2000.
Cognos e-Applications—"Report Administration Guide Inventory Analysis for SAP/R3", dated Jun. 21, 2000.
Cognos e-Applications—"Installation and Configuration Guide Financial Analysis for SAP/R3" dated 2000.
U.S. Appl. No. 12/000,203 entitled "Data Warehouse Model and Methodology", filed Dec. 10, 2007 by Fazal et al.
Information Engineering Services, "White Papers and Articles," Methodology and Technology Services, retrieved from http://www.ies.aust.com/articles.htm on Mar. 21, 2017, 14 pp.
Smyth et al., "Visible Universal Model," Methodology and Technology Services, Oct. 1997, 5 pp.
Smyth et al., "The Universal Model: a Paradigm Shift to Accelerate Analysis," Methodology and Technology Services, Apr. 1996, 4 pp.
Chaudhrui S. et al., "An overview of data warehousing and OLAP technology," Sigmond Record, vol. 26, No. 1, Mar. 1, 1997, 10 pp.

* cited by examiner

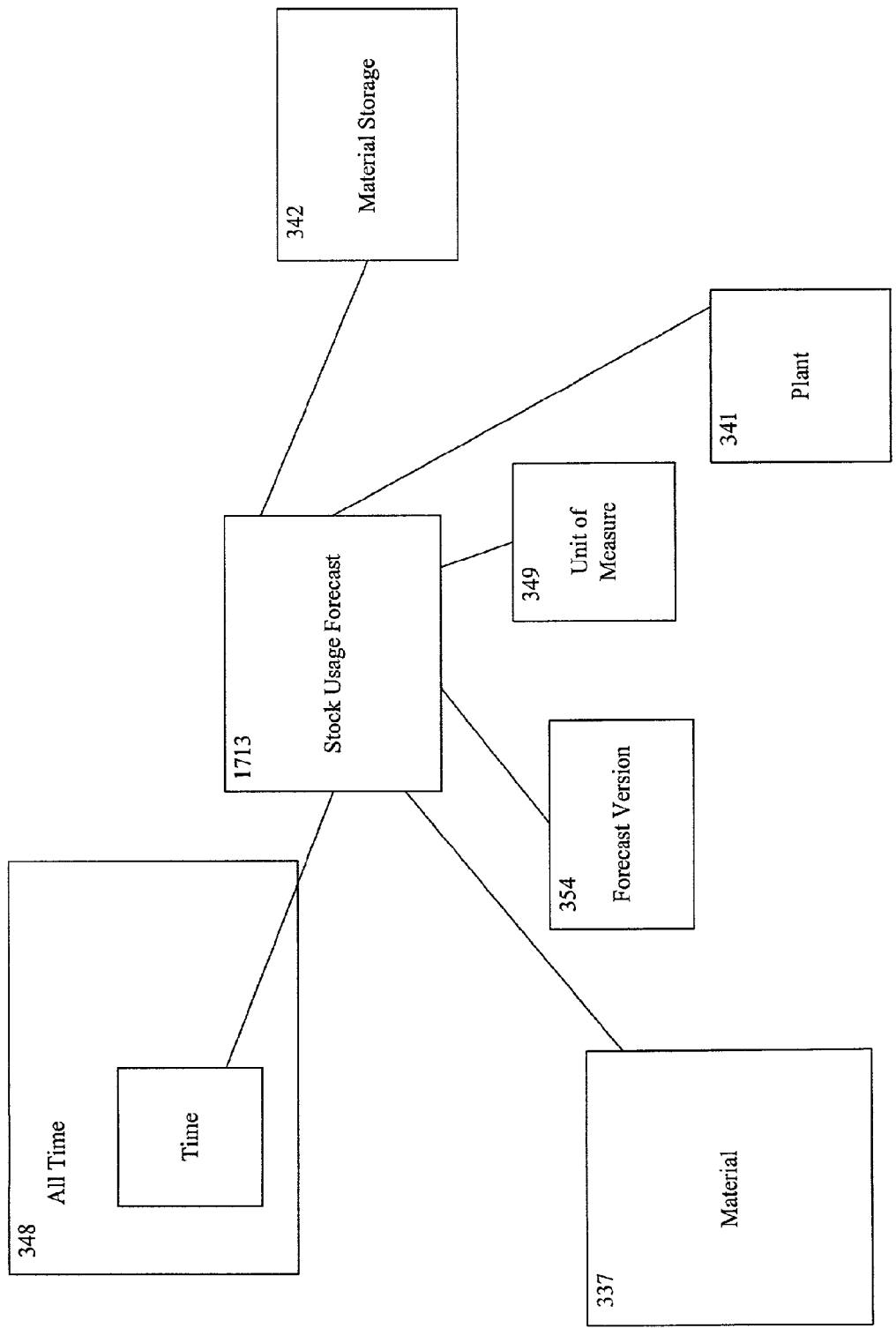

DATA WAREHOUSE SYSTEM

This application is a divisional of and claims priority to U.S. patent application Ser. No. 09/987,905, filed Nov. 16, 2001. This application also claims the benefit of U.S. Provisional Application Ser. No. 60/262,361, filed Jan. 19, 2001, Canadian Application Serial No. 2,339,063, filed Mar. 1, 2001 and Canadian Application Serial No. 2,349,277, filed May 31, 2001, the entire content of all four applications are incorporated herein by reference.

TECHNICAL FIELD

This invention relates generally to business intelligence systems and in particular to an integrated data warehouse system.

BACKGROUND

Many large organizations use enterprise resource planning (ERP) systems to consolidate day-to-day transaction data and streamline business functions such as manufacturing. With their predefined, standard reporting capabilities, however, these ERP systems are not optimized to support the flexible, ad hoc business analysis and reporting businesses need to make strategic decisions and improve business performance. Furthermore, ERP systems are not intended to serve as e-business analysis and reporting infrastructures.

For example, generating a report from an ERP system that shows product line sales by region by sales person for the past five years would typically be quite time-consuming. With their multitude of tables, fields, and column names, ERP systems are not well suited to end-user navigation. Without easy information access, and the means to quickly analyze and report on findings, users can overlook important business correlations or veer off-track completely. Ultimately, the quality and speed of decision-making suffer.

In addition, if hundreds or thousands of users were to submit queries directly, ERP system performance would be impacted, jeopardizing important production system functions. This, along with the risks associated with giving the extended e-business enterprise direct access to ERP systems, necessitates placing ERP data into an environment that is not only optimized for business analysis and reporting, but also for secure broad access. Seeking predictable performance and desiring to give users all the information they need quickly, many companies opt to build either data warehouses or data marts.

Companies which have strived to develop decision support systems that would support rich analysis and reporting realized that operational reporting systems (e.g., ERP systems) were limited in scope and the depth of insight they delivered. While optimized for consolidating day-to-day transaction data and streamlining key business functions, these systems offer but a fraction of the reporting and analysis capabilities users need to fully comprehend what drives business performance.

Many companies turned to developing data warehouses to fill the requirement for consolidating data from across the organization, with a single consistent historical view, and designed for optimized reporting and analysis. The ultimate objective of these systems was to ensure that the data needed to answer the relevant business questions was captured and in a form that would support timely information for decision-making While the intent was sound, the challenges of bringing together business and IT to define best practices from both a business and technical standpoint presented challenges. As a result projects failed resulting in decision makers being left without crucial information.

Created by extracting data from operational or transactional systems (like ERP sources) and e-commerce systems and installing it in a more analysis- and reporting-friendly database, data warehouses are repositories of data that support management decision-making. However, data warehouses are expensive to build and time consuming. (For example, they can take 18 to 24 months to create). Consequently, with enterprise information requirements evolving so fast today, data warehouses often fail to meet requirements when they are finally completed. Moreover, they require specialized skills and experience to build successfully.

Furthermore, due to their sheer scope, data warehouses seldom produce the finely tuned analysis and reporting that e-business decision-making depends upon. Intended to be all things to all people, these warehouses focus on breadth of content, rather than the depth of vital information sweet spots users need.

Unlike data warehouses that combine and make all corporate data available across an enterprise, data marts focus more narrowly, serving specific business areas or departments. Data marts also take less time and money to build and can therefore generate quicker payback than data warehouses.

Sound in principle, data mart creation can stumble in practice. While data marts can be built incrementally, they do not provide a holistic view of the enterprise. Companies will build a data mart for sales, another for inventory, another for finance, and so on. Unless these marts are coordinated, they act as stovepipes and prevent users from sharing information across the enterprise. They also duplicate data and lead to lengthy updates because each mart must be refreshed individually. If companies update the marts at different times, even just a couple of hours apart, some users will have more current information than others. This lack of synchronization can lead to inconsistent analysis across the enterprise and cause users to question the integrity of the analysis and reporting solution.

For instance, users of one mart might define a "large" customer as one that generates more than $50,000 in revenue a month. Users of another might define a large customer as one that orders more than 100 units a month, which may only represent $10,000. In these cases, people can mistakenly think that they are discussing common ground. Not only may different marts define dimensions differently, they can calculate measures differently as well. For example, one department might compute "profit" by including bad debts and another may exclude them. These types of inconsistencies not only create misunderstandings, they can delay schedules and increase costs, jeopardizing customer satisfaction and profits.

There is a need for affordable data warehouse technology, which an enterprise can use to achieve and maintain a complete view of its operational and financial effectiveness, customer relationships, and supply-side activities.

SUMMARY

The invention solves one or more of the above mentioned problems. In one embodiment of the invention, a configurable, integrated data warehouse system is provided. This integrated data warehouse system is rich and complete enough to be used by many organizations. The integrated data warehouse is also configurable to a particular organization. The initial steps of creating a data warehouse are manifested in this system. The configuration of the integrated data warehouse takes substantially less time to do than creating a data warehouse from scratch. Thus, time and expenses are saved with this invention.

The integrated data warehouse in another embodiment of this invention allows for an incremental building of the data warehouse. The system begins with a dimensional framework which represents an organization. Areas of analysis can then be added to the dimensional framework such that each area of analysis may be compatible for cross-functional analysis. Thus, the incrementally created data warehouse allows for an integrated analysis of an organization's information.

In accordance with an aspect of the invention, a data warehouse system for managing performance of organizations is provided. The data warehouse system comprises a data model for storing data representing dimensions and measures applicable for multiple organizations, and a configuration unit for setting the placeholders such that the data model represents the particular organization. The data model has placeholders settable such that the data model represents a particular organization.

In accordance with another aspect of the invention, there is provided a method for configuring a data warehouse system. The method comprises steps of obtaining a data warehouse system comprising a data model for storing data representing dimensions and measures applicable for multiple organizations and a configuration unit for setting the placeholders such that the data model represents the particular organization, and using the configuration unit to set one or more data model placeholders in the data model of the data warehouse system. The data model has placeholders settable such that the data model represents a particular organization.

In accordance with another aspect of the invention, there is provided an operational framework for managing a data warehouse system. The operational framework comprises a console and a configuration unit. The console is used for configuring a data model in the data warehouse system to a particular organization and for configuring an extraction transformation loading tool to a particular data source system. The configuration unit includes placeholders settable to specify the particular data source system.

In accordance with another aspect of the invention, there is provided a connector for extracting source data from multiple data source systems and transforming the data for loading into placeholders in a data model. The connector comprises a configuration ETL code unit for extracting values from a data source system to set the placeholders in the data model and the operational framework, and a parameterized ETL code unit for using the values to extract information from the data source system, transform the data and load the data into the data model.

In accordance with another aspect of the invention, there is provided a dimensional framework for use as a foundation of a data warehouse system. The dimensional framework comprises a set of dimensions representing business reference aspects of multiple organizations. A subset of the set of dimensions represents the business reference aspects of a particular organization. The dimensions have placeholders settable set such that the dimensional framework represents the particular organization.

In accordance with another aspect of the invention, there is provided a method of providing a data warehouse for managing performance of organizations. The method comprises steps of providing placeholders in a data model and providing a configuration unit for setting the placeholders such that the data model represents the particular organization. The data model is used for storing data representing dimensions and measures applicable for multiple organizations. The placeholders are settable such that the data model represents a particular organization.

In accordance with another aspect of the invention, there is provided a method of providing a dimensional framework for use as a foundation of a data warehouse system. The method comprises steps of providing placeholders in a set of dimensions and providing a configuration unit for setting the placeholders such that the dimensional framework represents the particular organization. The dimensions represent business reference aspects of multiple organizations. A subset of the set of dimensions represents the business reference aspects of a particular organization.

BRIEF DESCRIPTION OF THE DRAWINGS

Embodiments of the invention will now be described with reference to the accompanying drawings, in which.

DETAILED DESCRIPTION

In this description, the term business will be used to denote both commercial affairs and organizational affairs. The term data warehouse system will be used to denote a system implemented for the measurement and management of the performance of an organization. The organization may be commercial or non-commercial. A data warehouse system will include a data warehouse that is rich and complete enough to be applicable to many organizations and configurable to a specific organization. Finally, the term data warehouse system also relates to a business performance management system, including a business model and a query engine tool. The term business model in a data warehouse system relate to a business performance management model in a business performance management system. The term business performance management refers to the measurement and management of the performance of an organization.

Figure 1:
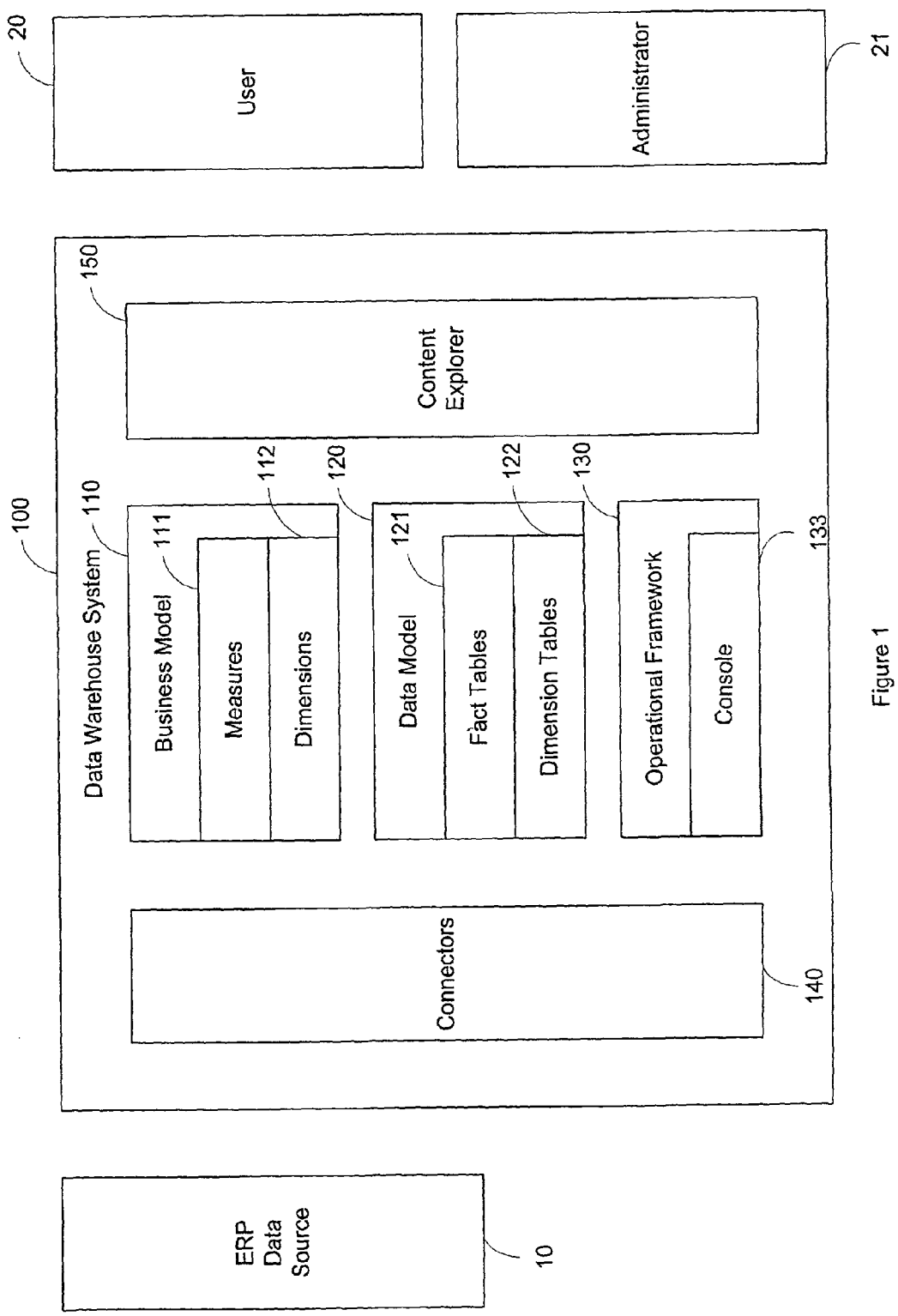
FIG. 1 is a diagram showing a component overview of a data warehouse system.

Referring to FIG. 1, a configurable data warehouse is described. FIG. 1 shows a data warehouse environment including an enterprise resource planner (ERP) data source 10, a user 20, an administrator 21, and a configurable data warehouse system 100. The user 20 refers to the role of accessing the data warehouse system. The administrator 21 refers to the role of administering the data warehouse system. These roles may be performed by the same person.

The configurable data warehouse system 100 includes a business model 110, a data model 120, an operational framework 130, connectors 140 and a content explorer 150. The business model 110 includes measures 111 and dimensions 112. The data model 120 includes fact tables 121 and dimension tables 122. The operational framework 130 includes a console 133.

The configurable data warehouse system 100 is a system for measuring the performance of an organization. The data warehouse system 100 may be applicable to various organizations and is not limited to only one organization. The data warehouse system 100 is configurable to a specific organization. Preferably, the configuration occurs after the installation of the system software and before the operation of the system software. Re-configuration may occur at any time thereafter.

The business model 110 includes the set of analytics and paths used to measure the performance of an organization. The business model 110 contains measures 111 which map the business questions to which users 20 of a data warehouse may want answers. The measures 111 represent measurements of business activity aspects of an organization. For example, a business activity may be a sales order. A measure 111 for a sales order may be sales order volume. Another example of a measure 111 is inventory amounts. In this example, inventory is the business activity measured.

Numerous business questions for numerous businesses are categorized into different areas of analysis. The set of measures 111 in the business model 110 represents a union of measures used to perform analysis for different organizations. Preferably, this union of measures comprises the minimum set of measures 111 needed to perform the desired analysis for all of the different organizations to which the business model 110 applies. I.e., although not all organizations may require each measure 111 available in the business model 110, the measures 111 they do require will be available. The business model 110 also includes a set of dimensions 112 which represent the structure of an organization from an informational or dimensional viewpoint. I.e., the dimensions represent the business reference aspects of an organization. An example of a dimension is the class of customers of an organization. Further examples of dimensions and measures are provided below.

The business model 110 is implemented in the data model 120. The data model 120 is organized to facilitate the analysis performed at the business model 110 level. The data model 120 contains fact tables which contain the measures used to measure the performance of an organization. The data model 120 also includes a set of dimension tables 122 which represents the structure of an organization from a dimensional viewpoint. Another example of a dimension is the class of employees of an organization.

Raw data information is collected from the organization ERP 10 and passed into the data model 120 through the connectors 140. One way to build the connectors 140 is through an extraction, transformation and loading (ETL) tool. The data warehouse system 100 is operated by an administrator 21 through the console 133 of the operational framework 130. The operational framework 130 is also used to configure the data warehouse system 100. Finally, the content explorer 150 contains a set of reports used by the user 20 to review the analysis performed by the data warehouse system 100.

As has been stated above, the data warehouse system 100 is designed to work for many different types of organizations and is configurable to a specific organization. Preferably, the configuration of the data warehouse system 100 occurs after the installation of the system software and before the operation of the system software. Configurability of the data warehouse system 100 is achieved by providing placeholders or parameters in various components of the system such that these placeholders or parameters are set during the configuration of the system software.

Figure 2:
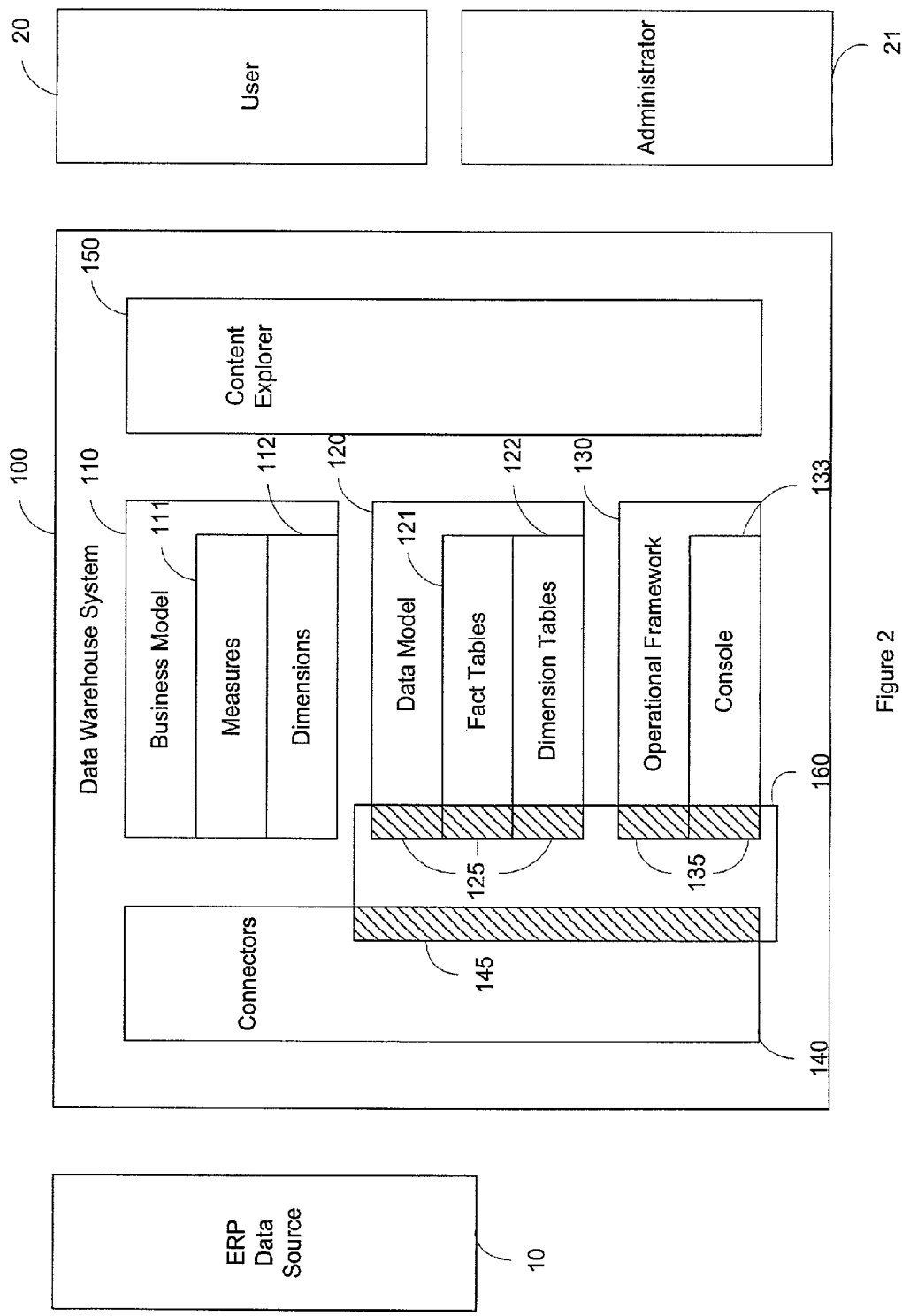
FIG. 2 is a diagram showing the configurable aspects of a data warehouse system.

Referring to FIG. 2, the configuration 160 of the data warehouse system 100 is described. There are configurable aspects to the data model 120, the operational framework 130, and the connectors 140. These configurable aspects are labeled on FIG. 2 as 125, 135 and 145, respectively.

Figure 3:
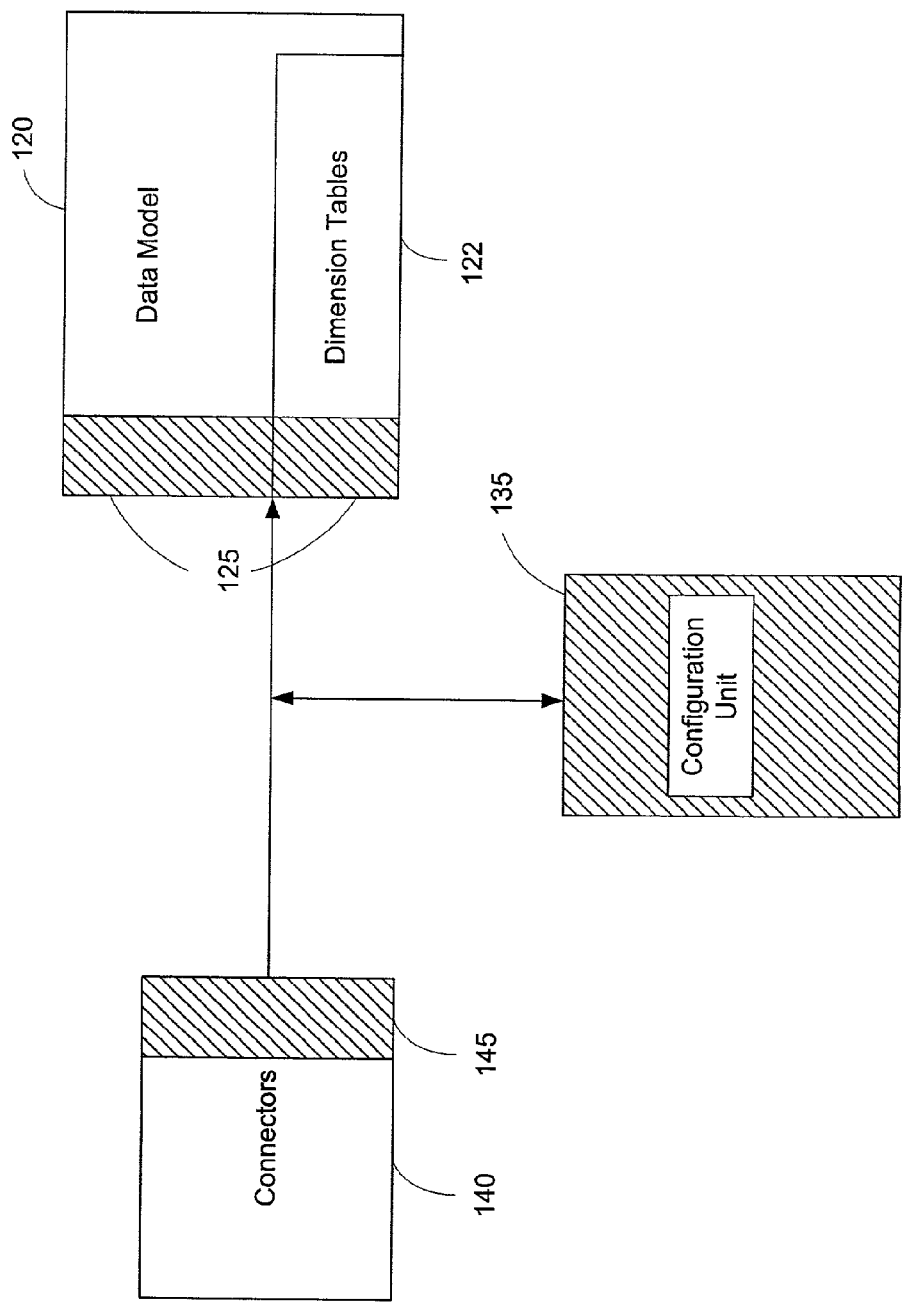
FIG. 3 is a diagram showing a component view of the configuration environment of a data warehouse system.

In FIG. 3, the configuration 160 is enlarged. The configuration 160 occurs when the operational framework configurable aspects 135 interact with placeholders located in the data model configurable aspects 125 and the connectors configurable aspects 145. These placeholders are set with data from an organization ERP 10, preferably during the data warehouse system 100 configuration.

The connectors 140 contain ETL code, each connector having a set of codes which perform a certain function. The ETL code functions involve the extraction of data from the ERP 10 and the loading of the data into the data model 120. The connectors may be configurable to allow the data warehouse system 100 to operate with different operational system, resource system, etc. The console 133 may provide the administrator 21 with a set of questions or queries. The answer to these queries will define the configuration options in the ETL 145. The console 133 may also prompt an administrator 21 to specify values for the placeholders in the data model 120.

Figure 4:
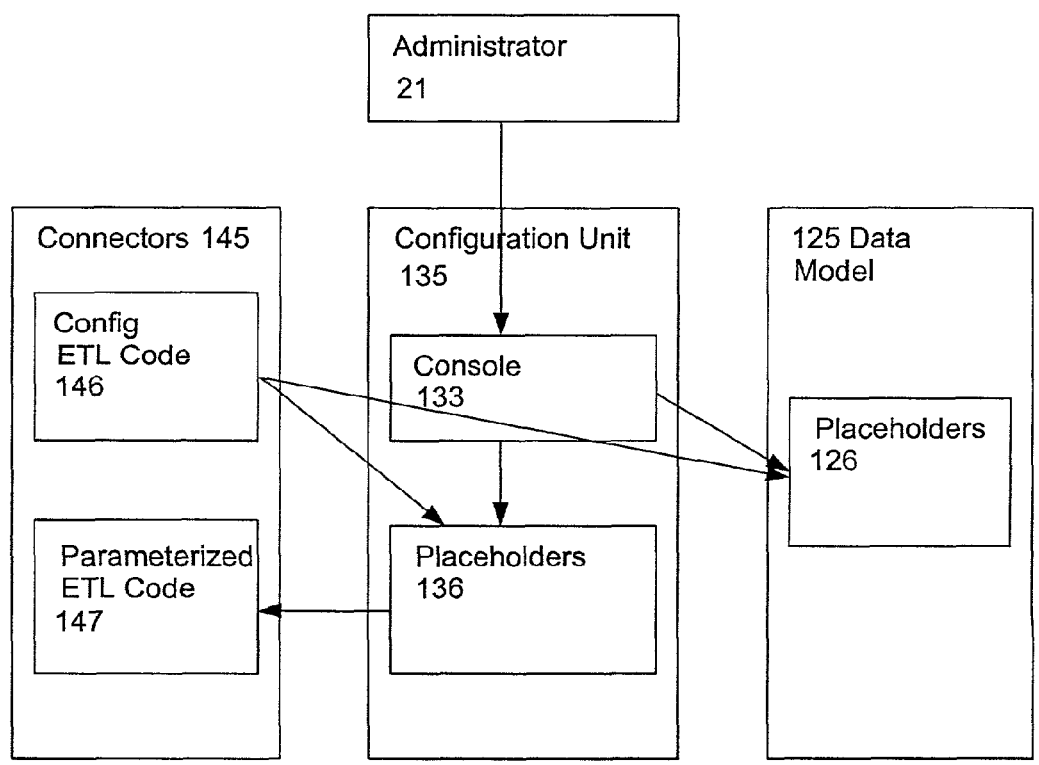
FIG. 4 is a diagram showing a configuration view of a data warehouse system.

Referring to FIG. 4, a configuration view 160 of an integrated data warehouse system 100 is shown in more detail. FIG. 4 shows the configurable aspects of the data model 125, the configurable aspect of the operational framework referred to as the configuration unit 135, and the configurable aspects of the connectors 145. The configurable aspects of the data model 125 include data model placeholders 126. These placeholders 126 represent information that is completed in the data model 120 during configuration. The configuration unit 135 includes the configurable portion of the console 133 and operational framework placeholders 136. These placeholders 136 are stored in a set of operational tables in the operational framework 130. The configurable aspects of the connectors 145 include configuration ETL code 146 and parameterized ETL code 147. The configuration ETL 146 code may be used to extract values from the ERP 10 to set the placeholders. The parameterized ETL 147 code may then use the values of these placeholders 136 to extract information for the data warehouse system that reflects the configuration for the specific organization.

Figure 5:
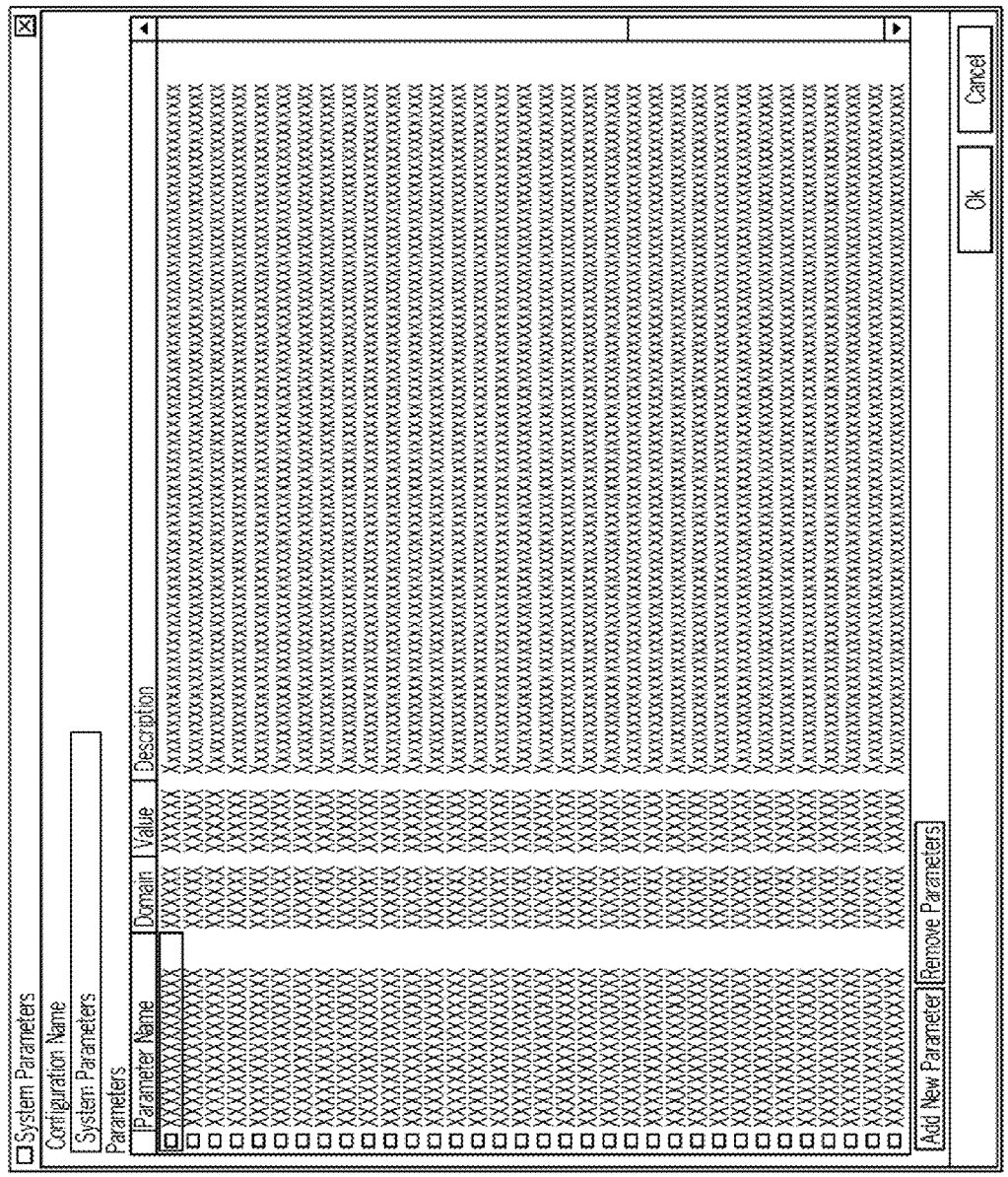
FIG. 5 is a screen shot of an example of a set of configuration placeholders of a data warehouse system.

The configuration process involves setting the placeholders 126 and 136. There are two main methods to set the placeholders. One method involves providing the administrator 21 with options during the configuration. The administrator 21 may specify values to options listed in the console 133 that represent the characteristics of the organization that will have its performance measured by the data warehouse system 100. FIG. 5 shows a screen shot of an example of a set of a set of configuration placeholders of a data warehouse system 100. A second method involves obtaining the information used to set the placeholders directly from the organization ERP 10. To achieve this, the configuration unit 135 creates a job that extracts the desired information from the organization ERP 10 and loads it into the appropriate placeholder 126 or 136. Once the place holders are set, the data warehouse system 100 may operate.

Figure 6:
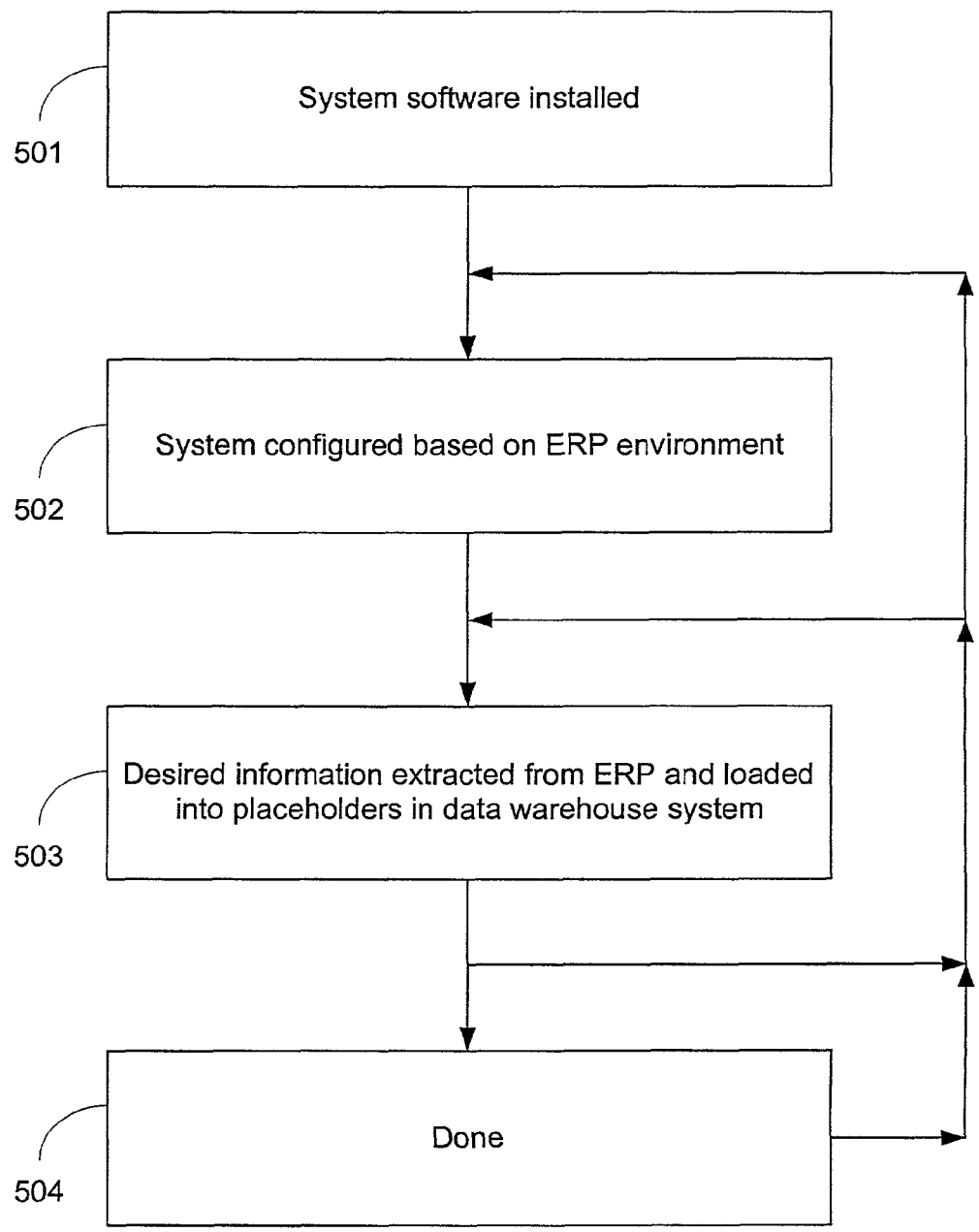
FIG. 6 is a flow diagram showing the steps to configure a data warehouse system.

Referring to FIG. 6, a flowchart for configuring a configurable data warehouse system 100 is shown. The first step (501) involves installing the data warehouse system 100 software. Once the system software is installed, the administrator 21 may configure the system based on the ERP 10 environment (502). Once the administrative selections are made, the connectors 140 may access the ERP 10 and extract the desired information from the ERP 10. This information is loaded into placeholders in the data warehouse system 100 (503). Once the information is loaded, the data warehouse system 100 is ready to be used (504).

The configuration process 500 may be iterative. The administrator 21 may initially choose to do steps 501 through 504 in sequence. However, at each step in the process new values for the placeholders may be set. Thus, re-configuration of the data warehouse system may be performed by the administrator 21.

Figure 7:
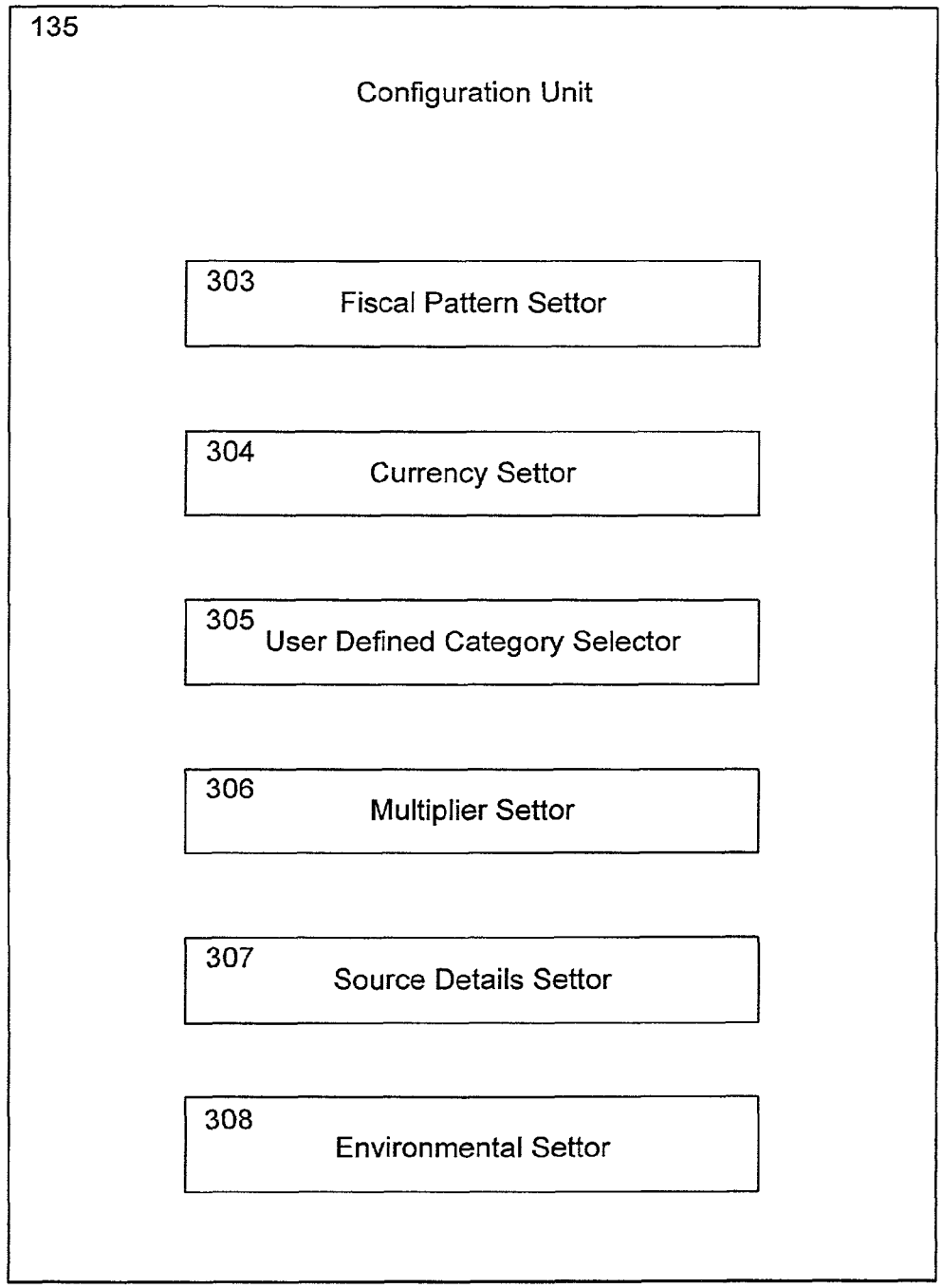
FIG. 7 is a component view of a configuration unit of a data warehouse system.

Referring to FIG. 7, a component view of an embodiment of a configuration unit 135 is shown. FIG. 7 represents an example of the information which may be set with the configuration unit 135. The configuration unit 135 includes a fiscal pattern settor 303, a currency settor 304, a user defined category selector 305, a multiplier settor 306, a source details selector 307, and an environmental settor 308.

The configuration unit 135 may provide means to configure the fiscal patterns to use in the data warehouse system 100. The fiscal pattern settor 303 may be used to set one or more fiscal patterns that reflect one or more fiscal calendars in use for an organization. Fiscal patterns reflect the fiscal reporting requirements of the organization. A fiscal pattern includes the number of periods, the first period in the fiscal year and the start date of each period. They are determined for an organization by accounting practices.

A placeholder 136 in the configuration unit 135 may be set to represent the identifiers of the fiscal patterns in the ERP data source 10. The administrator 21 may set these placeholders. A configuration ETL 146 job uses the information stored in the placeholders 136 to extract this information from the ERP data source system 10 and load the information into the fiscal variant placeholders 126 in the date dimension of data model 125.

Another aspect of the configuration unit is the currency settor. Many organizations have transactions in many currencies. For analysis purposes, it is desirable for all amounts to be in the same currency. To support cross-functional analysis, the currency settor 304 may be used to set a currency to use for amounts subject to analysis. This configuration allows a user to specify a currency to be used for analysis. Amounts not in this currency may be converted into this currency. Thus, one aspect of the business model 110 is the notion of a common currency. This is represented in the data model 120 by amounts that have been converted to the proper currency. Within the operational framework 130 and the configuration unit 135, common currency is represented by a currency to which fiscal amounts are converted in order to analyse the information in the data warehouse system 100. Common currency is also represented by a financial currency conversion table that determines the rate used to convert a transaction in one currency to the common currency.

The configuration unit 135 may provide a means to set the currencies to use in the data warehouse, the currency to use for reporting, and the conversion rates to use to convert to the reporting currency. A placeholder 136 in the configuration unit 135 is set to represent the currency to use for reporting. Additional placeholders 136 may be specified to represent the currencies to expect in the ERP data source 10. The administrator 21 may set these placeholders.

A configuration ETL code 146 job may use the information stored in the placeholder 136 to extract the required currency conversion rates for the currencies, and to load this information into the placeholders of the currency conversion table 126, which is part of the data model 125. The connectors 140 load information into the data warehouse by means of the parameterized ETL code 147. The parameterized ETL code 147 may use information of the reporting currency in the configuration unit placeholders 136 and the conversion rates in the configured data model 126 to convert the fiscal amount to the appropriate currency.

Another aspect of the configuration unit 135 is the user category settor 305. Many organizations attach organization specific classifiers to dimensions 112. For example, for one organization, the color of hair of a customer may be important. The configuration of user 20 specific categories allows such organization specific classifiers to be part of the dimensional framework. Such organization specific classifiers may be considered as placeholders in the ERP 10. When analyzing a dimension 112, it is desirable to use the same types of aspects across all of the different analysis that will be performed.

The user category settor 305 may be used to select one or more user defined categories in each dimension for analysis of an organization. The configuration unit 135 may provide a means to set the user categories that are to be used to analyse information in the data warehouse. Placeholders 136 in the configuration unit 135 are set to reflect the user categories from the ERP 10 that are of interest to the organization for the purposes of business performance management and the placeholder 126 in the data model 125 where the user category is to be placed. The parameterized ETL code 147 of the connector 140 uses the placeholders 136 to determine which user category to select from the source ERP and where to store the information in the data model 125 using the placeholders 126.

Another aspect of the configuration unit is the multiplier settor. The multiplier settor 306 may be used to set multipliers for use during transaction aggregation and rollups. Organizations may attach meaning to specific quantities. For instance, a transaction may be a credit or a debit. The configuration of multipliers allows an organization to attach different meanings to values in business transactions which are organization specific.

The configuration unit may provide a means to set multipliers that are used to aggregate and attach meaning to the amounts which are loaded into the data warehouse system 100. One aspect of the configurable data model 125 is the placeholders 126 which are used to specify the multipliers to use for business performance management by the organization. The values attached to these placeholders are unique to an organization. The configuration unit 135 may use a configuration ETL code 146 job to set the values of the placeholders 126 representing multipliers in the data model, based on default information in the ERP data source 10. The administrator 21 through the console 133 component of the configuration unit 135 may then review and change the values (i.e., override the default values) of these placeholders in the data model 126 to reflect the organization's needs for business performance management.

Another aspect of the configuration unit 135 is the source details settor 307. In an organization each ERP data source 10 is configured to meet the operational needs of the organization. There may be more than one location in the ERP 10 to store information. For example the ERP 10 may represent the relationships between business entities such as customers in a separate relationships table or by direct reference from one customer to another customer. Similarly the ERP system 10 may store all information related to several business entities in a single source table, and user defined (configurable) codes are used to specify which objects represent which types of business entities. For example all business entities associated with an address may be stored in a single table with codes representing which addresses represent customers and which represent vendors. As another example all sales activity may be stored in a single table, but different types of sales activities (order, direct shipments, etc.) may be identified through specific codes.

When the connectors 140 load information from the ERP data source 10 into the data warehouse system 100 they should know what information to extract for the purposes of business performance management. The configuration unit 135 may provide a means to specify this information. Placeholders 136 in the configuration unit 135 are used to specify the ERP 10 specific values that are to be used to extract the appropriate information from the ERP 10. The administrator 21, through the console 133 may set the values of these placeholders 136 to represent the ERP data source 10 for the specific organization. When the data warehouse system 100 is loaded from the ERP data source 10, the parameterized ETL code 147 of the connectors 140 uses the placeholders 136 in the configuration unit 135 to extract the appropriate information.

There are other configuration 160 options that have not been mentioned. These configuration options involve ERP 10 specific issues such as: What is the date format? These options may also include physical implementation details such as the name of the library where these tables exist, etc. This class of configuration options is referred to as the environmental configuration options. The environmental configuration settor 308 allows for the configuration of such options. The environmental configuration settor 308 may also be used to handle the hardware configuration, the operating system configuration, and the database configuration, i.e., how dates are stored for obtaining the date.

The configuration unit may provide a means to set various environmental placeholders. Placeholders 136 in the configuration unit 135 are used to represent the values of the environmental setting. The administrator 21 sets the placeholders 136 in the configuration unit 135 using the console 133. The parameterized ETL code 147 may then use this information to reflect the environment in which the data warehouse system 100 is operating.

Figure 8:
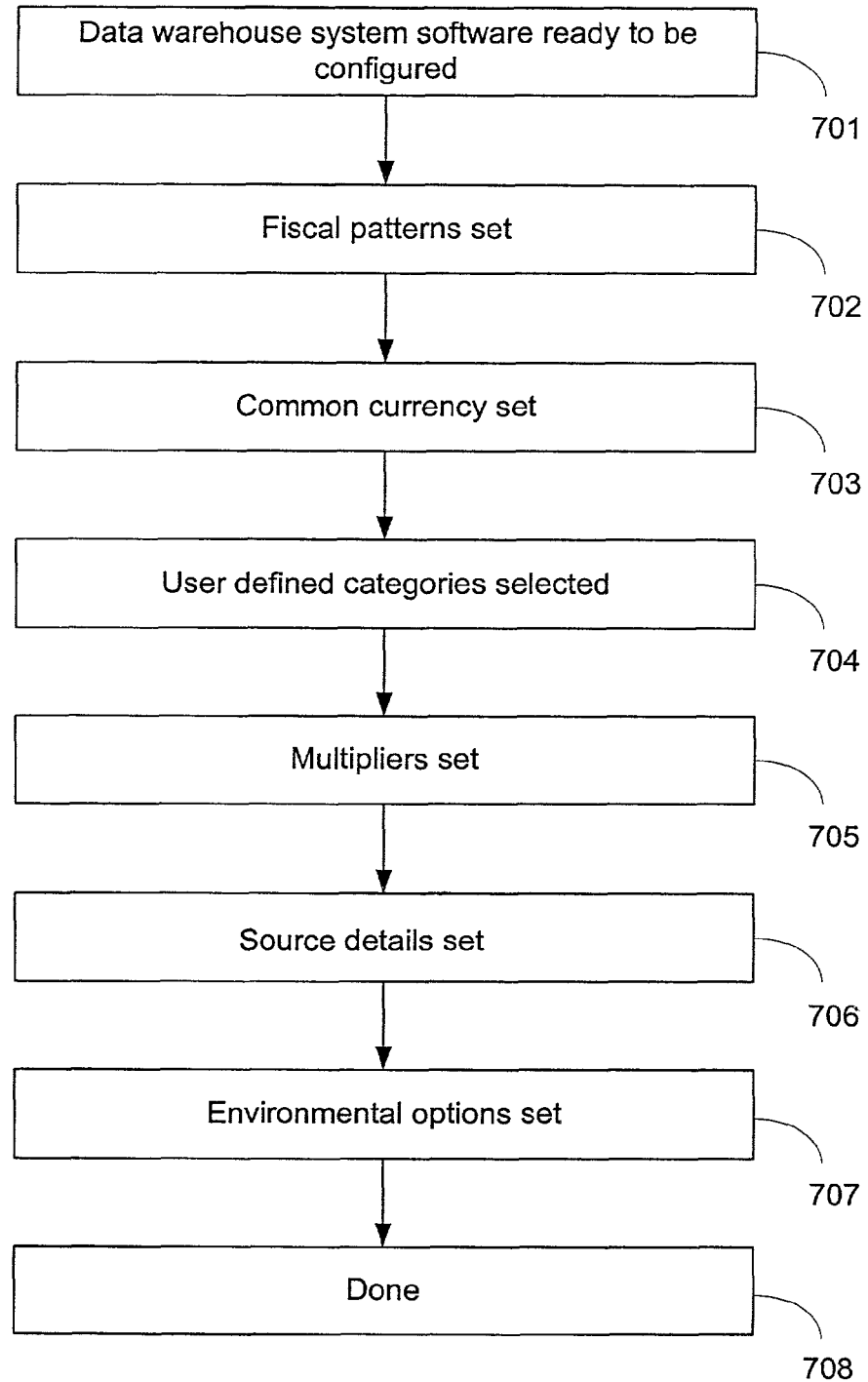
FIG. 8 is a flow diagram showing steps to configure a data warehouse system.

Referring to FIG. 8, a flowchart for configuring a data warehouse system 100 is shown. Once the data warehouse system 100 software is ready to be configured (701), one or more fiscal patterns that reflects one or more fiscal calendars used by the specific organization may be set (702). A currency to use for all amounts in the dimensional framework may be set to support cross-functional analysis (703). One or more user defined categories in each dimension 112 may be selected for analysis (704). Multipliers may be set for use during transaction aggregation and rollups (705). Source details may be set to identify what information to extract from which ERP 10 (706). Environmental configuration options may be set (707). These steps may be performed in alternative order. Furthermore, steps may be re-performed by the administrator 21. Once these steps are completed, the data warehouse system 100 is ready to be used (708).

Dimensional Framework

Another aspect of an example of an embodiment of the invention relates to the fact that the data warehouse system 100 analyses and measures a complete organization environment. I.e., the data warehouse contains the dimensions, tables, entities, etc., to reflect any one of an identified group of organizations. This analysis and measurement is performed through the concept of a dimensional framework.

The dimensional framework manifests itself in the dimensions 112, in the dimension tables 122. The dimensions 112 of the business model 110 are a set of business entities, components or dimensions, such as customers, suppliers, vendors, material, employees, time, organization, etc. These types of business entities or dimensions are commonly used to analyze a business or organization in a data warehouse. However, in the configurable data warehouse system 100, the set of dimensions may be applicable to many different organizations; rather than custom-built for one particular organization.

The dimension tables 122 of the data model 120 are connected to fact tables 121, preferably, in a star schema format. This allows the same dimension table 122 to be used to represent the same dimension 112 in any fact table 121 which uses that dimension 112.

The operational framework 130 allows for the handling of hierarchies in the dimensional framework. The dimensional framework has common ways of handling hierarchies. I.e., customers contained within higher customer groups, or materials contained within higher material groups. The handling of hierarchies allows for consistency for analysis in the dimensional framework. From a configuration point of view, the dimensional framework may include certain details or aspects of specific placeholders in the dimension tables that are in the data model 120.

In one example of an embodiment of the present invention, the set of dimensions 112 includes 39 dimensions: company consolidation 320, profit center 321, cost center 322, business area 323, GL budget version 324, chart of accounts 325, accounting document class 326, sales document class 327, movement document 328, material movement class 329, quotation activity document 331, purchase order activity document 332, requisition activity document 333, contract activity document 334, procurement document class 335, vendor 336, material 337, customer 338, employee 339, organization 340, plant 341, material storage 342, storage bin 343, shipping point 344, AR activity document 345, GL activity document 346, AP activity document 347, all time (time, fiscal) 348, unit of measure 349, financial currency conversion 350, unit of measure conversion 351, user category 352, flexi-dimension 353, forecast version 354, sales status 355, procurement status 356, release strategy 357, valuation 358, batch 359, and stock class 360. Dimensions 112 may be added or removed from this set of dimensions 112.

This set of dimensions 112 may be applicable as part of a dimensional framework to many organizations. These dimensions 112 may also be configured to a specific organization through the use of a configuration unit 135. As described above, the configuration unit 135 may include a fiscal pattern settor 303, a currency settor 304, a user category settor 305, a multiplier settor 306, a source details settor 307, and an environmental settor 308.

The dimensional framework may contain one or more dimensions contain one or more placeholders settable to reflect a fiscal pattern of the particular organization. The dimensional framework may contain one or more dimensions contain one or more placeholders settable to reflect a common currency used by the data warehouse system. The dimensional framework may contain one or more dimensions contain one or more placeholders settable to reflect one or more categories defined by a user, the categories used to analyze information in the data warehouse system. The dimensional framework may contain one or more dimensions contain one or more placeholders settable to reflect one or more multipliers used by the data warehouse system.

Providing a dimensional framework for use as a foundation of a data warehouse system may include one or more of the following steps:

providing placeholders in a set of dimensions, the dimensions representing business reference aspects of multiple organizations, a subset of the set of dimensions representing a particular organization;

providing a configuration unit for setting the placeholders such that the dimensional framework represents the particular organization;

providing placeholders comprises the step of providing one or more placeholders in the dimensional framework to reflect a fiscal pattern of the particular organization;

providing placeholders comprises the step of providing one or more placeholders in the dimensional framework to reflect a common currency used by the data warehouse system;

providing placeholders comprises the step of providing one or more placeholders in the dimensional framework to reflect a category defined by a user, the category used to analyze information in the data warehouse system; and providing placeholders comprises the step of aggregating amounts loaded into the dimensional framework.

Components of the Data Warehouse System

Components of the configurable data warehouse system 100 will now be described in further detail. Built upon an operational framework 130 and a robust production environment, the data warehouse system 100 helps decision-makers derive business value from their enterprise data. By using the data warehouse system 100, organizations receive a wide, cross-functional view of their ERP 10 and e-business data, which provides a strategic perspective on key performance indicators (KPIs). And they reduce implementation costs and effort, which accelerates time to results.

An aspect of the data warehouse system 100 also relates to the challenges that organizations face when implementing data warehouses and traditional "stove pipe" data marts. A solution is provided, i.e., the integrated data warehouse, which comprises a series of coordinated data marts. These coordinated data marts allow organizations to deliver value-laden enterprise-wide data warehouse solutions that are important to competitive advantage in the e-business economy.

One advantage of the data warehouse system 100 lies in the quality of its business content. It is the business content that gives end users the ability to answer complicated questions involving numerous business dimensions 112 and quickly gain the insight required to make strategic decisions. The basis of this content combines business intelligence expertise established by broad studies and best practices proven by experience, including strategies which have helped many of the world's leading companies generate maximum decision-making value from their data. This business content is reflected in the business model 110, as described below.

The Business Model 110

By using the data warehouse system 100 according to the embodiment of the present invention, users may answer in-depth questions such as: "Which customers in the western sales region have increased their purchases by more than 30 percent in the past three years?" or "How much revenue did we generate from international sales of Product X last November?" These types of complex queries, involving time, geography, product lines, revenues, and other business variables, require that multiple dimensions and levels of detail be examined. The data warehouse system 100 allows users to make connections between these cross-functional variables, connections that will provide insight into what is driving the business.

The business model 110 is based on comprehensive information about the business questions that users 20 in functional areas of an organization face, including hundreds of function-specific questions common to business people in many industries. In other words, someone who manages a sales force for a pharmaceutical company will face many of the same business challenges as someone who manages a sales force at a textile company or a semiconductor company. These questions can also be the basis of the business measures, dimensions, and attributes. Business rules that govern how to derive measures such as "net profit margin" or "inventory balances", i.e., measures that do not appear in ERP systems 10 and should be created, are also established in the business model 110.

Based on how companies manage their workflows within each functional area, the business questions can be categorized as strategic, tactical, or operational. Information needs associated with each category are reflected in the business model 110. For example: What level of data granularity do users require? How much history do they need? Five years? Three years? How often do they need to refresh data? Do they have to know what happened yesterday to answer a given business question or can they wait until the end of the week?

Figure 9:
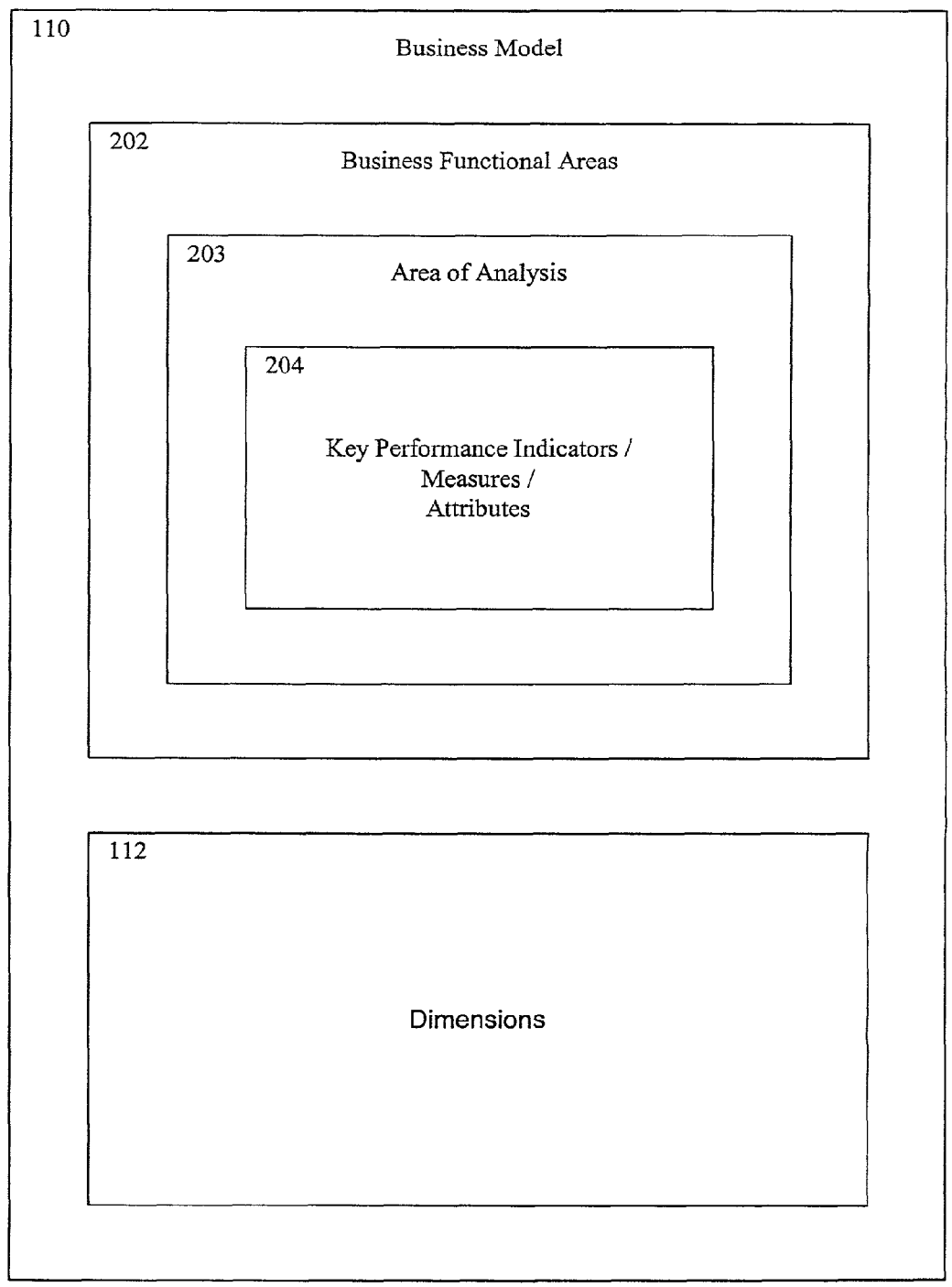
FIG. 9 is a diagram showing the structure of an example of a business model of a data warehouse system.

The structure of the business model 110 is presented in FIG. 9. The business model 110 is made up of multiple business functional areas 202 (e.g., sales, accounts receivable (AR), general ledger (GL), accounts payable (AP), procurement, inventory, e-commerce, etc.) and a set of dimensions 112 reflecting the business model 110 manifestation of the dimensional framework. As has been stated above, the data warehouse system 100 may assist in the management of the performance of many types of organizations, including, but not limited to, not-for-profit organizations, for-profit businesses, charities, governmental organizations, etc. Thus, the business functional areas 202 include functional areas of organizations that are not necessarily commercial enterprises.

For the purpose of data warehouse analysis, each business functional area (or functional area) 202 is divided into areas of analysis 203. In an embodiment of the invention, there are over 30 areas of analysis, but this number may change as the business model 110 evolves. The content 204 of an area of analysis 203 may include the KPIs, measures, attributes that are used to support the business analysis that can be performed. The functional areas 202, the areas of analysis 203 and the KPIs, measures, dimensions and attributes 204 may be arranged as shown in FIG. 9.

Analytical functions may be added to the set of dimensions 112 to provide the business performance management offered in the data warehouse system 100.

Figure 10:
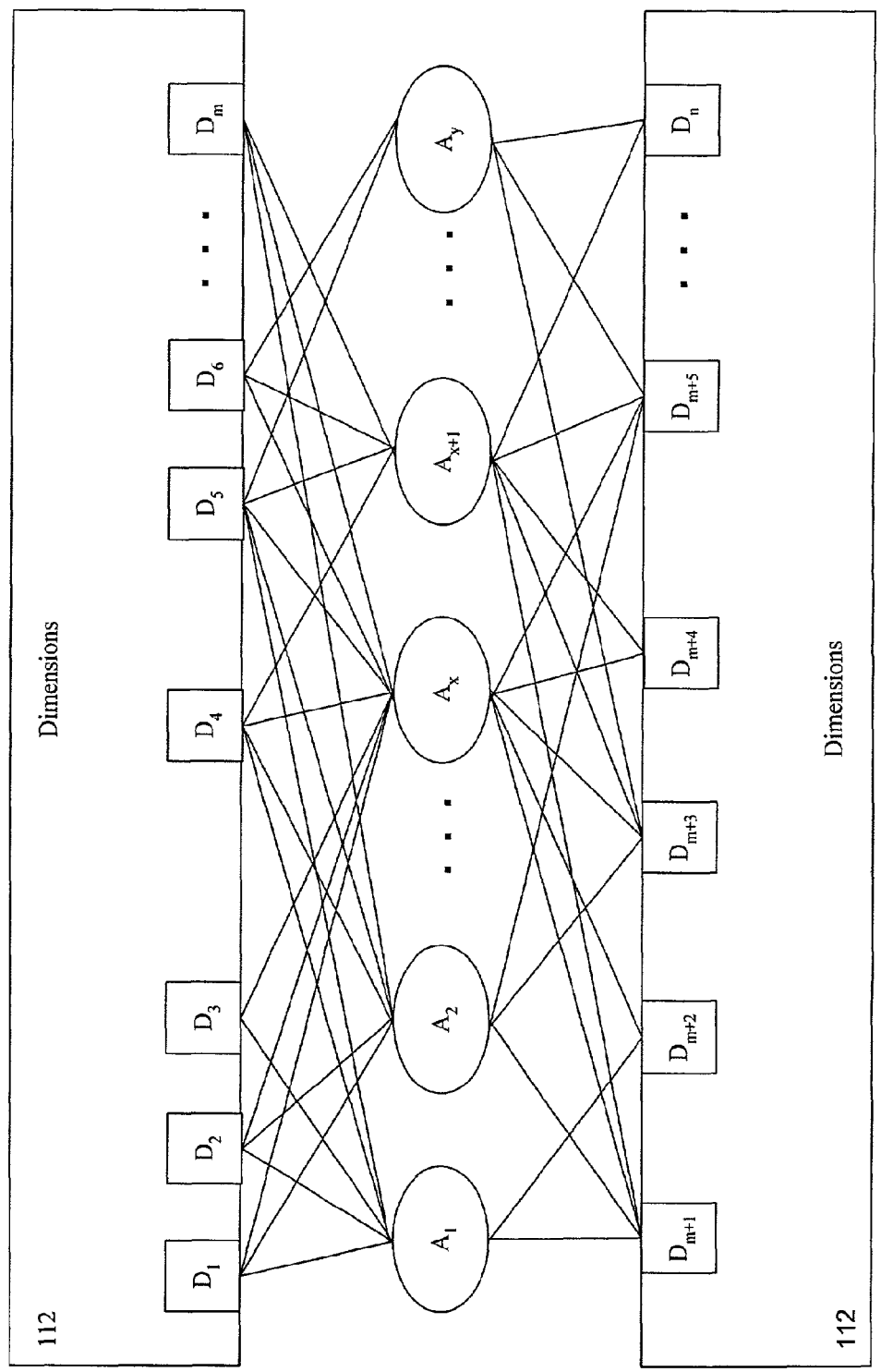
FIG. 10 is an abstract model of a business model of a data warehouse system.

Referring to FIG. 10, a business model 110 rich and complete enough to be applicable to many organizations is described. The business model 110 comprises a set of functional areas 202, a set of dimensions 112, and relation indicators 390 showing a relationship between the dimensions and the functional areas of analysis. A functional area 202 is a set of areas of analysis 203. Each area of analysis contains measures 111, and may use many dimensions 112. The individual dimensions are labeled $D_1$ to Dn. The notations m, and n refer to integers where m is greater than 0, n is greater than m. Thus, in this abstract representation of a business model 100 rich and complete enough to be used by many organizations, there are n dimensions. Similarly, the functional areas 202 are labeled $A_1$ to $A_y$. The notations x and y refer to integers where x is greater than 0, and y is greater than x. Thus, in this business model 100, there are y functional areas of analysis 202.

Not all dimensions 112 or areas of analysis 203 will necessarily be used by all organizations to which this model applies. However, all dimensions and areas of analysis are available for the organizations. Most organizations will use most of the dimensions 112. As has been stated above, the dimensions 112 are used by the measures 111 and areas of analysis 203. The differences between organizations may be reflected in the areas of analysis 203 selected by the organizations. These areas of analysis 203 may then use the appropriate dimensions 112 to answer business questions of the organization. An organization may use all of the dimensions 112 and/or all of the measures 111.

The abstract business model 110 in FIG. 10 shows how it is possible for one model to encompass all the dimensions 112 and functional areas 202 necessary for a group of organizations. The more dimensions 112 and the more functional areas 202 added to the model, the richer and more complete the model will be, so as to allow for other organizations to use it. Having one business model 110 which is rich and complete enough to be used by multiple organizations is advantageous because the business model 110 only need to be built once and then configured to a particular organization.

Figure 11:
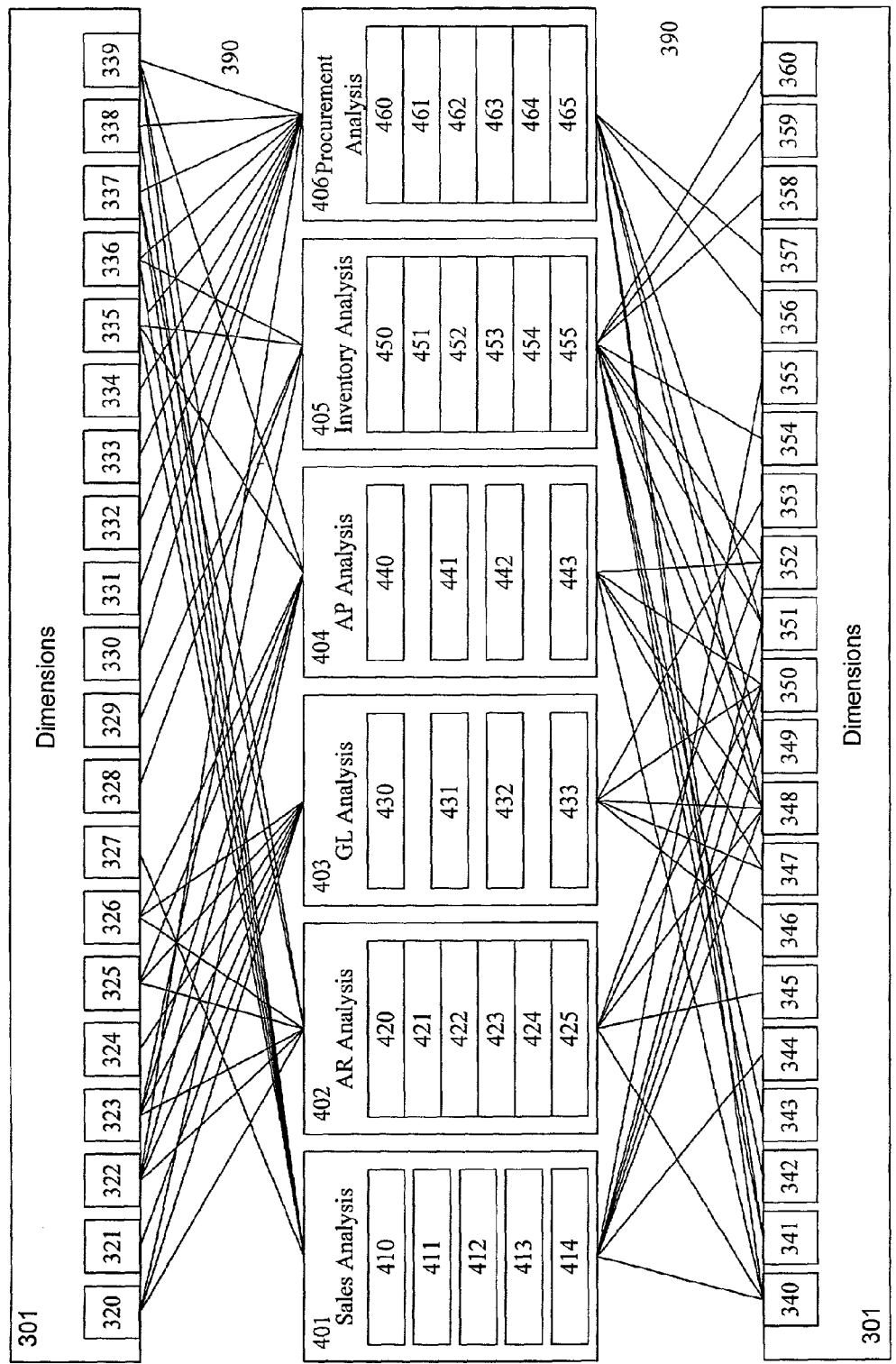
FIG. 11 is a diagram showing an example of a business model of a data warehouse system.

FIG. 11 shows an example of a business model 110. This business model 110 includes a set of dimensions 112 and six functional areas 202 including sales analysis 401, AR analysis 402, GL analysis 403, AP analysis 404, inventory analysis 405 and procurement analysis 406. The functional areas 202 are comprised of areas of analysis 203. The areas of analysis 203 are comprised of measures.

The area of analysis 203 of the sales analysis 401 functional area helps analyze sales raw data to increase sales. Companies may select from a host of key performance metrics and decision-ready reports that enable them to analyze forecast accuracy and pipeline volume, profile leads, calculate average deal size, and examine revenues and profitability. With the sales analysis 401 functional area, companies may:

Evaluate discount practices, target customers who generate the highest margins, and spot clients who cost the most;

Know about prospects, customers, and product performance; and

Identify opportunities, increase revenues, minimize costs, and shorten the sales cycle.

The areas of analysis 203 of the sales analysis 401 functional area may include the following: sales functional performance analysis 410, customer sales analysis 411, product sales analysis 412, sales organizational effectiveness analysis 413, and shipping performance analysis 414. Other areas of analysis may be added, such as e-commerce analysis. In this example, this functional area relates to 100 business questions, 80 KPIs, 11 dimensions, and 43 reports.

The area of analysis 203 of the AR analysis 402 functional area helps analyze raw AR sub-ledger transaction level data to manage a corporate asset. The AR analysis 402 functional area helps restructure AR data into key measurable facts used for strategic planning, program management and execution, and AR performance monitoring and reporting. Companies may select from a host of key performance metrics and decision-ready reports that enable them to continuously analyze the effectiveness of their AR function, performance of existing resources, and fully understand the existing customer base.

The areas of analysis 203 of the AR analysis 402 functional area may include the following: AR functional performance analysis 420, customer credit analysis 421, AR corporate self-appraisal analysis 422, AR cash inflow analysis 423, and AR organizational effectiveness analysis 424. Other areas of analysis may be added, such as quality of AR analysis. In this example, this functional area relates to 77 business questions, 71 KPIs, 12 dimensions, and 28 reports.

The areas of analysis 203 GL analysis 403 functional area helps analyze raw GL transaction level data to manage a corporate asset. The GL analysis 403 functional area helps restructure GL data into the key measurable facts used for strategic planning, program management and execution, and financial performance monitoring and reporting. Companies may select from a host of key performance metrics and decision-ready reports that enable them to continuously analyze their company's financial health.

The areas of analysis 203 of the GL analysis 403 functional area may include the following: financial performance reporting and analysis 430, budget analysis 431, key financial ratio reporting and analysis 432, and operational performance and analysis 433. Other areas of analysis may be added, such as sales functional performance. In this example, this functional area currently relates to 60 business questions, 50 KPIs, 11 dimensions, and 24 reports.

The areas of analysis 203 AP analysis 404 functional area helps analyze raw AP sub-ledger transaction level data to manage a corporate asset. The AP analysis 404 functional area helps restructure AP data into the measurable facts used for strategic planning, program management and execution, and AP performance monitoring and reporting. Companies may select from a host of key performance metrics and decision-ready reports that enable them to continuously analyze the effectiveness of their AP function, performance of existing resources, and enhance understanding of the existing vendor base.

The areas of analysis 203 of the AP analysis 404 functional area may include the following: AP performance analysis 440, AP vendor account analysis 441, AP cash outflow analysis 442, and AP organizational effectiveness analysis 443. Other areas of analysis may be added. In this example, this functional area relates to 80 business questions, 64 KPIs, 12 dimensions, and 28 reports.

The areas of analysis 203 inventory analysis 405 functional area helps deliver value to managers by helping turn raw data into information used to take action. The inventory analysis 405 functional area helps provide a host of key performance metrics and decision-ready reports that enable companies to analyze forecast accuracy, stock levels and valuations, stock fluctuations (e.g., minimum and maximum stock levels, stock outs), and key inventory analytics (e.g., ABC analysis, inventory turns, and stock coverage).

The areas of analysis 203 of the inventory analysis 405 functional area may include the following: stock overview and valuation analysis 450, material movement activity analysis 451, demand analysis 452, material reservations analysis 453, physical inventory analysis 454, and inventory forecast analysis 455. Other areas of analysis may be added. In this example, this functional area relates to 150 business questions, 100 KPIs, 15 dimensions, and 49 reports.

The areas of analysis 203 of the procurement analysis 406 functional area helps deliver value to managers by turning raw data into the information used to take action. The procurement analysis 406 functional area helps provide a host of key performance metrics and decision-ready reports that enable users to analyze purchasing volumes and patterns across commodities, analyze performance of the buying organization, deliver vendor scorecarding, review comparative vendor performance, and assess operational effectiveness.

The areas of analysis 203 of the procurement analysis 406 functional area may include the following: material expenditure analysis 460, material demand analysis 461, procurement vendor analysis 462, procurement process effectiveness analysis 463, and procurement organizational effectiveness analysis 444. Other areas of analysis may be added, such as bill of material analysis, and e-procurement analysis. In this example, this functional area relates to 180 business questions, 139 KPIs, 15 dimensions, and 35 reports.

Figure 12:
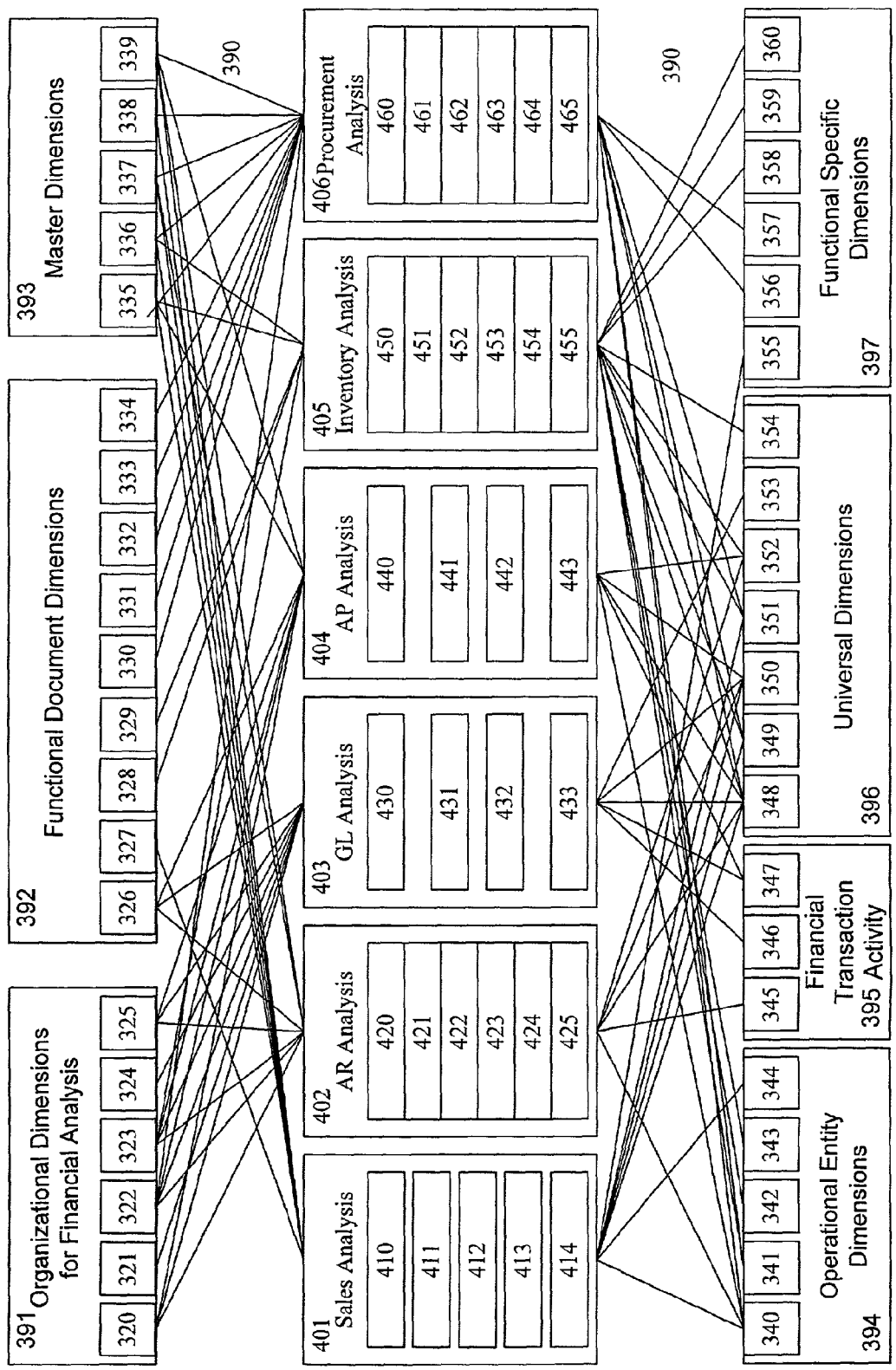
FIG. 12 is a diagram showing another example of a business model of a data warehouse system.

FIG. 12 shows a business model 110 where the dimensions are grouped according to the following groupings of dimensions 112: organizational dimensions for financial analysis 391, functional document dimensions 392, master dimensions 393, operational entity dimensions 394, financial transaction activity 395, universal dimensions 396, and functional specific dimensions 397.

The dimensions 112 are linked with the functional areas and areas of analysis for the purpose of reporting and analysis. For example, FIGS. 11 and 12 show that the sales analysis 401 uses the sales document class 327, material 336, customer 337, employee 338, organization 339, shipping point 342, all time (time, fiscal) 347, unit of measure 348, unit of measure conversion 350, and sales status 354 dimensions. Other functional areas of analysis may use different dimensions. The relationship between functional areas and dimensions are shown in FIGS. 11 and 12 by way of connecting lines 390.

The business model 110 is extensible and scalable: it may be expanded to include more functional areas, more areas of analysis and more KPIs, measures, dimensions and attributes. Other examples of business model functional areas 202 and their respective areas of analysis 203 include:

Human Resource Analysis
        Payroll Analysis
        Professional Development Analysis
        Recruiting Effectiveness Analysis
    Financial Controlling Analysis
        Cost Analysis
        Profitability Analysis
    Customer Relationship Intelligence
        Customer Profiling
        Customer Base Demographics
        Marketing Analysis
        Process Effectiveness Analysis
        Customer Satisfaction
    Supply Chain Intelligence
        Vendor Scorecarding
        Demand Forecasting Analysis
        Process Effectiveness
        Inventory Status Analysis
        Procurement Activity Profiling The set of dimensions 112 may also be used with a subset of functional areas 202 or areas of analysis 203 or with other functional areas of analysis. Such examples include cross-functional performance management, among others: supply-side performance management (see FIG. 13), demand-side performance management (see FIG. 14), and financial performance (or GL) management (see FIG. 15). The business model 110 would itself also supports the above areas of cross-functional performance management, among others, including individual functional areas akin to a data mart.

Figure 13:
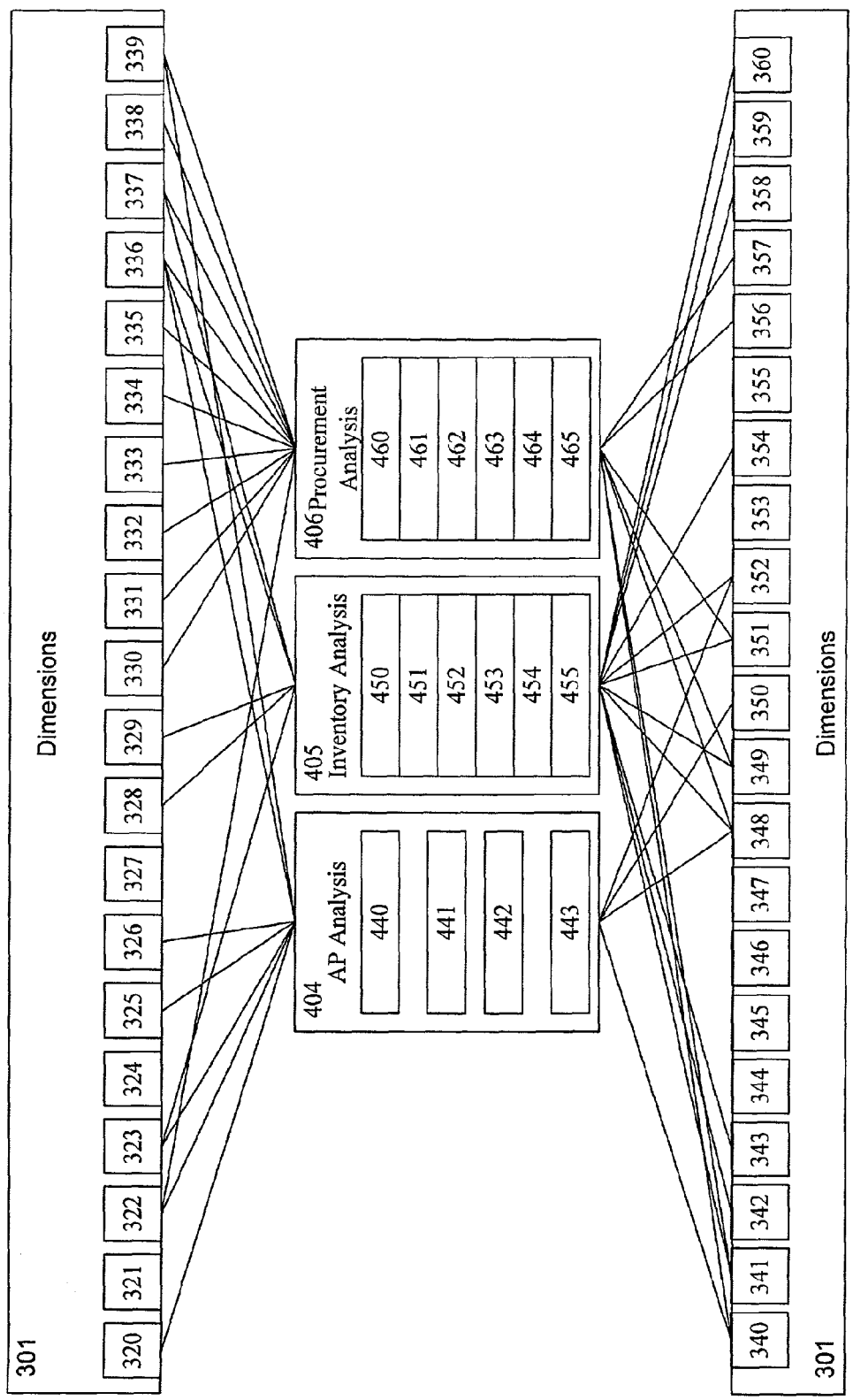
FIG. 13 is a diagram showing an example of supply-side performance management of a data warehouse system.
Figure 14:
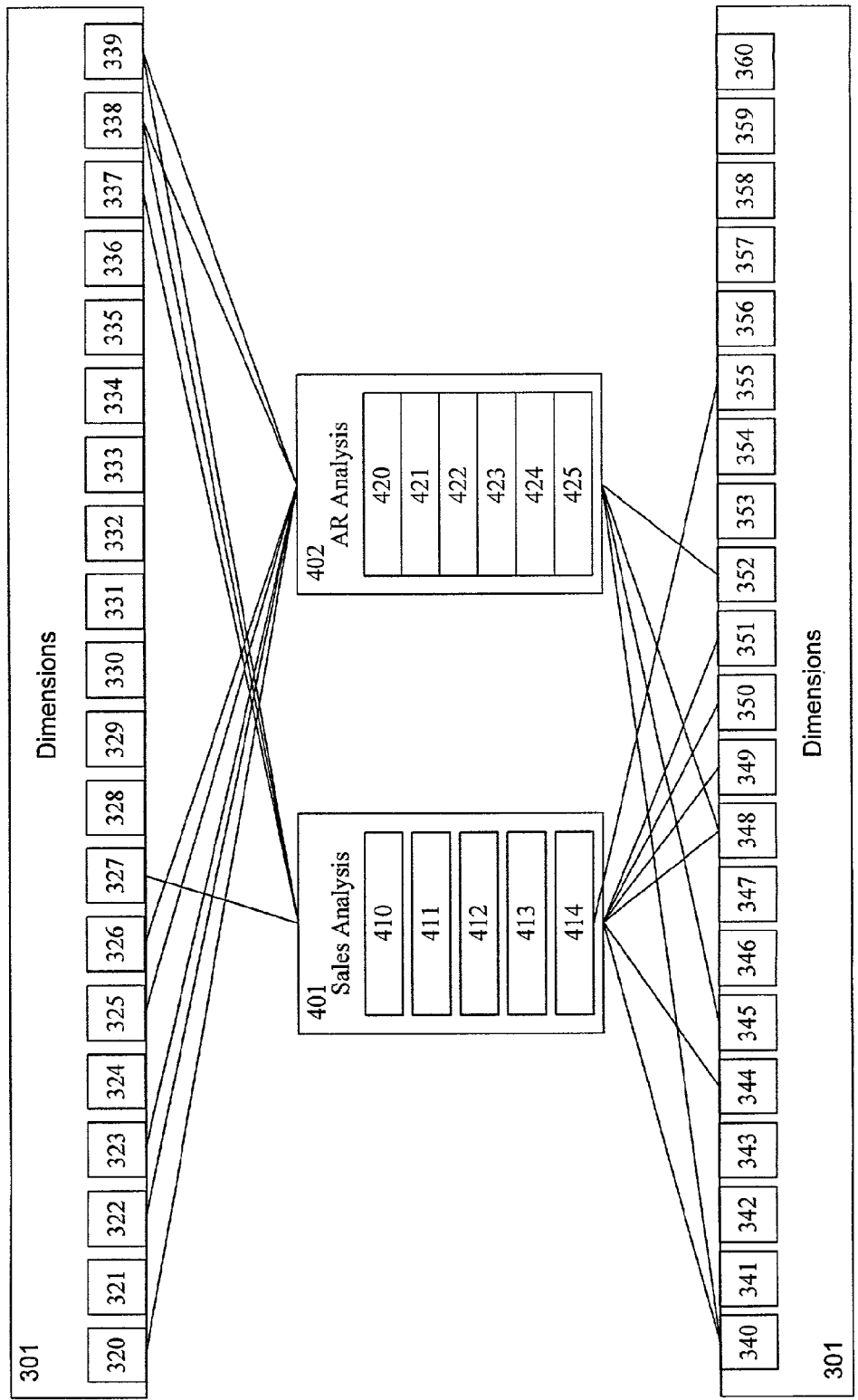
FIG. 14 is a diagram showing an example of demand-side performance management of a data warehouse system.
Figure 15:
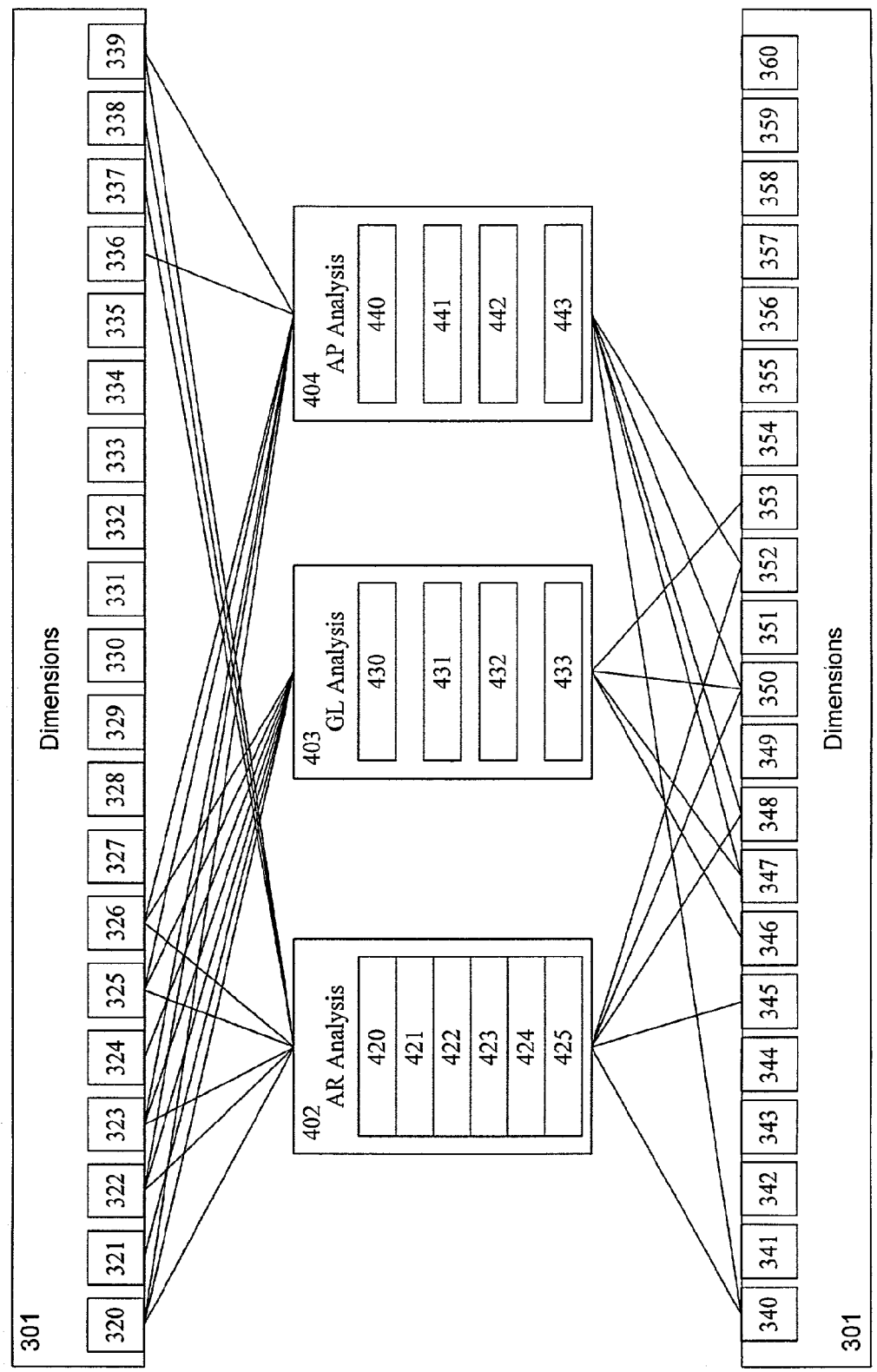
FIG. 15 is a diagram showing an example of financial performance management of a data warehouse system.

FIG. 13 shows an embodiment of supply-side performance management as containing the following functional areas 202: AP analysis 404, inventory analysis 405, and procurement analysis 406. The relevant areas of analysis 203 and dimensions 300 are also displayed in the format of the business model 110 as shown in FIG. 11. FIG. 14 shows an embodiment of demand-side performance management as containing the following functional areas 202: sales analysis 401, and AR analysis 402. The relevant areas of analysis 203 and dimensions 300 are also displayed in the format of the business model 110 as shown in FIG. 11. FIG. 15 shows an embodiment of financial performance management as containing: AR analysis 402, GL analysis 403, and AP analysis 404. The relevant areas of analysis 203 and dimensions 300 are also displayed in the format of the business model 110 as shown in FIG. 11.

The business model 110 is extensible. As has been described, administrators 21 may add new functional area data marts to further enhance their enterprise analysis and reporting. Administrators 21 may broaden the source data collection points beyond the ERP 10 system to gain a more complete view of the enterprise and customer relationships.

Components of the data warehouse system 100 are also designed for high scalability. Organizations may also increase the number of users that the system supports, accommodating corporate expansion without the growing pains.

The areas of analysis in the business model 110 exemplified above may each be one of a series of pre-packaged data marts aimed at meeting the market demand for cross-functional business intelligence (BI) against data held within corporate ERP 10 systems and other sources of data within the enterprise. Each component contributes to the core functional information requirements of an enterprise, taking its place within the data warehouse system 100 "backbone" which is comprised of data marts targeting other core data including sales, distribution, billing, inventory, financial and cost accounting, and human resource management.

The sales analysis functional area 401, AR analysis functional area 402, GL analysis functional area 403, AP analysis functional area 404, inventory analysis functional area 405, procurement analysis functional area 406, and e-commerce analysis functional area questions listed above represent a sampling of the type of valuable information available in the respective analysis of the data warehouse system 100, information that business professionals desire to effectively manage their roles and responsibilities. The questions address the desire for information regarding the following:

- sales, shipping and billing portion of the sales cycle;
- demand for information regarding the organization's ability to meet collection expectations, customer profiling, and analyst performance;
- demand for information regarding the GL;
- demand for information regarding the organization's ability to meet payment expectations, vendor profiling, and analyst performance;
- demand for information regarding the investment in stock, process effectiveness, use of resources, and the effectiveness to meet the demand of internal and external customers;
- demand for information regarding the commodities purchased, vendor activity and performance, analysis of internal demand; and
- the demand for information regarding the e-commerce order taking process of the e-commerce cycle.

It should be noted that more analysis is possible. The multi-dimensional nature of the sales, AR, GL, AP, inventory, procurement and e-commerce analyses components, along with the power of business intelligence tools, offers robust analysis around any single question, further expanding the knowledge gained from the data extracted from the source ERP 10 system.

The Data Model 120

The following will describe an embodiment of this invention using a star schema. It should be noted that this invention is not limited to a star schema data model. The invention may be applied to other types of data models.

Figure 16:
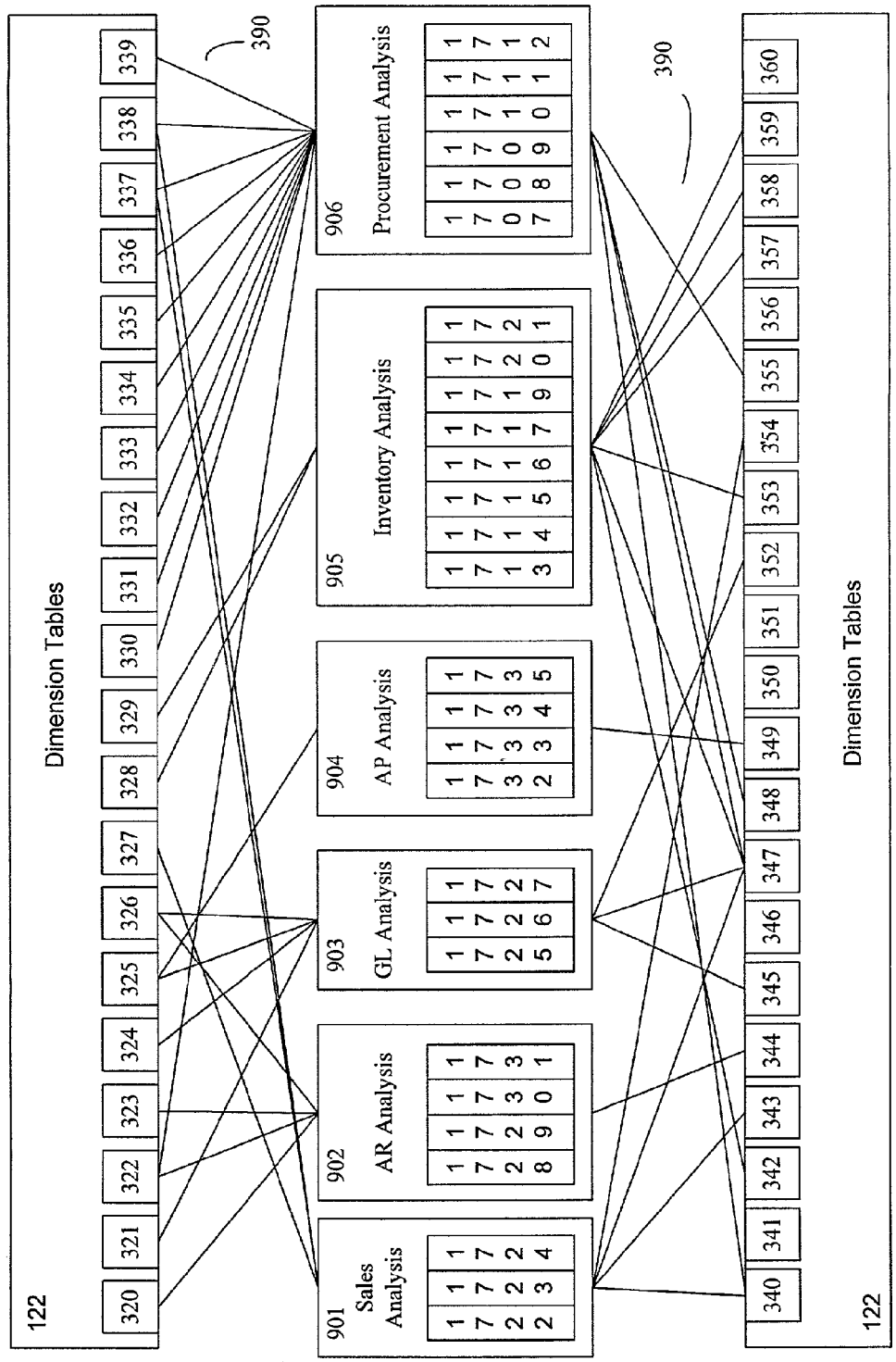
FIG. 16 is a diagram showing an example of a data model of a data warehouse system.

FIG. 16 shows an embodiment of a data model 120. In this embodiment, the data model 120 implements the business model 110. The data model 120 includes a set of dimension tables 122 corresponding to the dimensions 112 of the business model, and fact tables 121 which are analogous to the functional areas 202 of the business model 110. The fact tables 121 may relate to a data mart, multiple data marts, or an integrated data warehouse. Furthermore, the configurable dimensional framework allows for more fact tables 121 to be added to the data model 120.

Figure 17A:
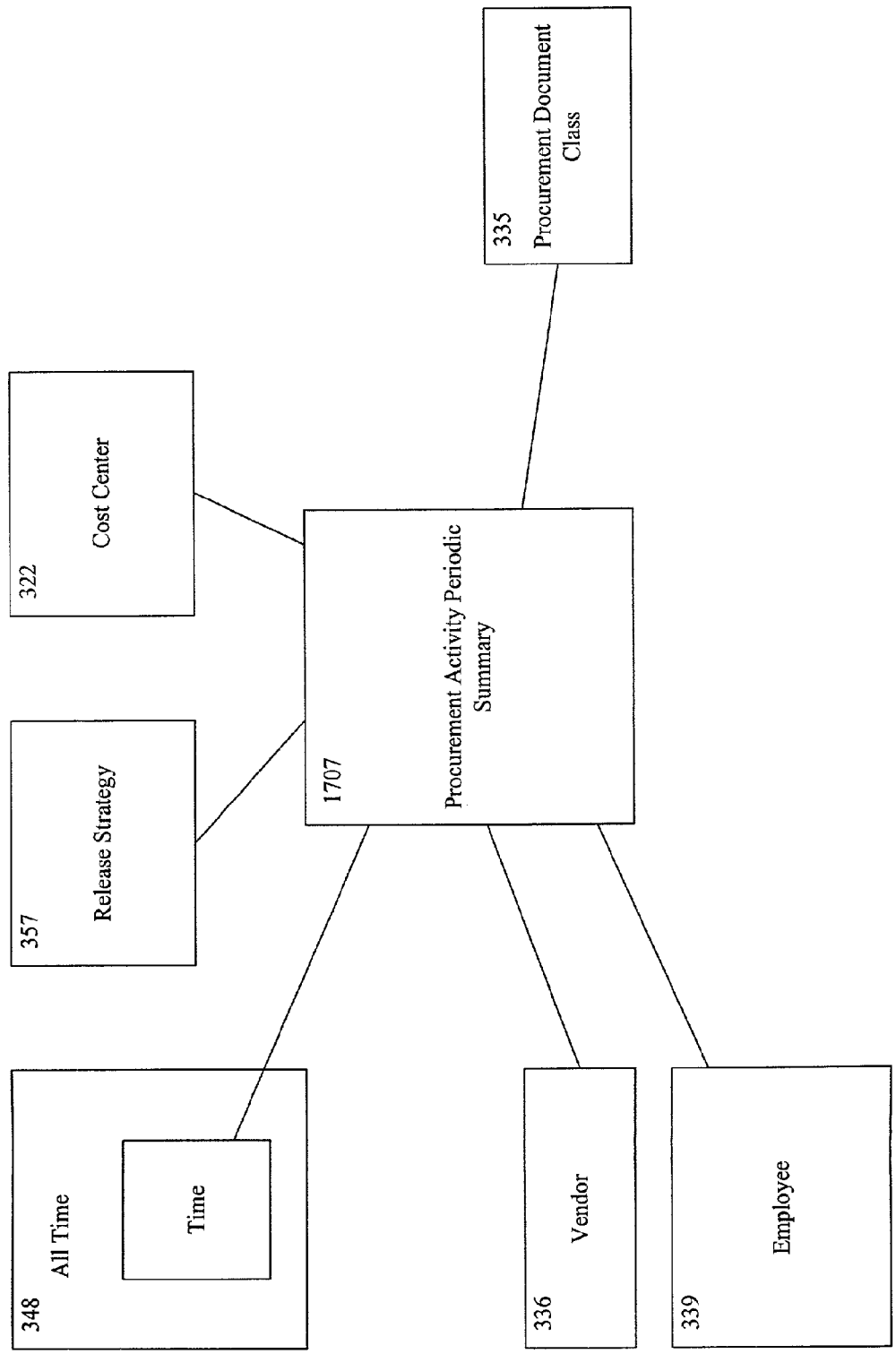
FIGS. 17A to 17AE are diagrams showing examples of star schemas of areas of analysis of a data model of a data warehouse system.
Figure 17B:
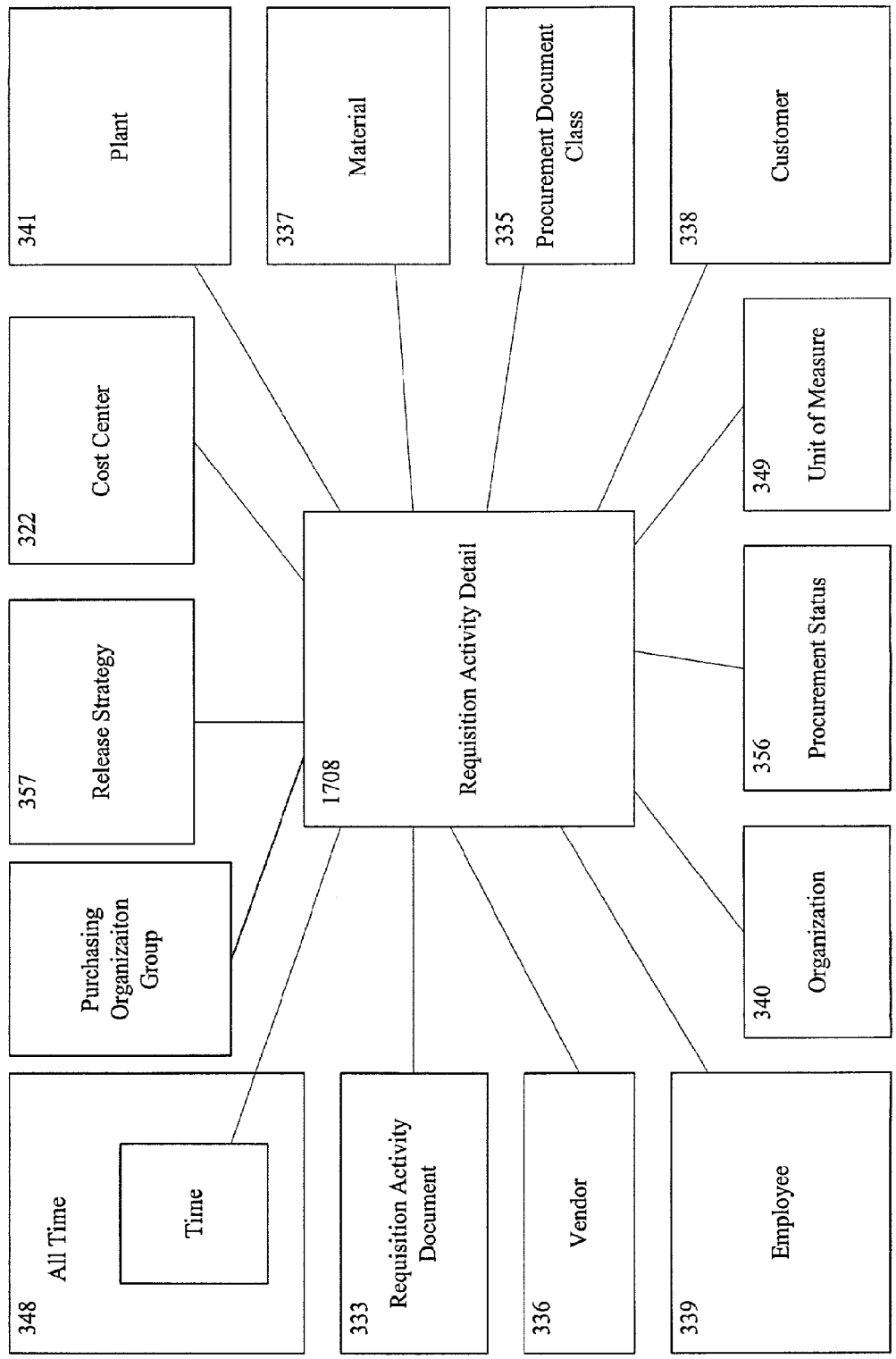
Figure 17C:
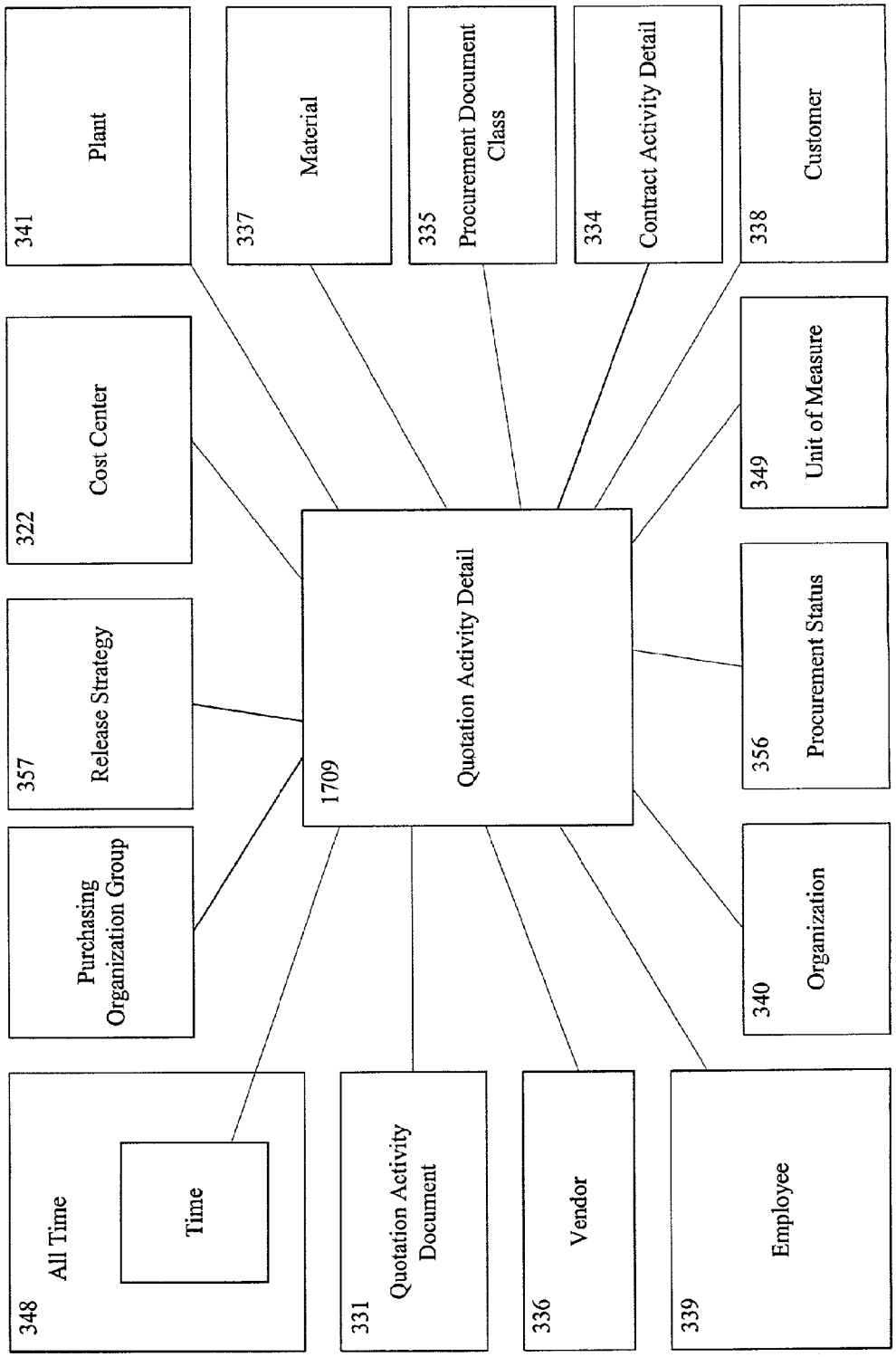
Figure 17D:
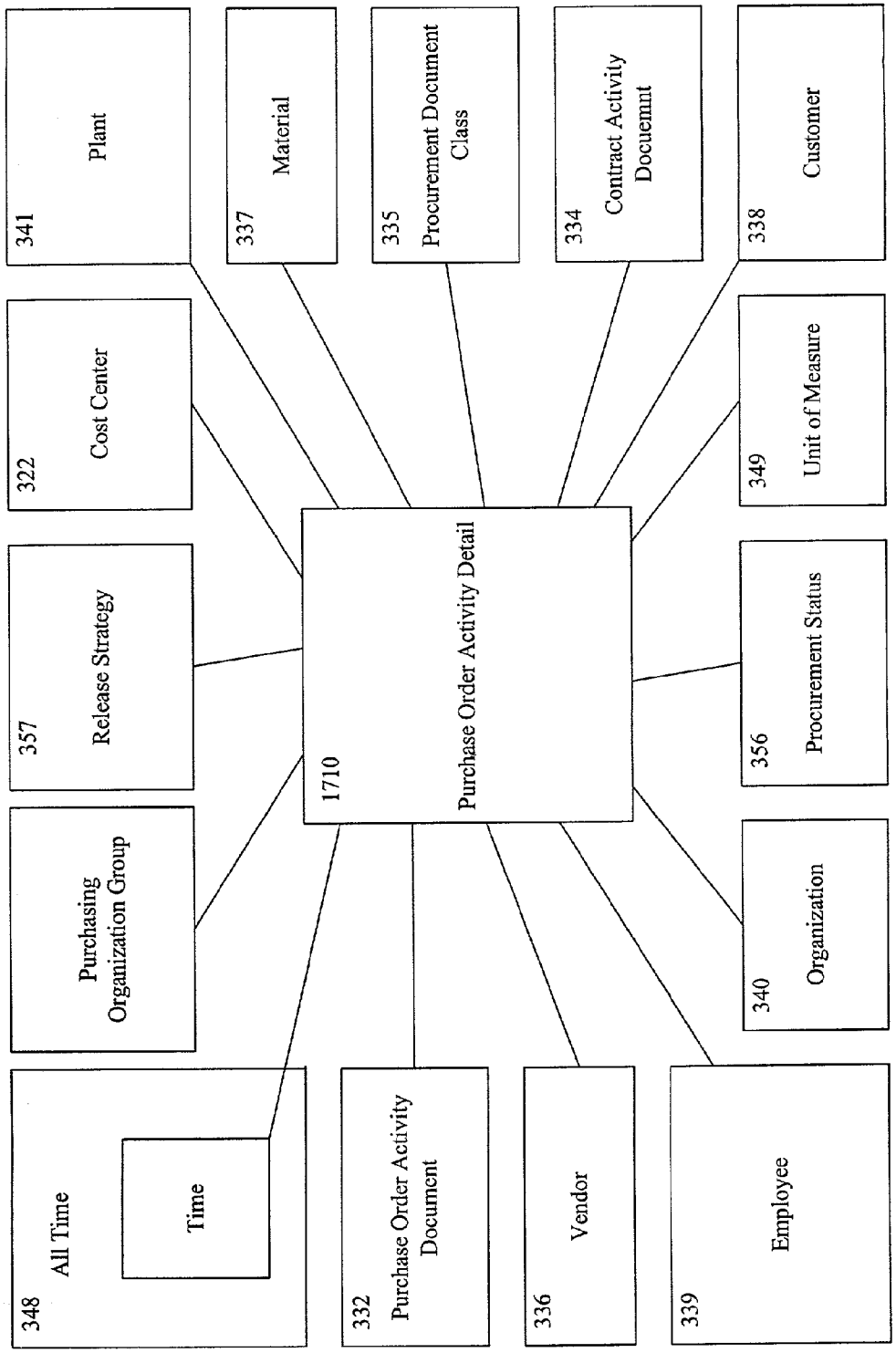
Figure 17E:
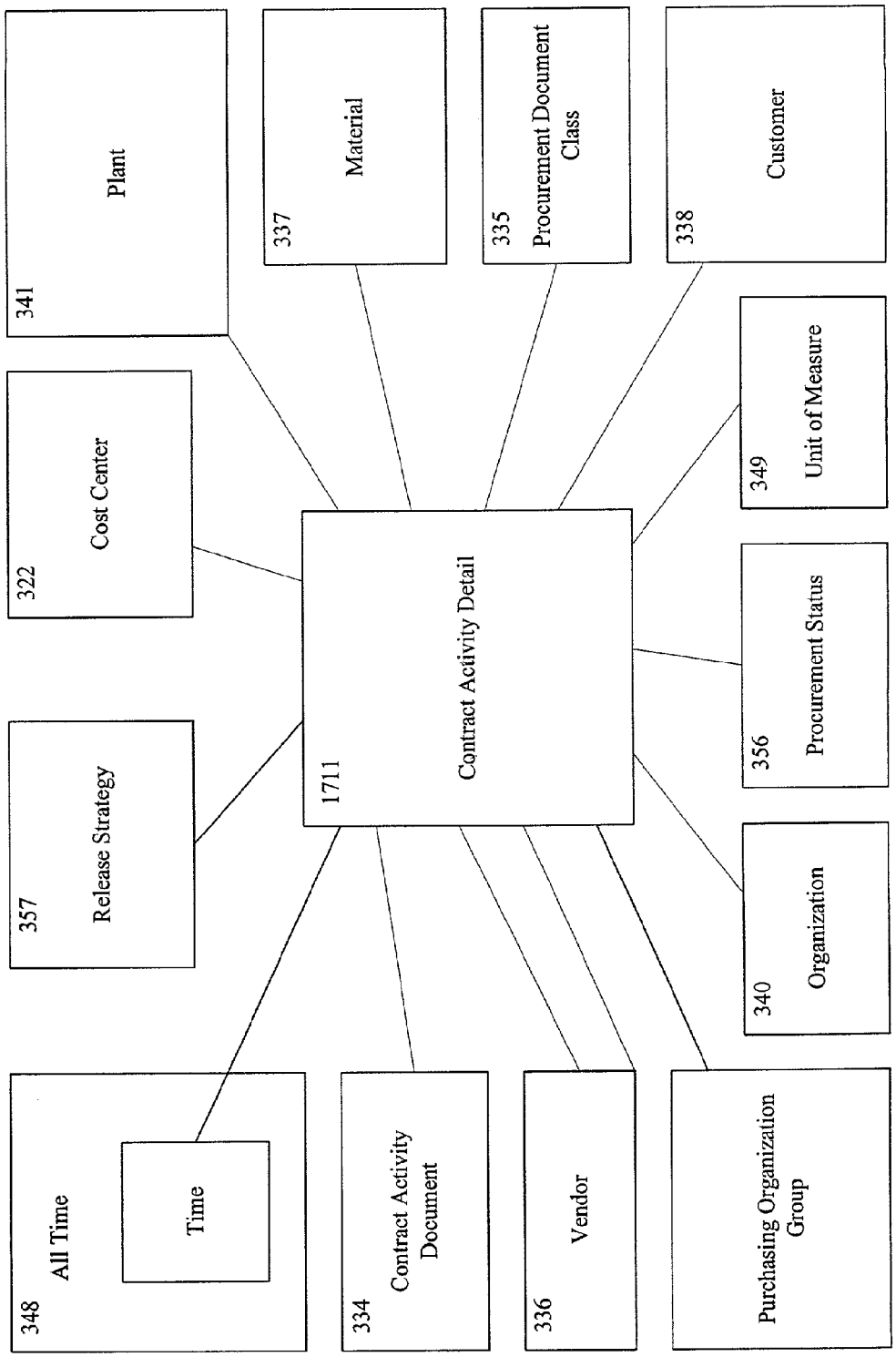
Figure 17F:
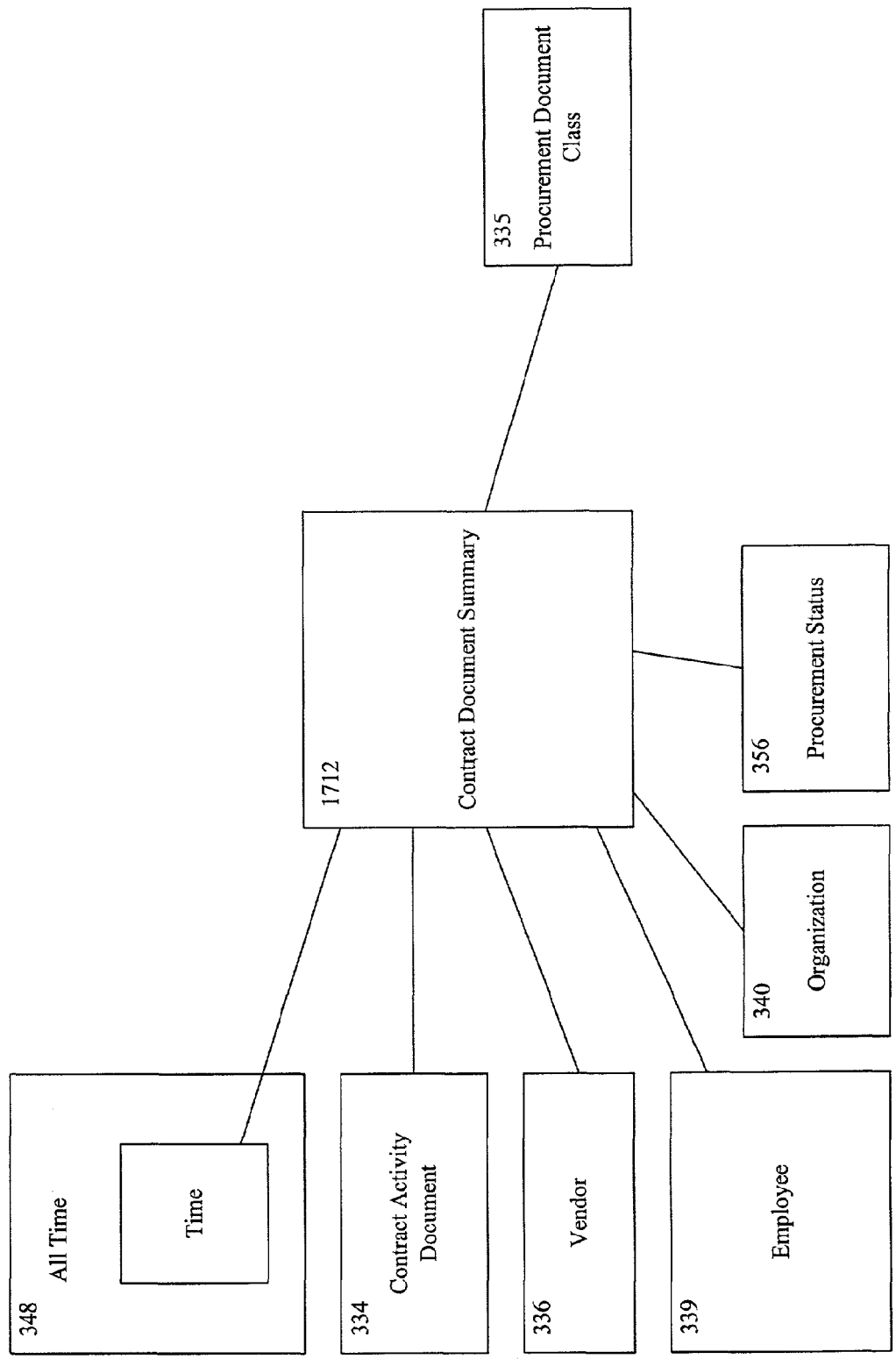
Figure 17H:
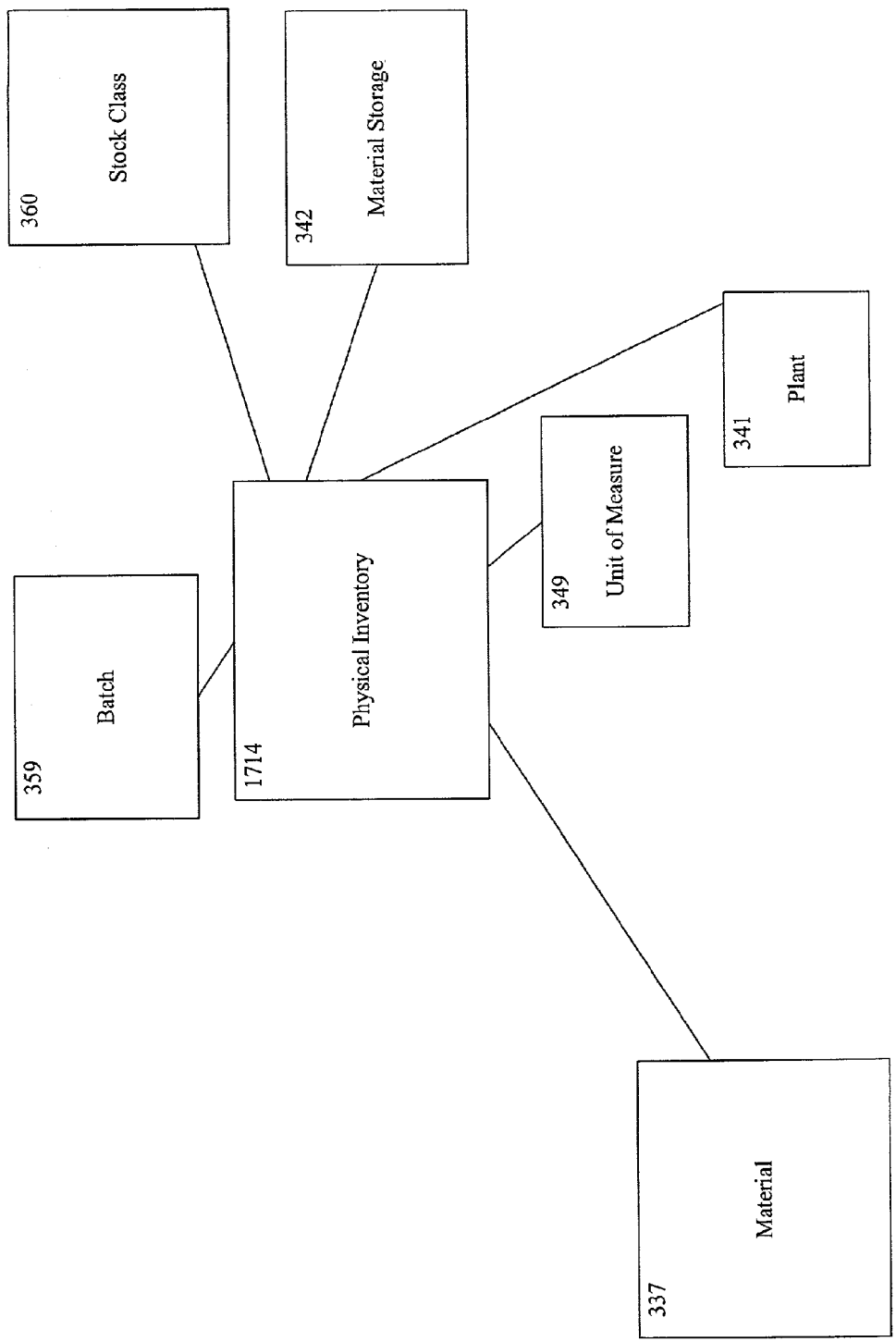
Figure 17I:
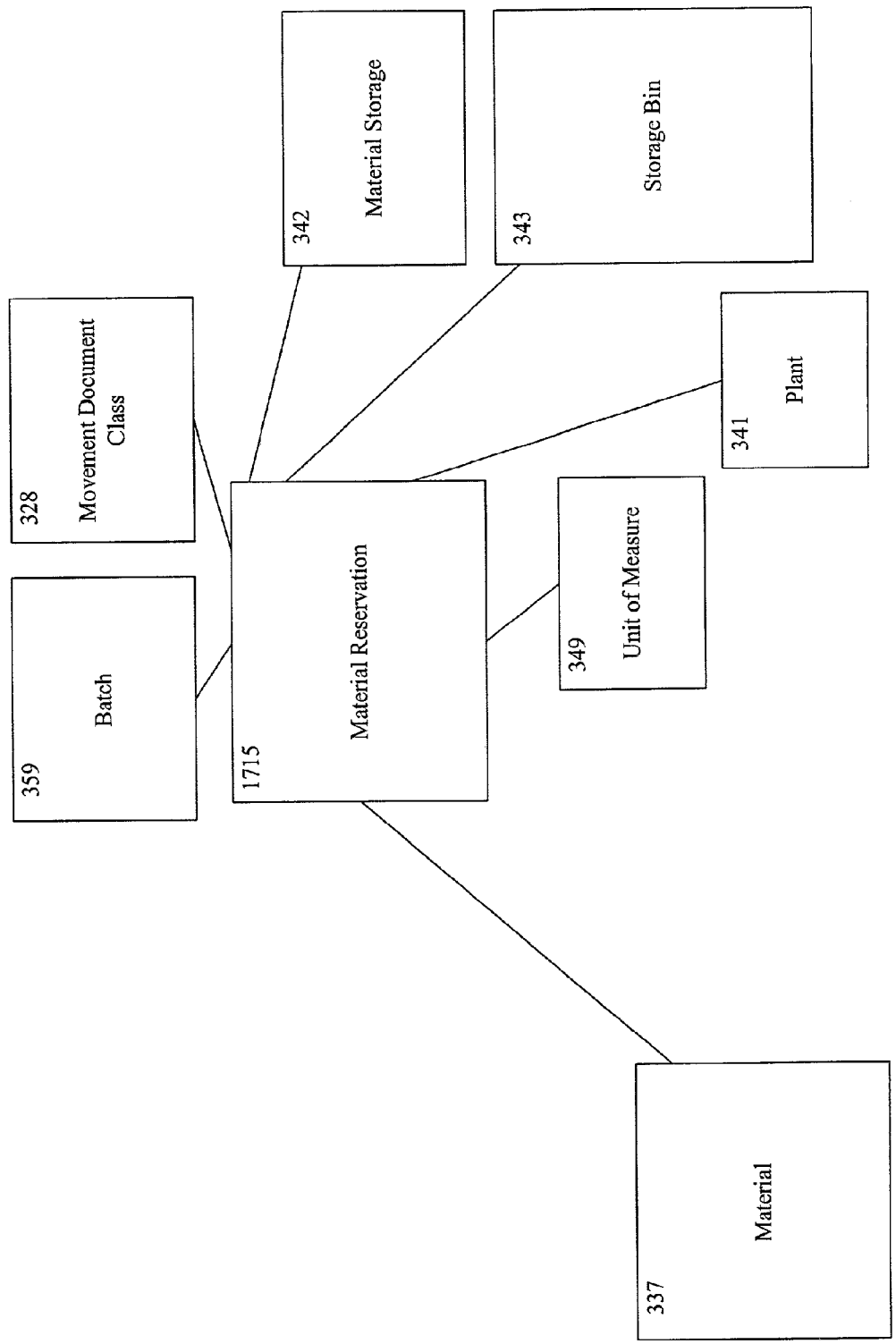
Figure 17J:
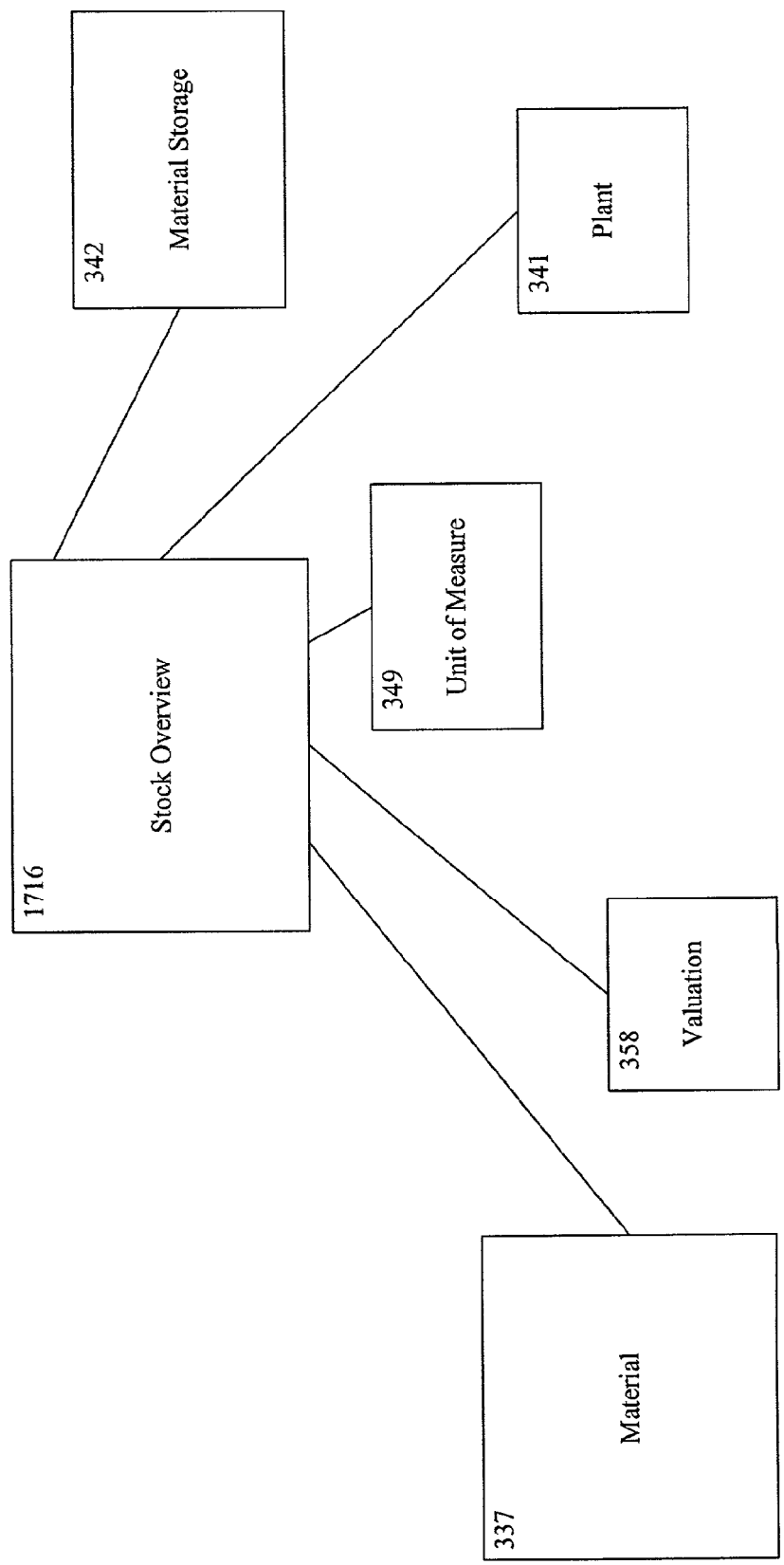
Figure 17K:
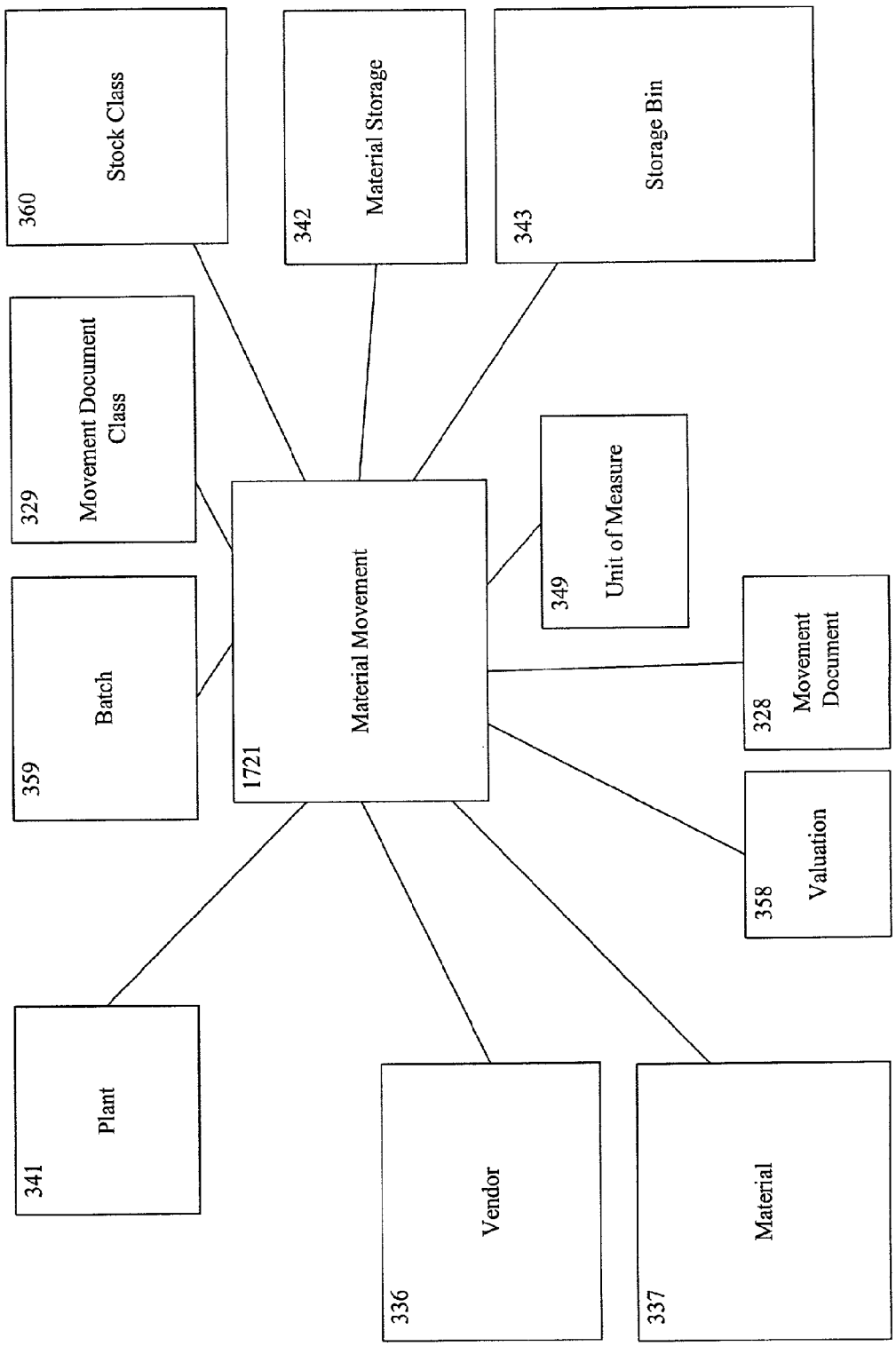
Figure 17L:
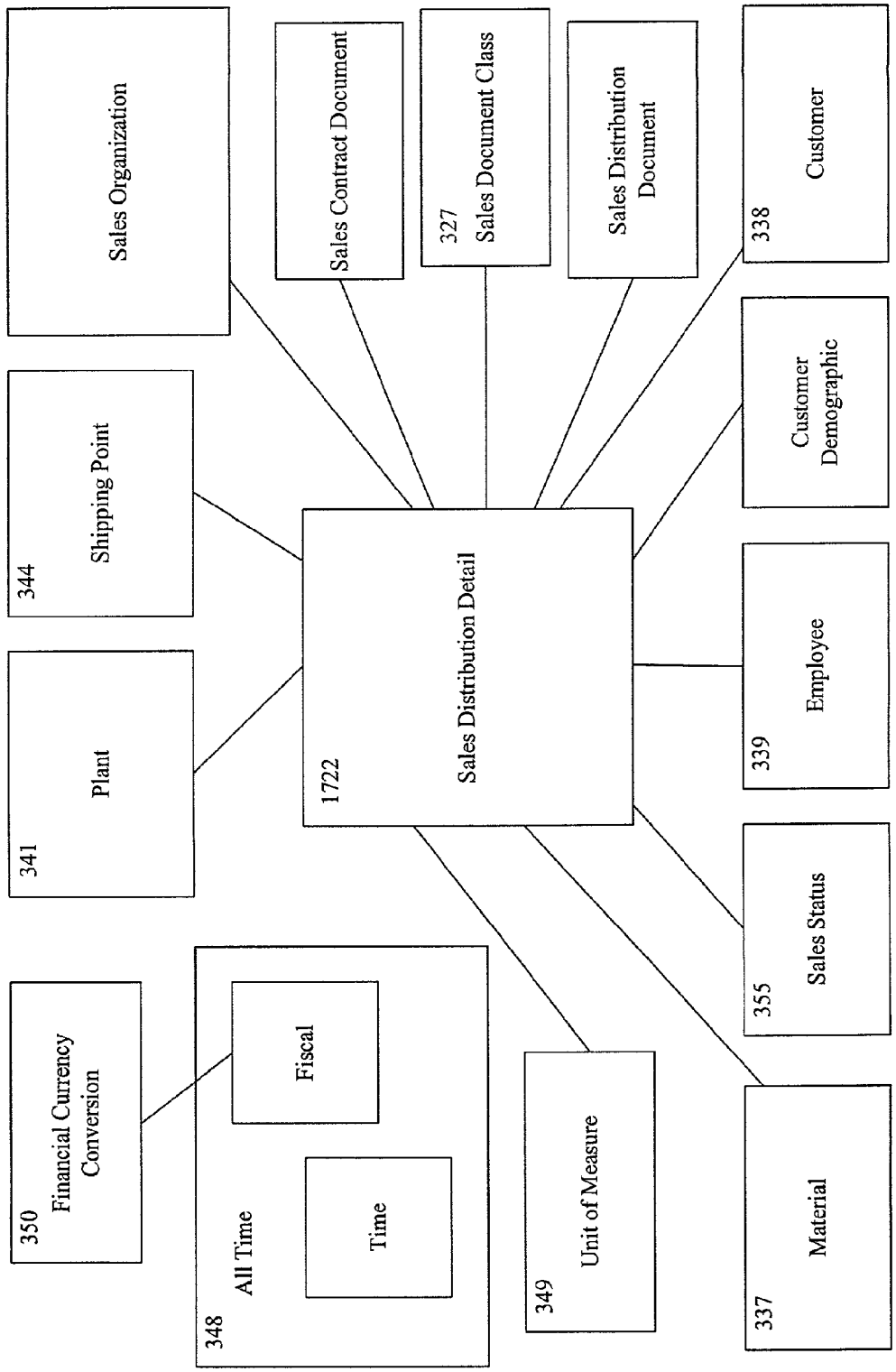
Figure 17M:
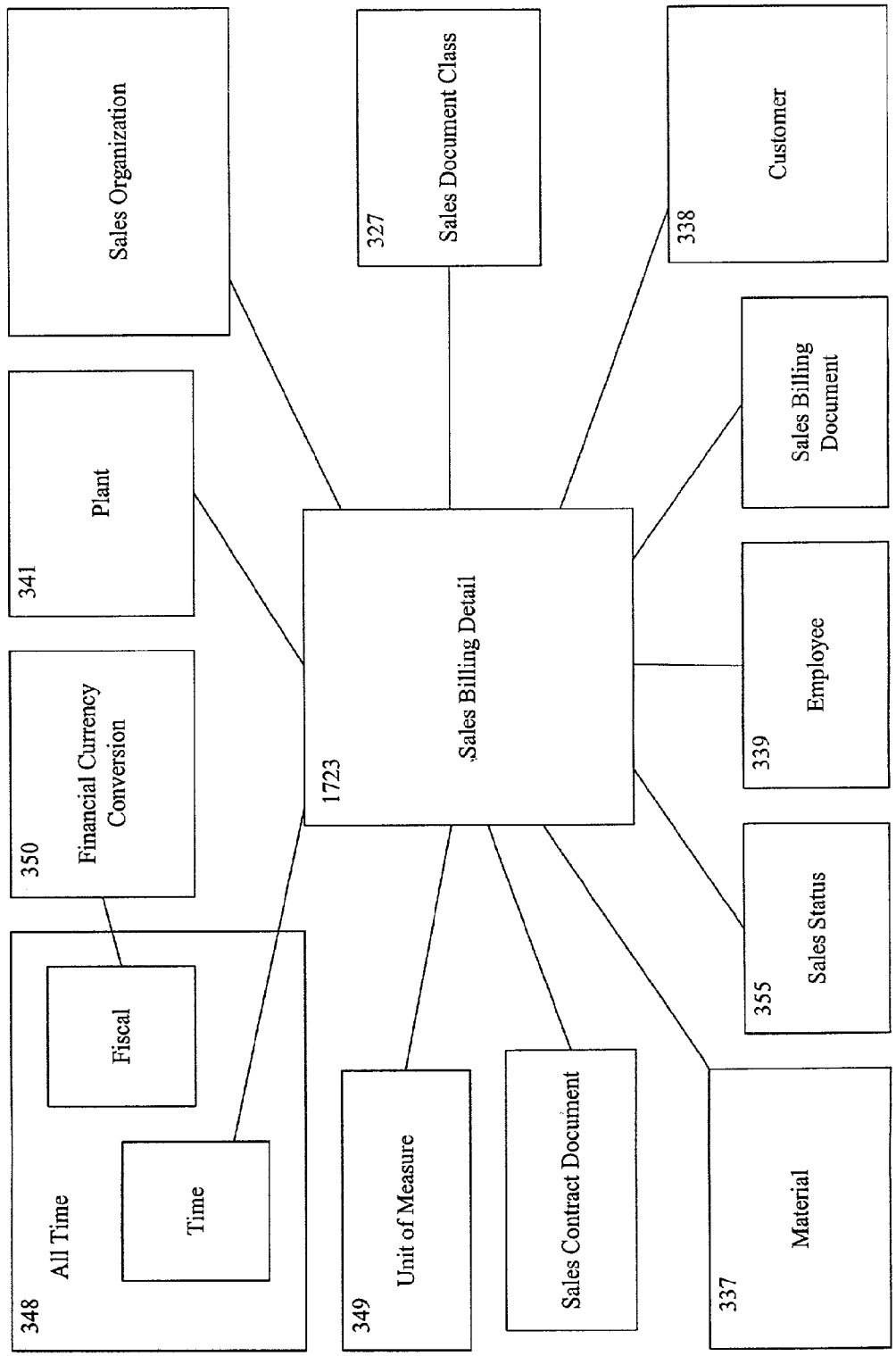
Figure 17N:
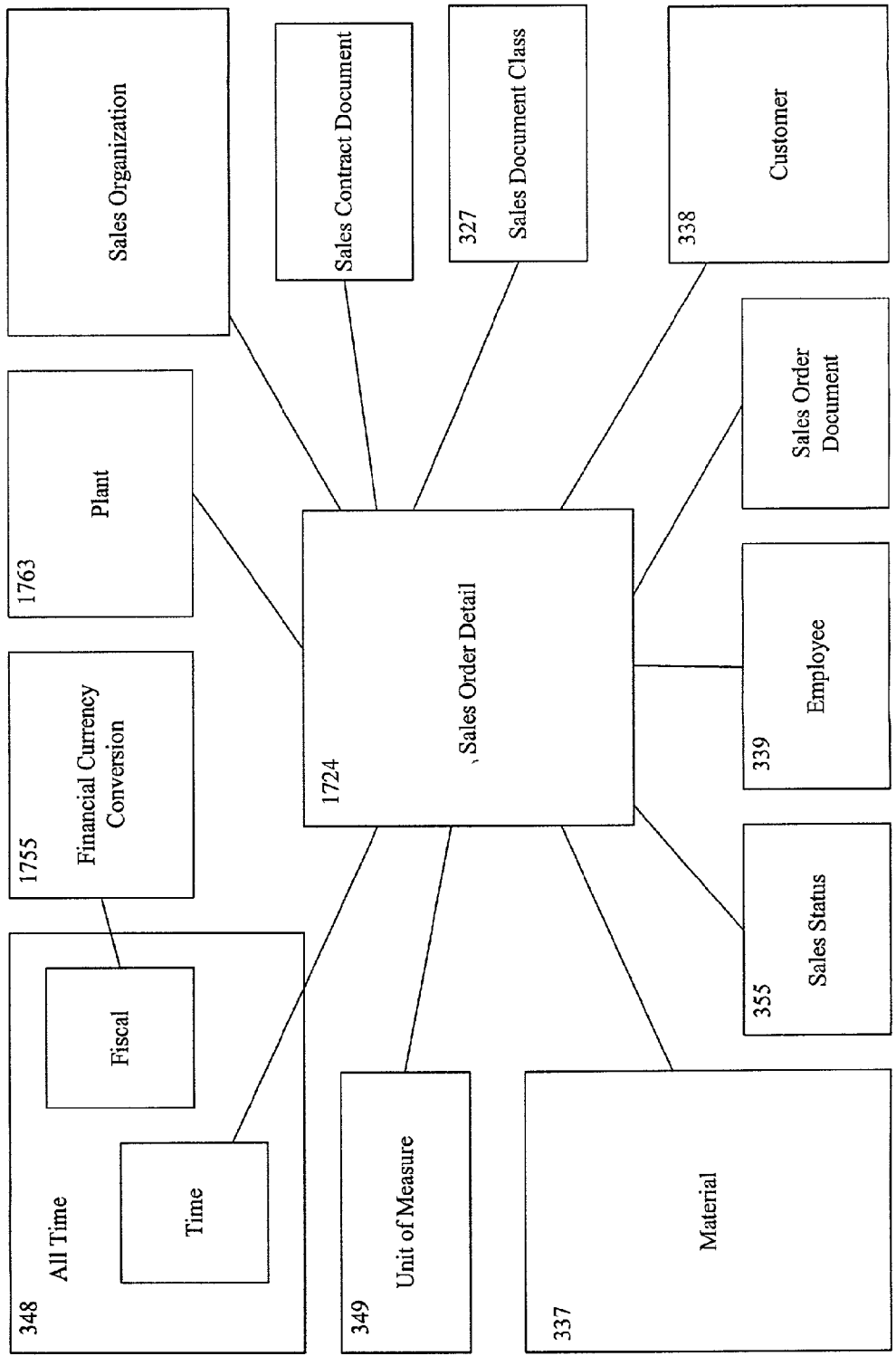
Figure 17O:
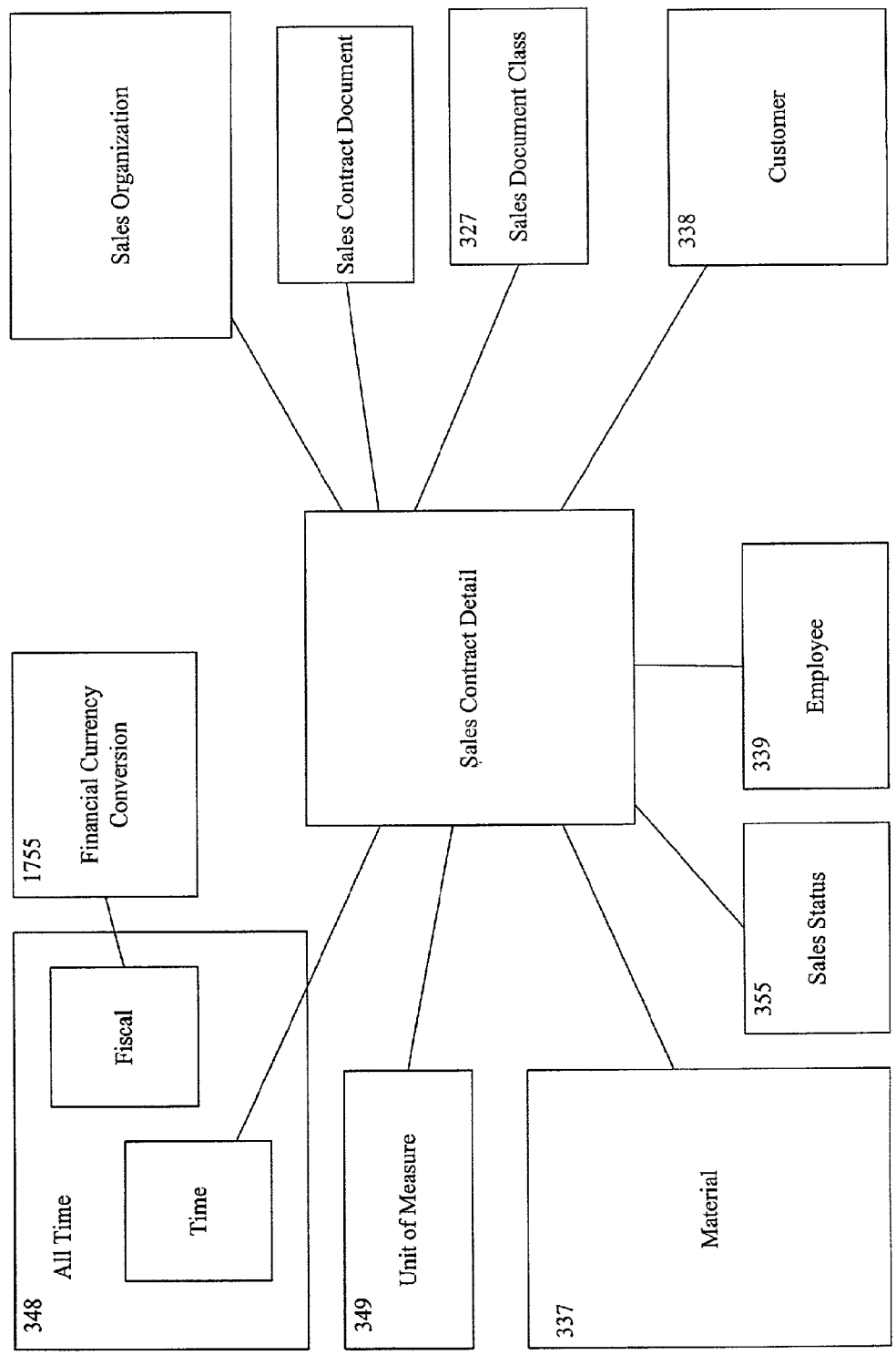
Figure 17P:
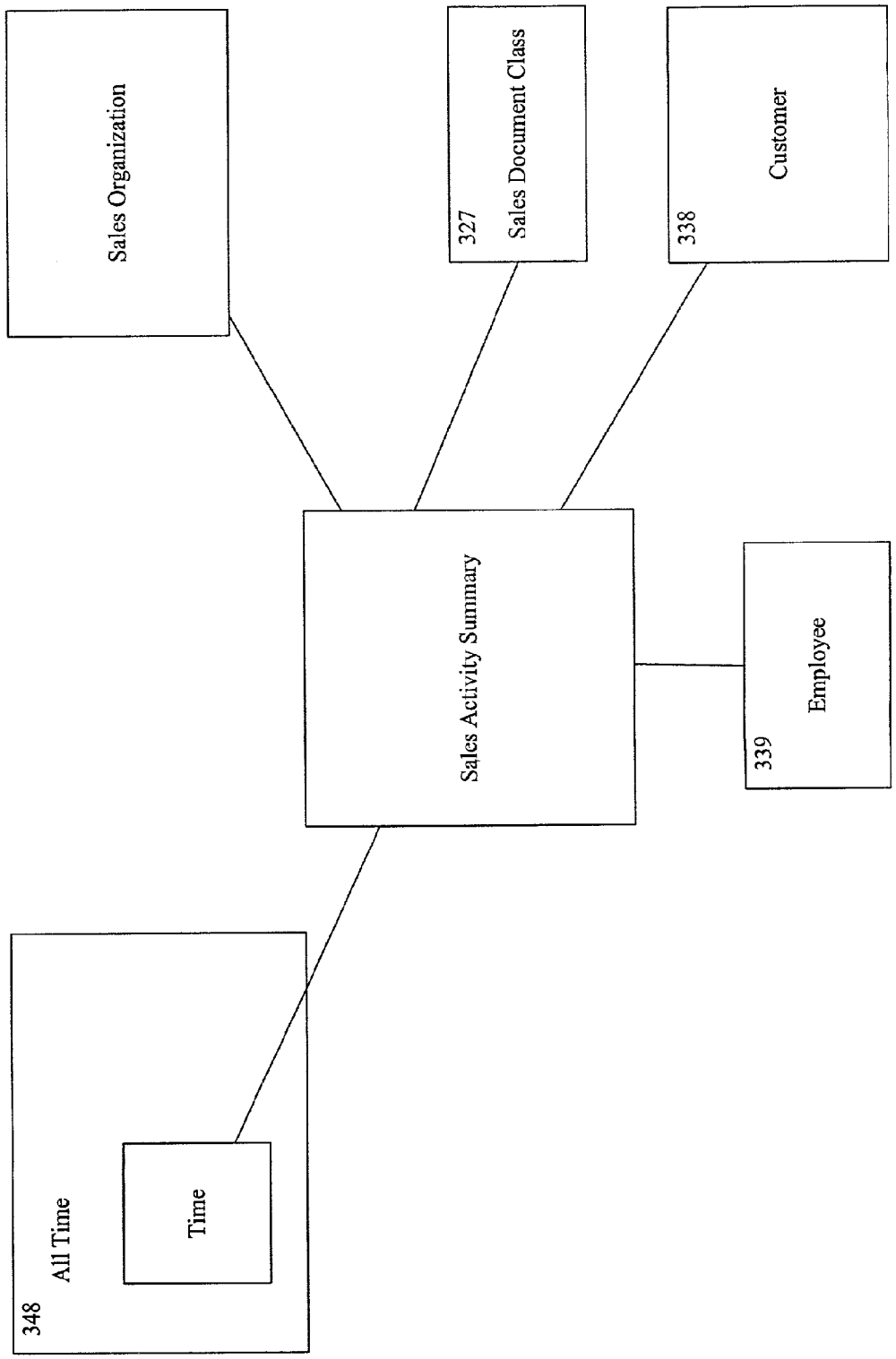
Figure 17Q:
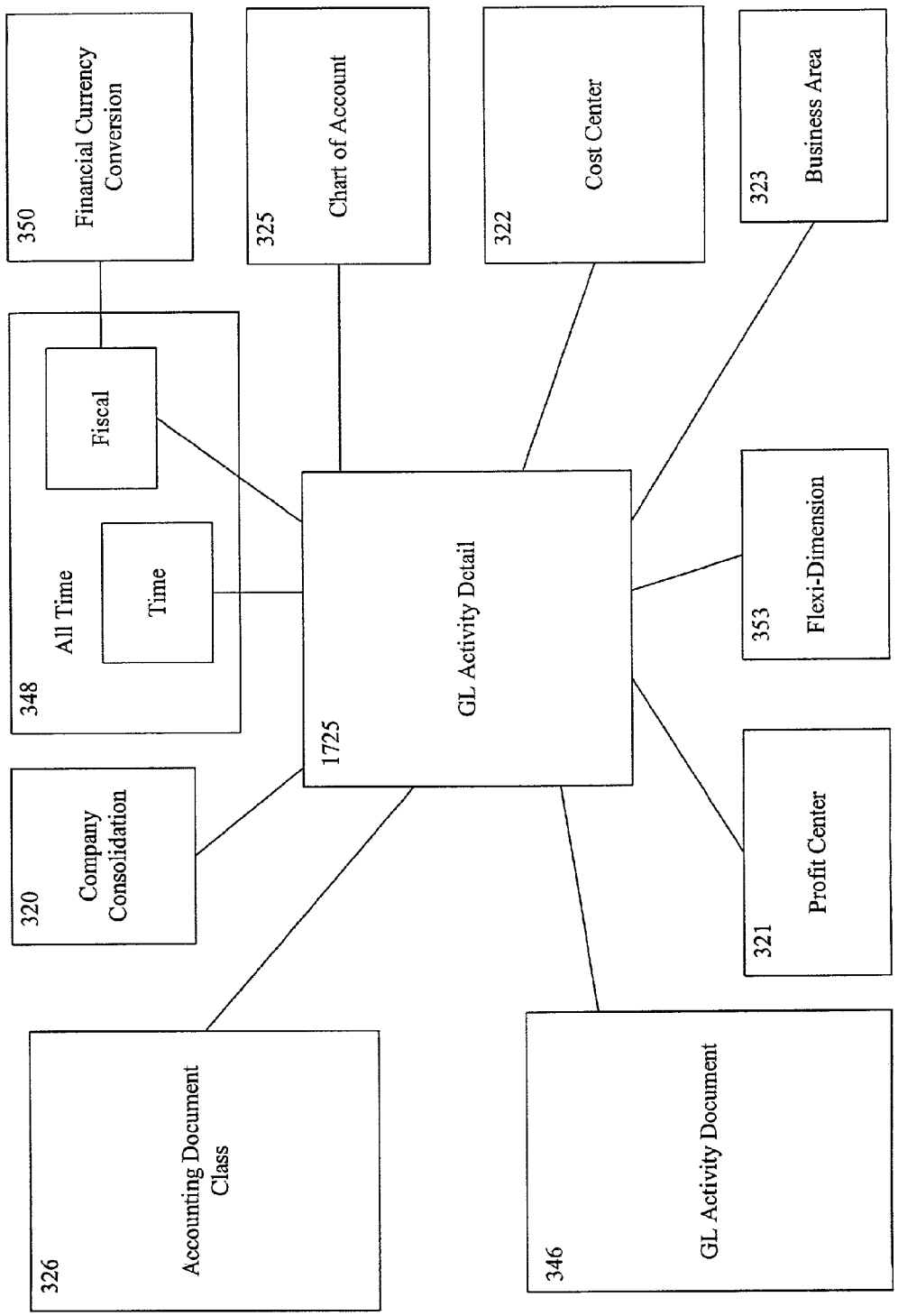
Figure 17R:
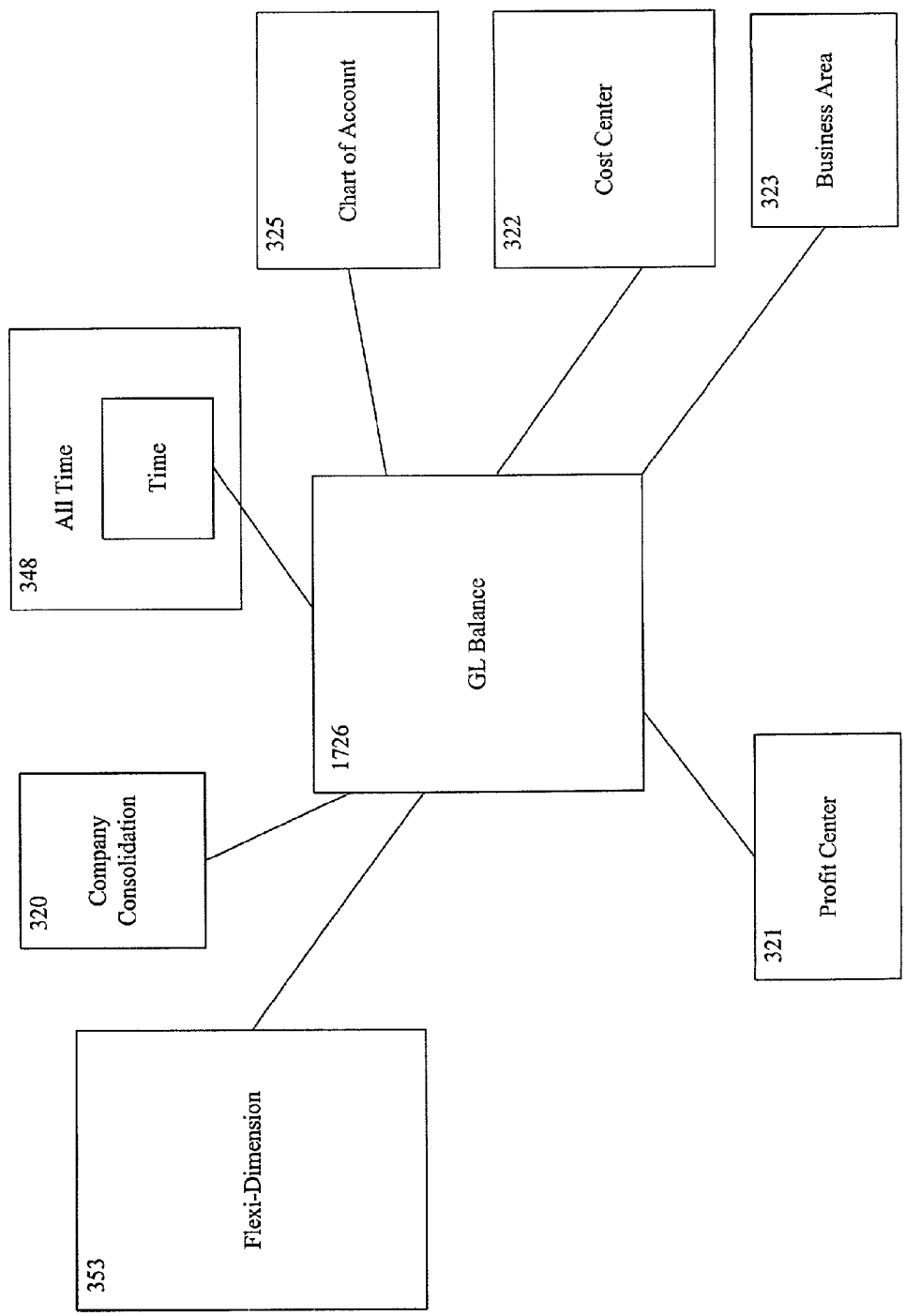
Figure 17S:
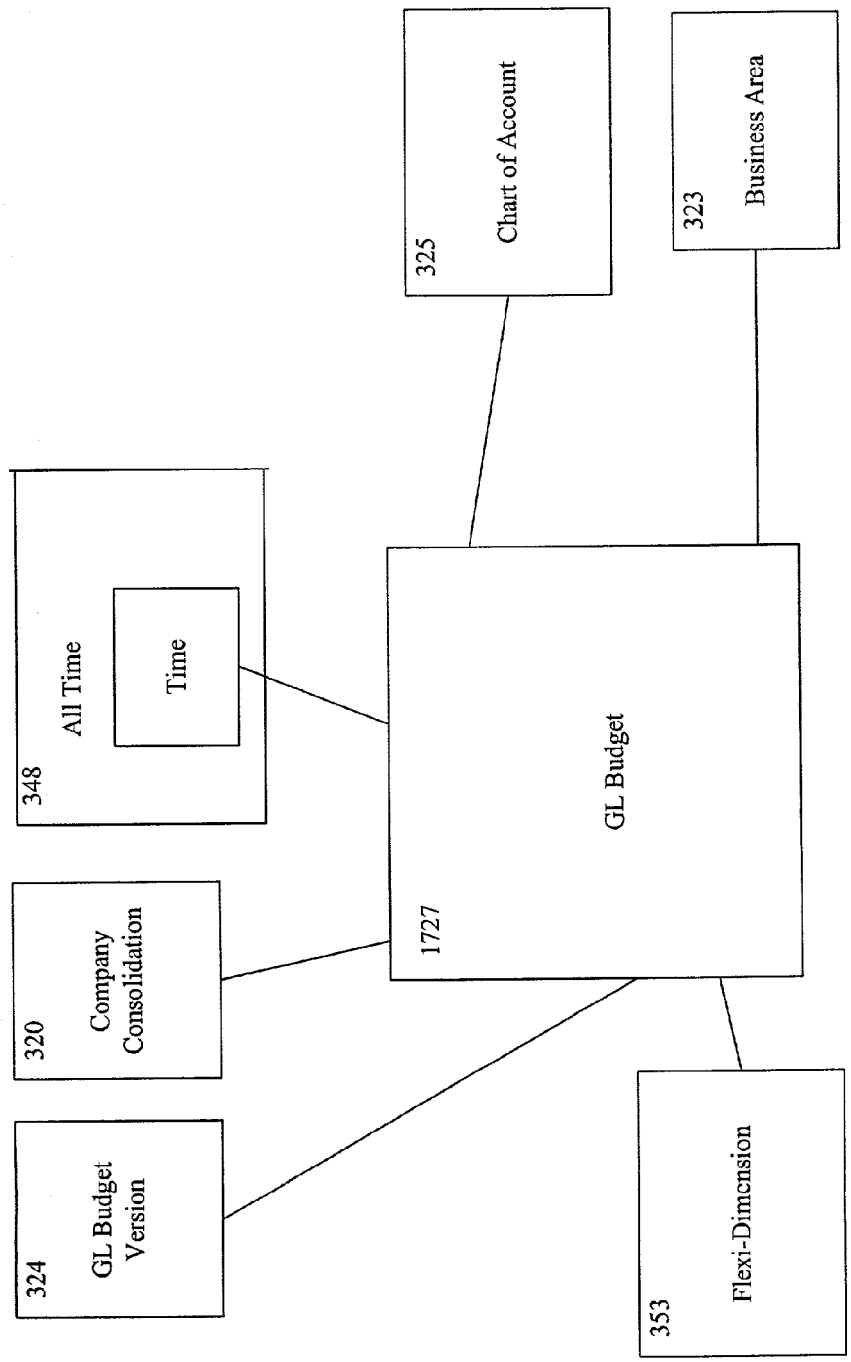
Figure 17T:
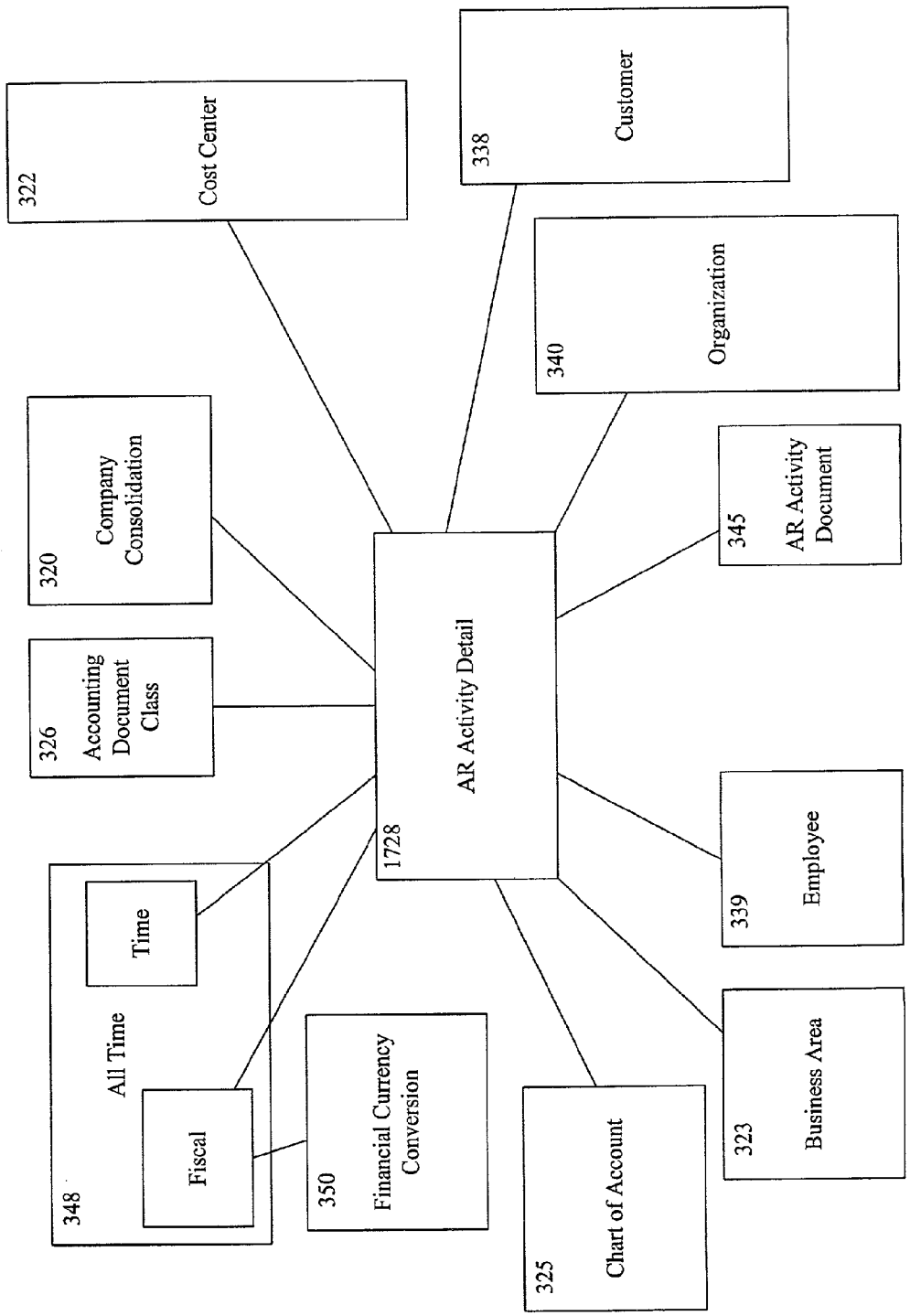
Figure 17U:
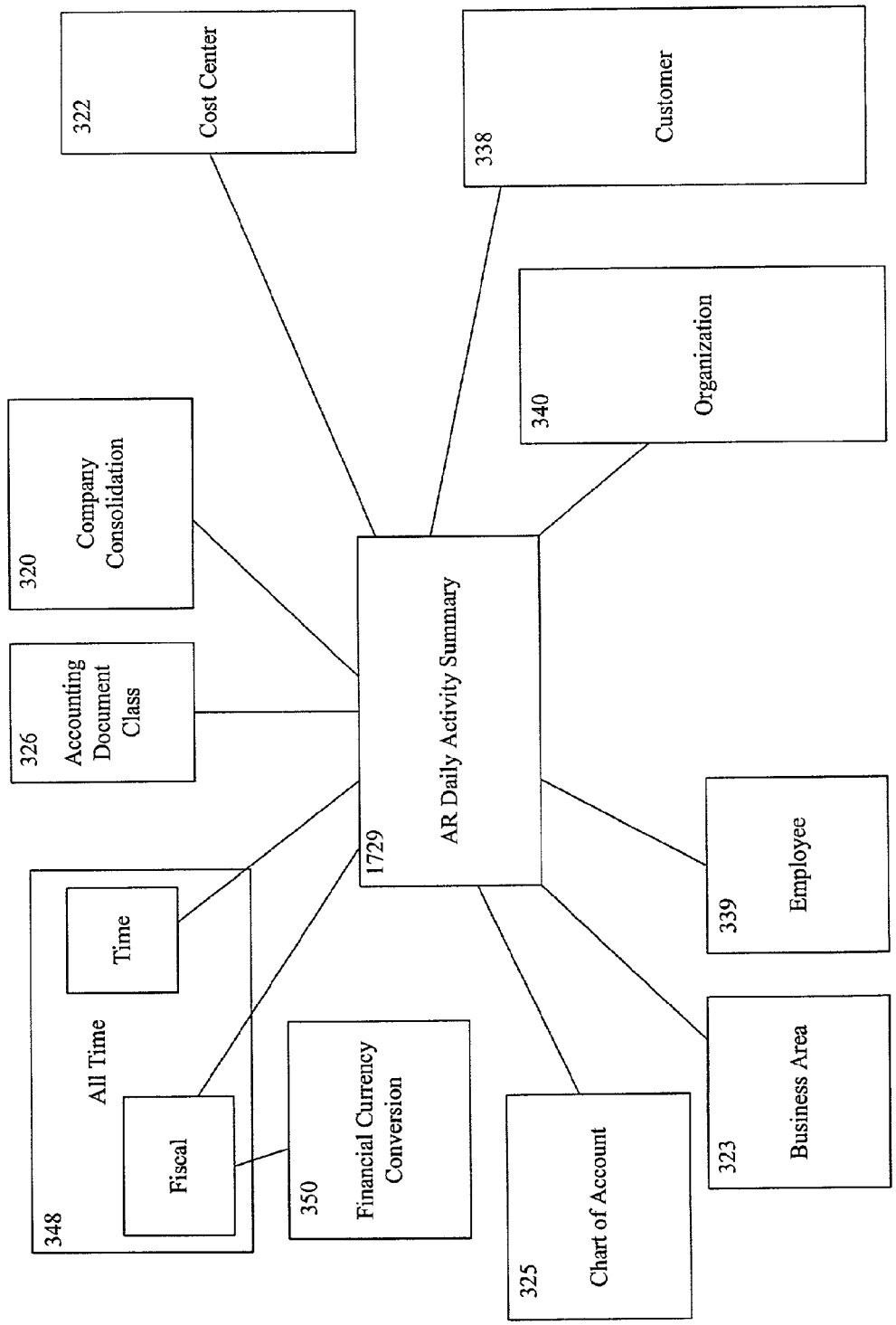
Figure 17V:
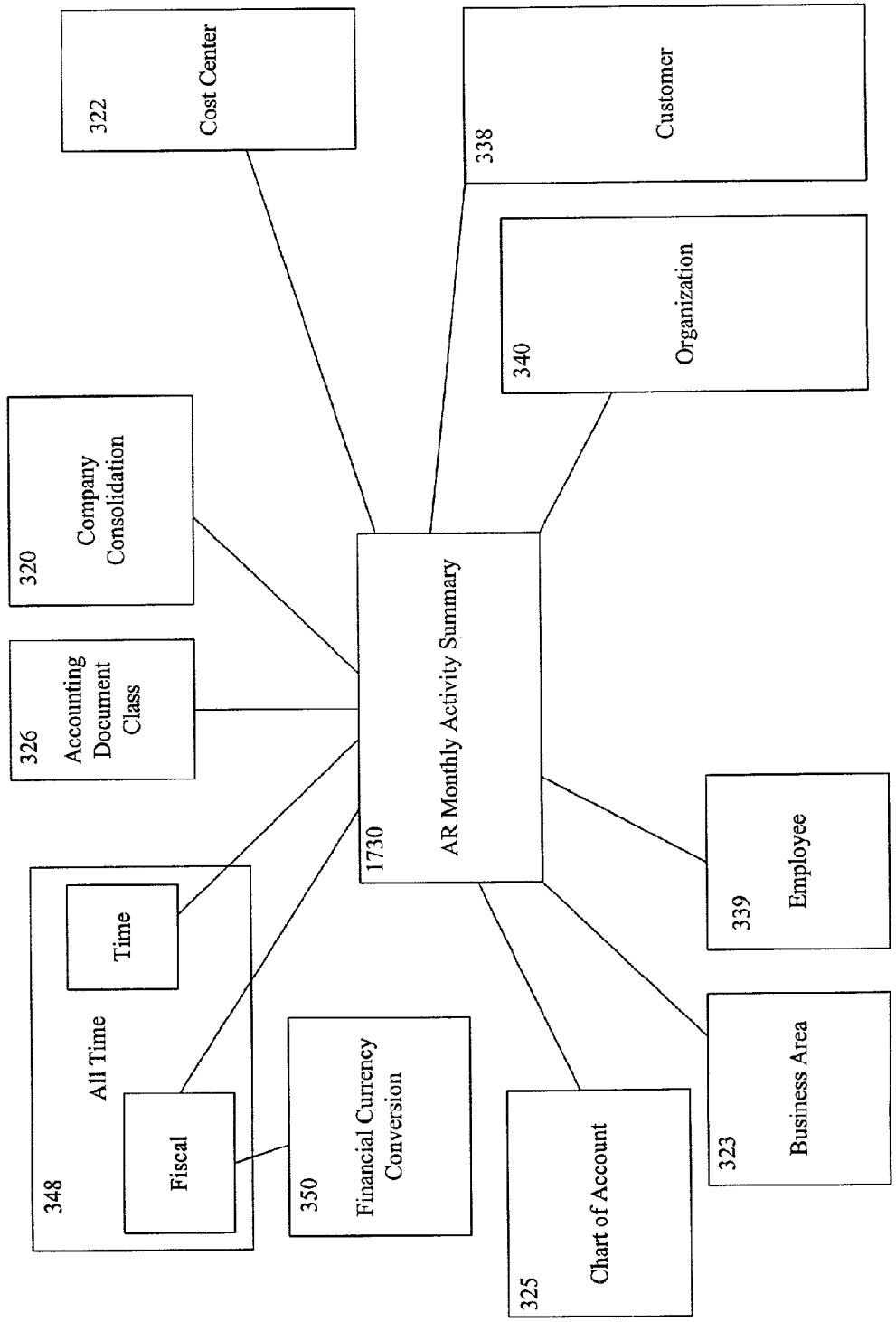
Figure 17W:
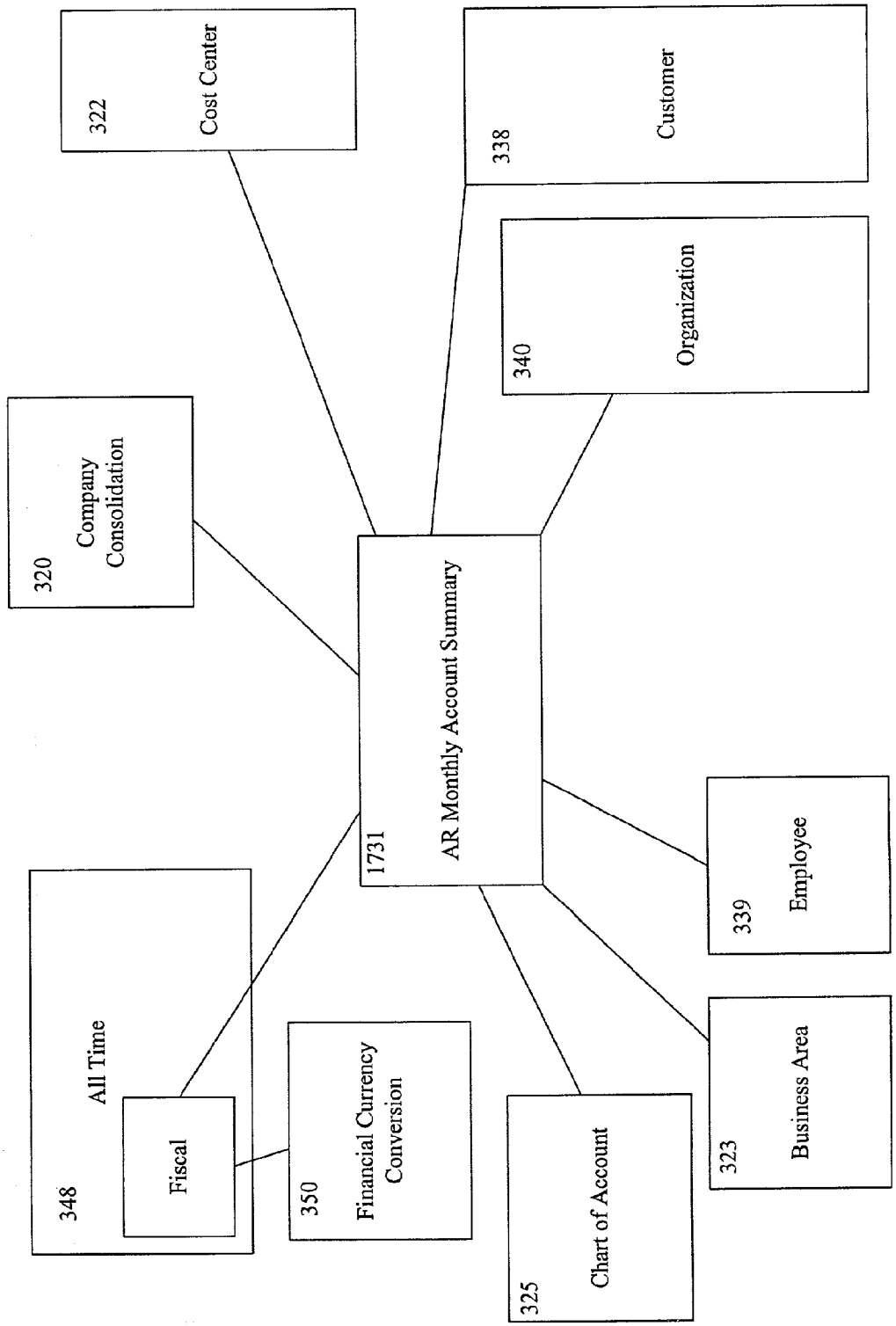
Figure 17X:
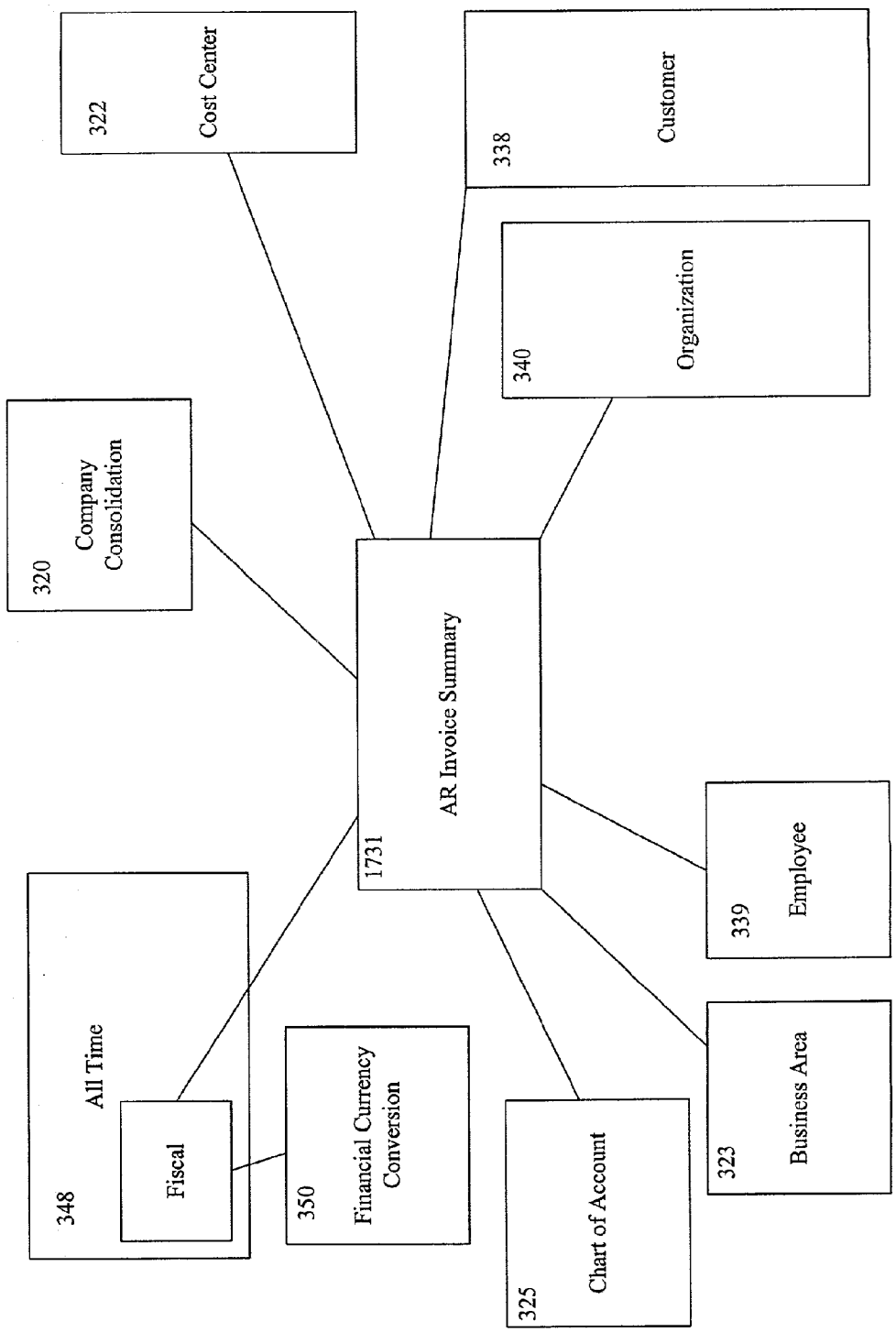
Figure 17Y:
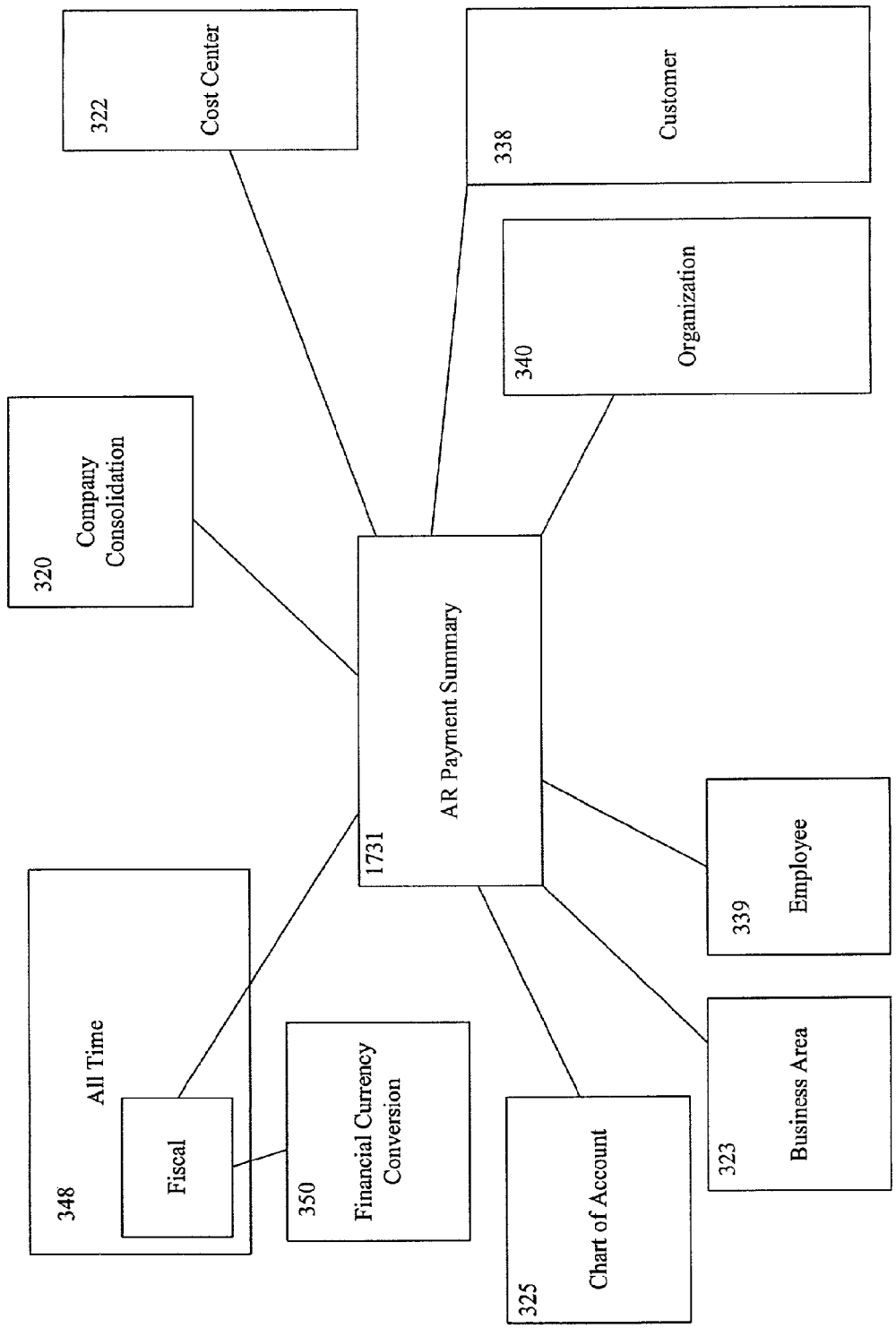
Figure 17Z:
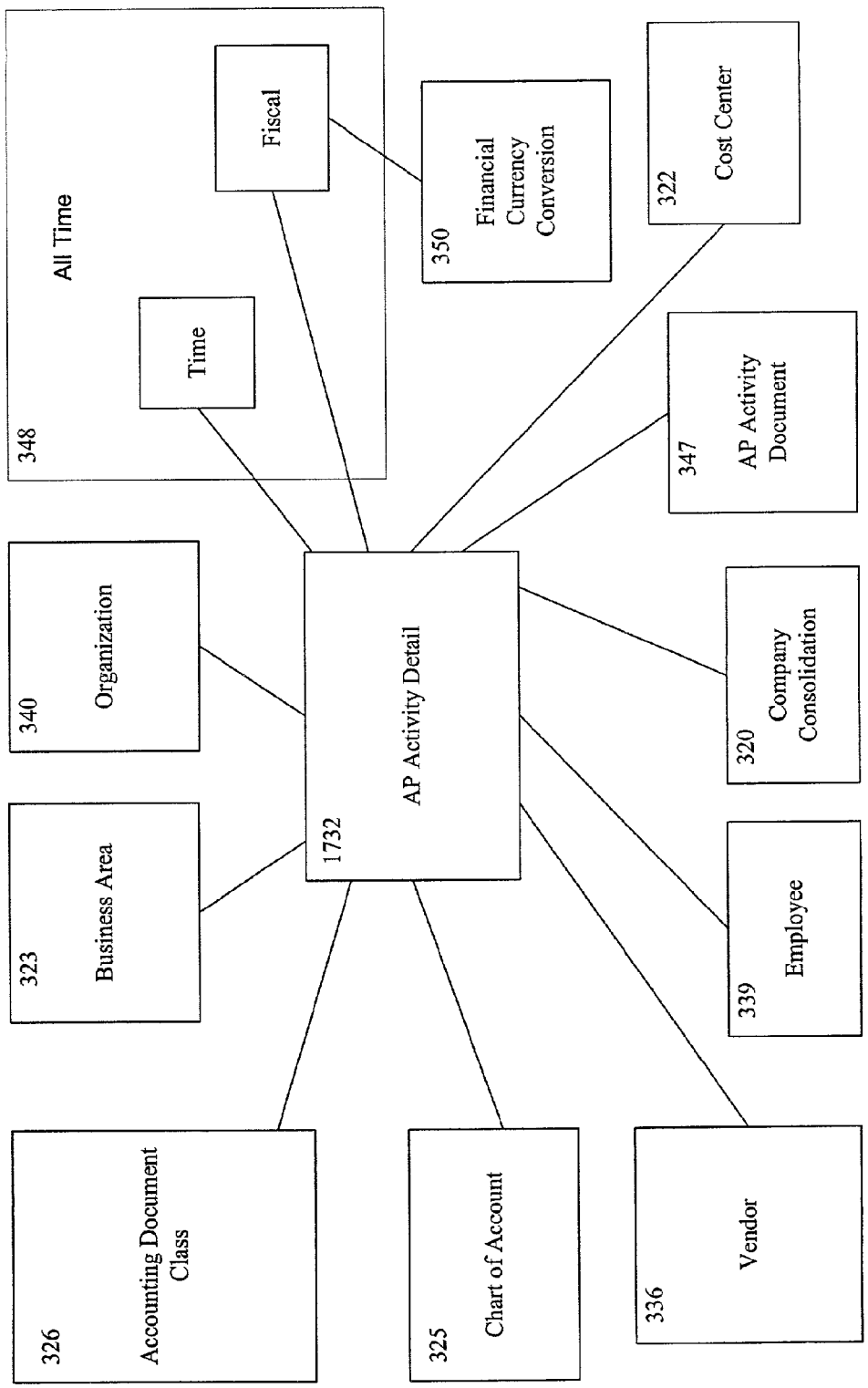
Figure 17A:
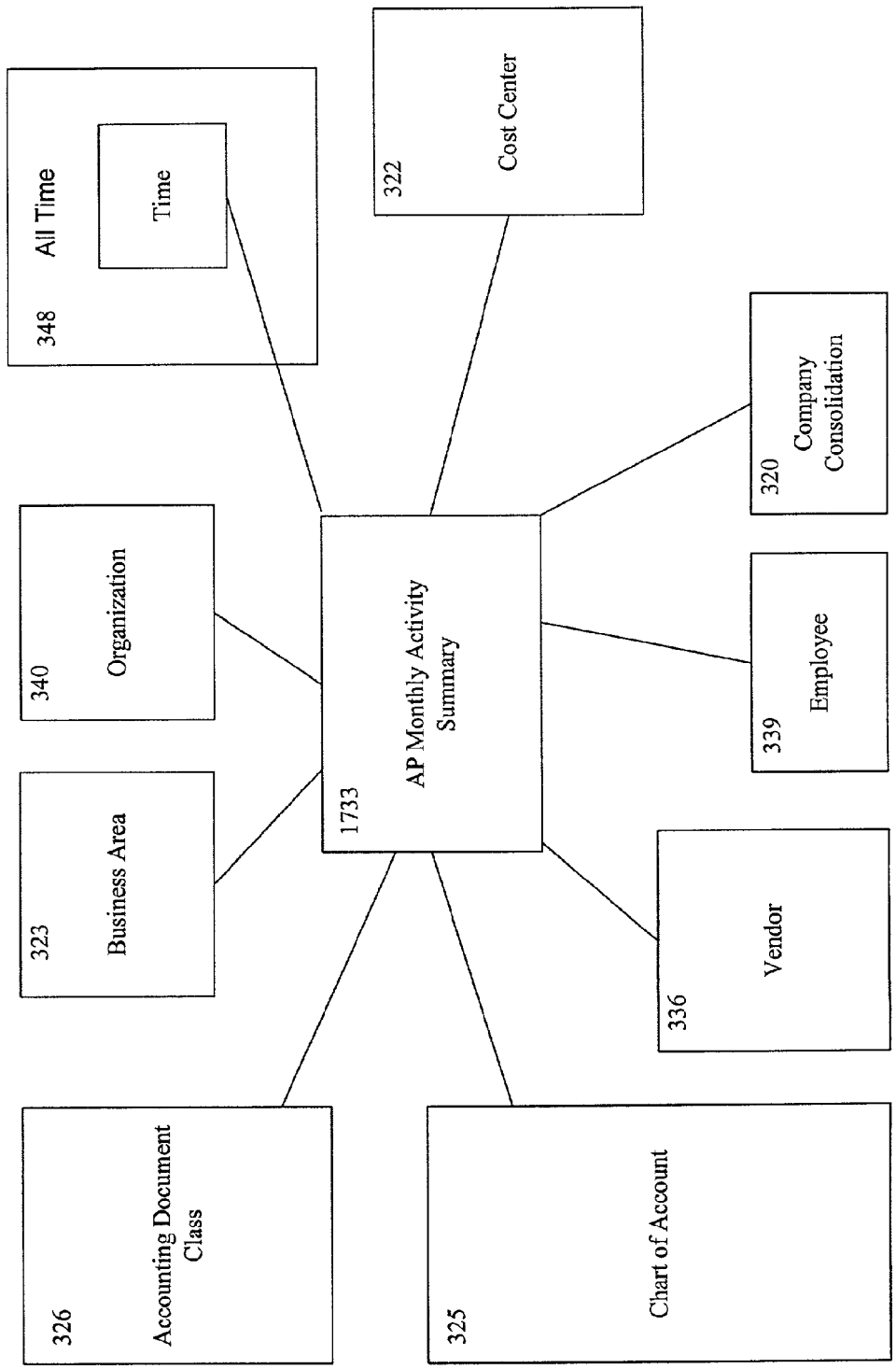
Figure 17A:
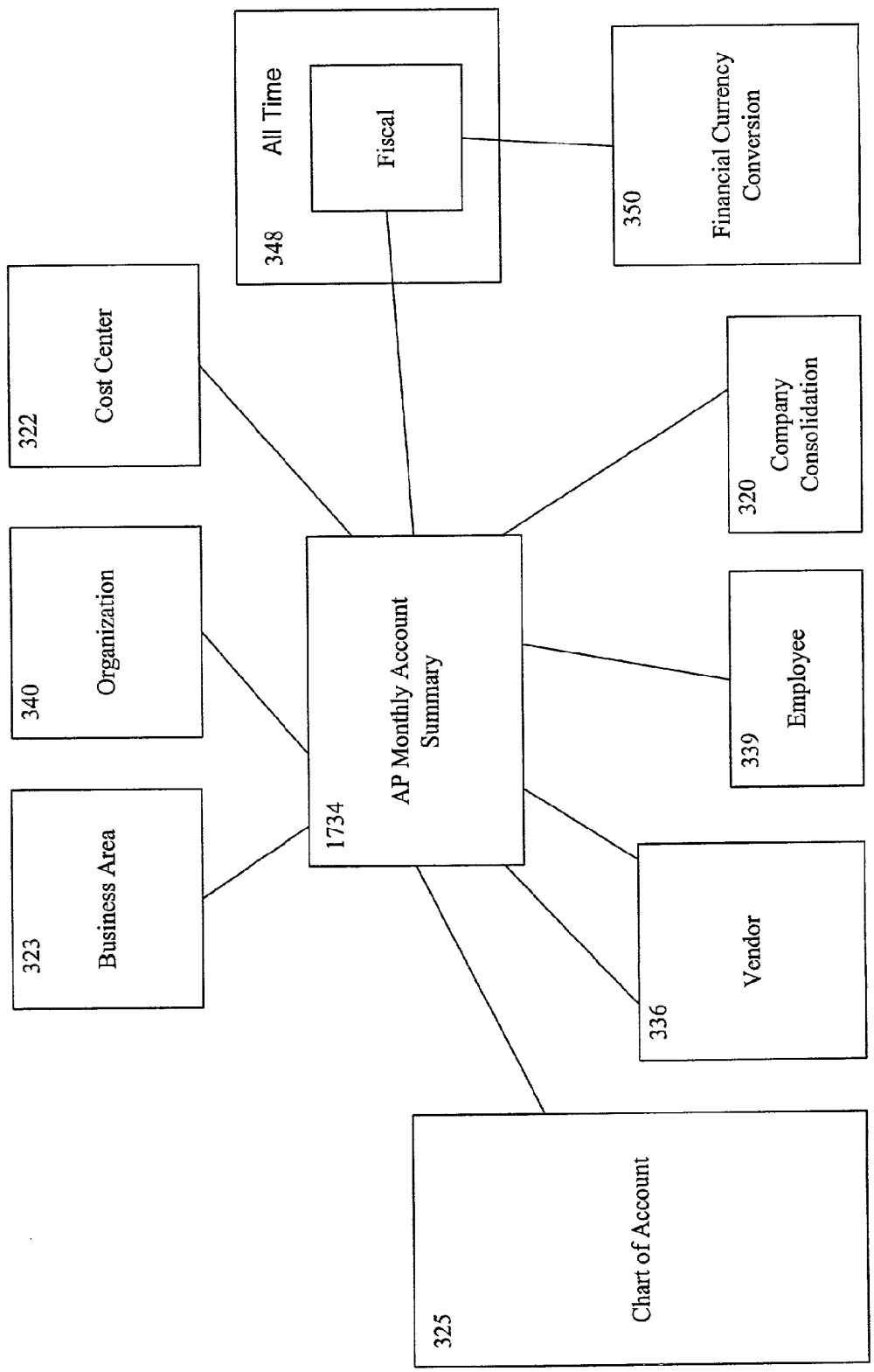
Figure 17A:
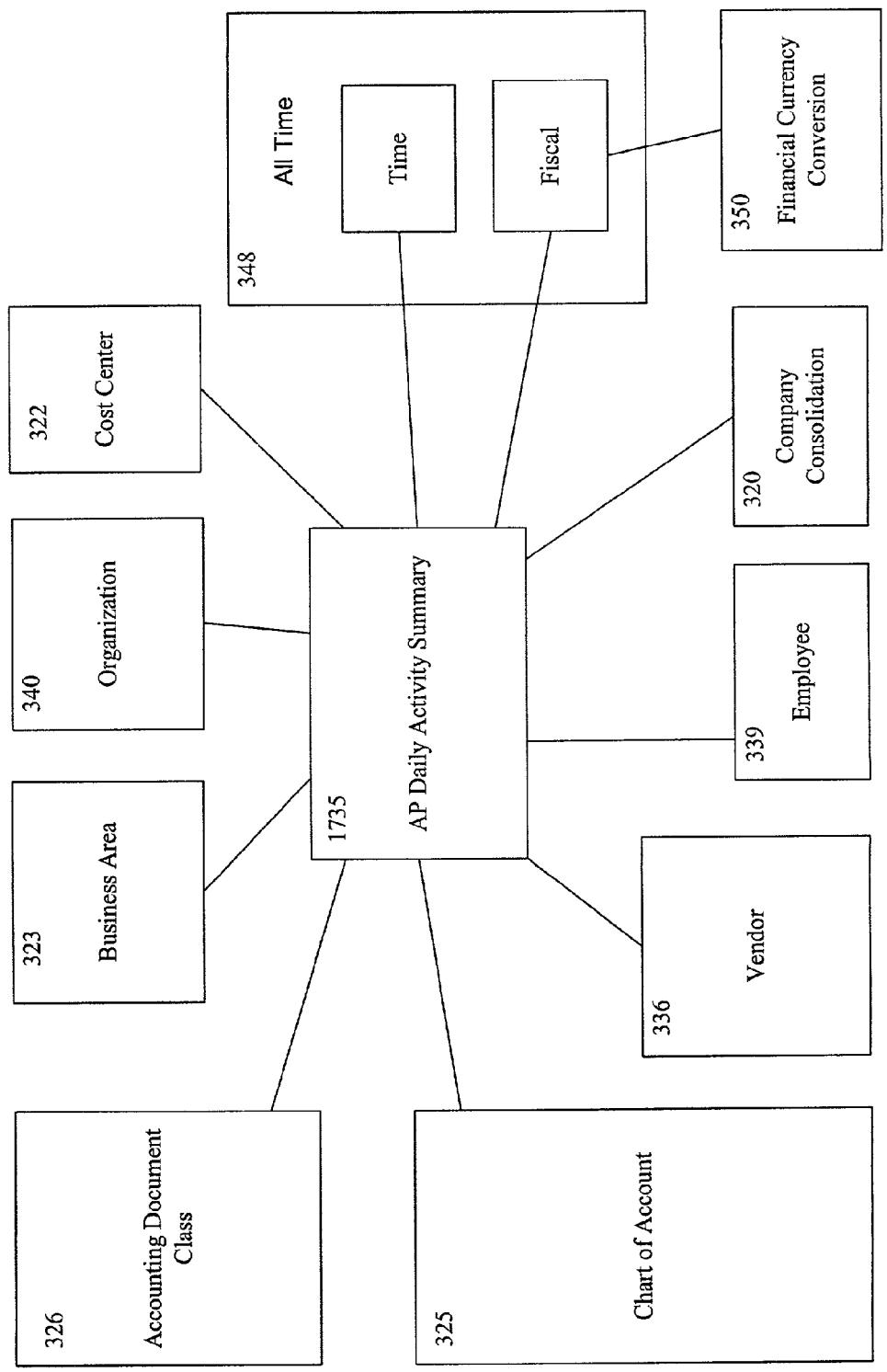
Figure 17A:
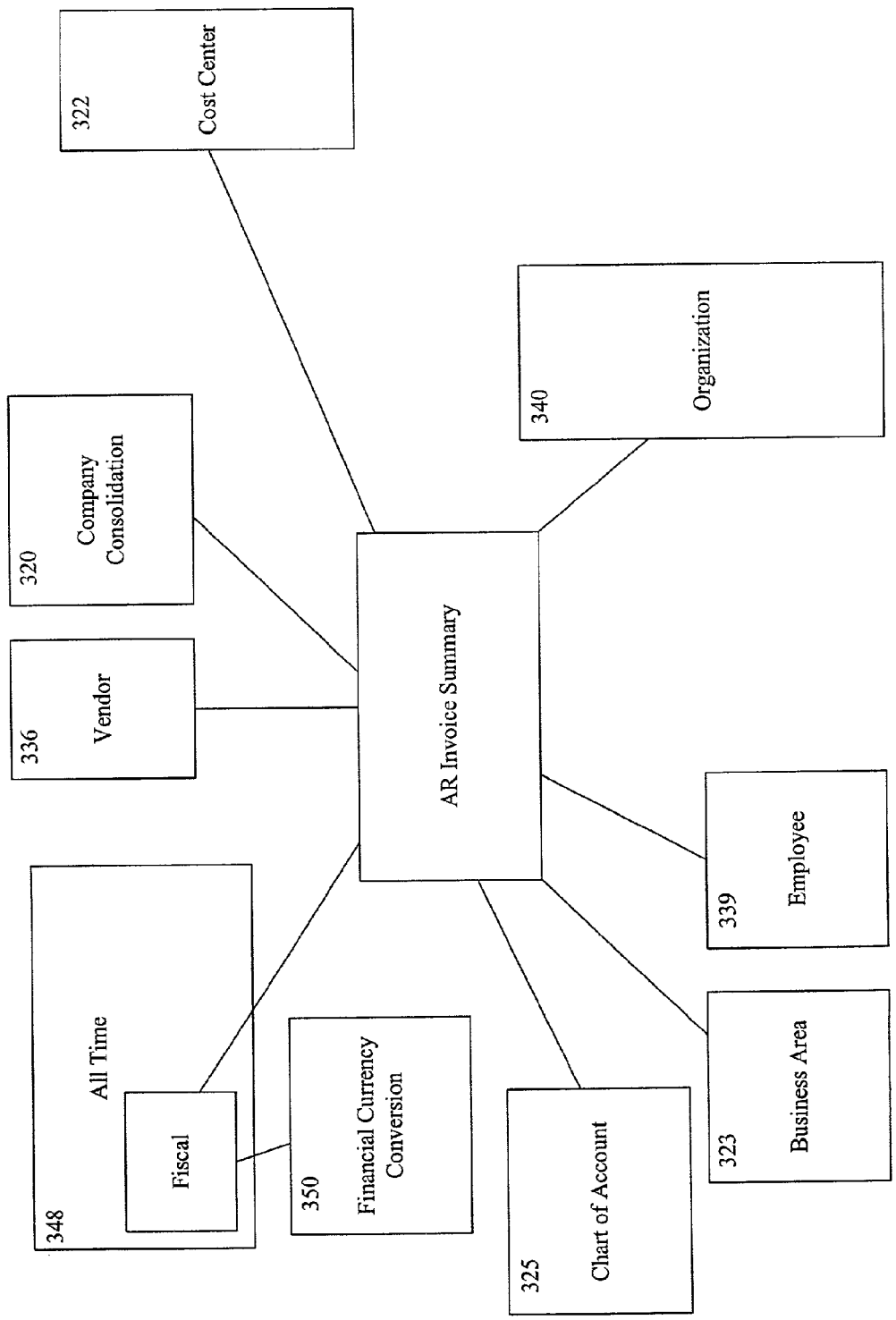
Figure 17A:
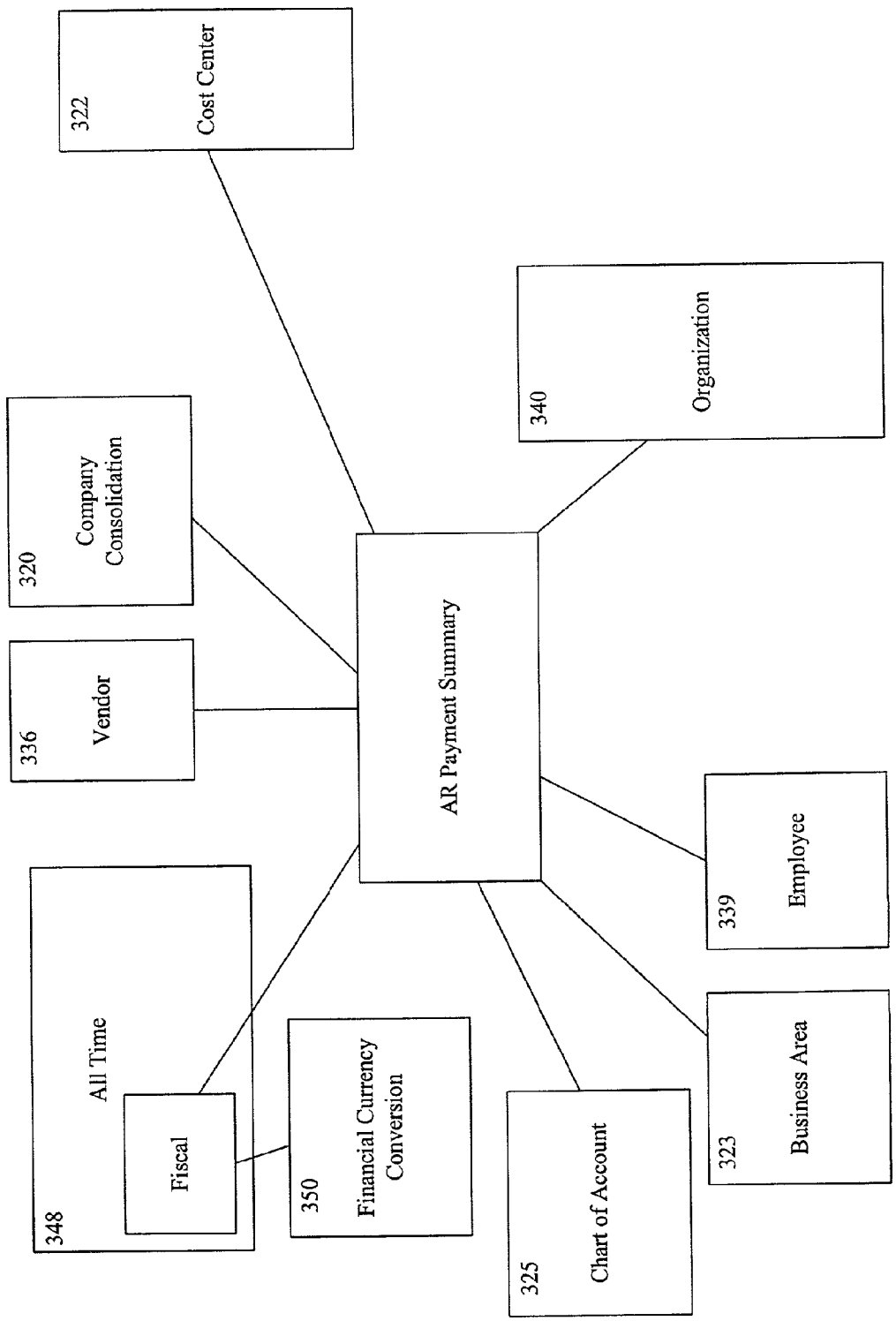

In this example, the fact tables are divided into six functional areas 202: sales analysis 901, AR analysis 902, GL analysis 903, AP analysis 904, inventory analysis 905 and procurement analysis 906. FIGS. 17A to 17AE show the individual star schemas for each individual areas of analysis 203 as reflected in the data model 120. The areas of analysis 203 of the functional areas 202 and their measures 111 are listed below.

The components of the data model 120 may be provided as part of a pre-packaged solution. Some components may be provided separately and integrated with other components of a data model 120. Each component of the data model 120 is designed from careful consideration of the dimensions 112 or measures 111 that are common to each functional area 202 of the business or organization. Based on common terms and common information, these dimensions 112 ensure that users in relevant departments approach business issues using the same references.

For example, the dimension "customer" 337 means precisely the same thing to a sales manager as it does to an inventory warehouse manager or a finance vice president. Without conforming dimensions, each department would likely develop different definitions, hierarchies, terms, and dimensions for many of the same business measures, an inefficiency that can sidetrack productivity and hamper decision-making Incorporating common dimensions 112 means that IT builds the tables (121 and 122) only once, less redundancy because data is stored once, and shorter time to update because updated data is loaded once. Moreover, multiple star schemas can leverage the shared dimensions 112 to reduce update time and resources. For example, updates occur once for a change to a dimension table 112 that is shared by five fact tables 121, not five times, which speeds the update process. In addition, common dimensions save disk space, reduce redundancy, and ensure that data is consistent from one data mart, or functional area of analysis 203, to the next.

The data marts, or functional areas of analysis 203, perform business performance management faster than traditional ERP 10 systems which distribute data fields among thousands of tables. Finding the fields that describe a given query in an ERP 10 system often requires joining copious tables, a time-consuming step that slows analysis and drains database processing power. The data warehouse system 100 incorporates a star schema architecture that accelerates query performance and produces fast business insight for high-speed analysis and reporting.

Star schema architectures contain two types of tables: fact tables 121 and dimension tables 122. A fact table 121 comprises the transaction history associated with each activity being modeled. These fact tables 121 store the numerical measurements of the business and include an ID field for each dimension that they represent. For instance, a sales fact table 121 might include fields for Customer ID, Sales-person ID, Product ID, Quantity Sold, Discount, and Total Amount, etc. The fact tables 121 are linked to several dimension tables 122 that qualitatively describe the fact table 121 fields in more detail. For instance, the Salesperson ID dimension table might include Salesperson ID, Salesperson Name, Phone Number, Sales Office, and Employee Number, etc.

This star structure, with the fact tables 121 surrounded by satellite dimension tables 122, allows users to drill down quickly into the data to uncover correlations between dimensions 112 and elements in the fact table 121. Forming queries involves a set of simple one-way joins, from the fact table 121 to each dimension 112, rather than complex multi-step joins through multiple levels of tables. Users 20 get the information they need quickly, allowing them to solve business problems, spot trends, or act on opportunities.

Traditional stovepipe data warehouse applications, such as traditional data marts, may serve certain departmental decision-making needs, but they fail to offer a variety of important enterprise-wide views. By incorporating common dimensions, the data model 120 allows knowledge workers to share information across departments and gain important decision-making synergies. Based on common terms and common information, common dimensions ensure that users in relevant departments or functional areas approach business issues using the same references.

To solve a business problem, sometimes decision-makers want to see transaction details, not just higher level summaries. For this reason, the components of the data warehouse system 100, which contain both relational and OLAP data, extract the most granular data from the source ERP 10 systems and use it to populate the data marts. Decision-makers may therefore access transaction-level detail and gain a micro view of the business issues at hand.

Offering detailed granularity takes pressure off the source ERP system 10 as well. Rather than query the production system every time they need to perform detailed analysis, decision makers may simply query the components of the data warehouse system 100 and glean the insight they desire.

One embodiment of the present invention provides a configurable dimensional framework to be used as a base for a data mart, multiple data marts, or an integrated data warehouse application 100, which offers the benefits of both data warehouses and data marts, i.e., the breadth of an enterprise-wide data warehouse and the luxury of incremental data mart implementation. This structure enables an organization to maximize the return on its ERP 10, e-commerce, and other source data system investments. Released from the analysis and reporting confines of ERP 10 systems, users 20 can now creatively explore business problems and make equally creative and effective business decisions.

Moreover, users may incrementally add data marts over time, expanding the integrated data warehouse system 100 at their own pace. Each new data mart fits seamlessly with its predecessors, extending the scope of the data warehouse system 100 to produce effective cross-functional business content, e.g., the fundamental information users need to understand their business drivers.

For example, if the inventory turnover rate suddenly dropped, users would want to know why. With an integrated data warehouse system 100 comprised of several subject-specific data marts, users could explore whether the root of the problem lies in sales or in inventory, perhaps the result of a change in the company sales compensation plan or a tightening of credit policy. By sharing the same conforming dimensions 112 (for instance, "product") in both the sales and inventory marts, users could generate these types of revealing cross-functional views. The result: enterprise-wide decision-making is improved.

The Connectors 140

The business driven extractions and source-to-target mappings are labeled as connectors 140 on FIG. 1. Business-driven extractions and source-to-target mappings incorporate business rules that unravel ERP systems 10 such as SAP R/3™, Oracle Applications™, and J. D. Edwards™, and are open to alternative sources.

A complex part of building a traditional data mart involves extracting the right data from the source system, transforming it into the desired form, and loading it into the data marts. To facilitate and expedite this process, a repository is built for the data warehouse system 100 connectors 140. The connectors 140 understand both the source ERP system 10 and the targets. This repository uses business rules to transform data from the ERP system 10 to the targets.

The data warehouse system 100 simplifies the complex process of extracting data from specific source systems such as J. D. Edwards, SAP R/3, and Oracle, overcoming the technical hurdles and addressing the unique characteristics involved in each system.

Extracting data may involve in-depth knowledge about the underlying source system. Traditionally, developers of data warehousing needed to know where the relevant data comes from and what the specific data structures look like. They also needed to know about the technical hurdles specific to their source systems 10. The data warehouse system 100 has functions to adapt to a variety of source systems. An embodiment is based on extensive experience with SAP, Oracle, and J. D. Edwards ERP systems 10. For example, SAP uses pooled and clustered table structures, Oracle provides "flex" fields, and J. D. Edwards maintains address books in a special way. Each system contains unique characteristics that affect data mart building. The data warehouse system 100 addresses these source features. This inherent source system intelligence of the data warehouse system 100 spares users 20 from having to spend time analyzing complex ERP and e-business systems.

In addition to speeding the extraction process, the connectors 140 incorporate safeguards to protect data integrity. As data comes across from the source system 10, the connectors 140 look for specific conditions. If these conditions are absent, the connectors generate an error log and lists the missing data, simplifying system administration and trouble-shooting. Missing data, incomplete data, or inaccurate data may degrade the quality of a business performance management solution and substantially hinder the business results.

To generate consistently high data quality, the connectors 140 contain transformation functions that format and integrate source data before it is stored in a data mart. This process might involve any number of functions: restructuring data files, records, and fields; removing superfluous data; decoding and translating field values to enhance data; improving data readability; validating data; calculating new values from one or more source columns; simplifying data; and changing data types. The transformation process may also reject records that do not satisfy business rules. As part of the transformation process, the data warehouse system 100 may employ surrogate keys that substitute for natural keys to improve processing performance.

Once the source data has been transformed, the data warehouse system 100 loads it into the destination data marts and make the data available to users 20 for analysis and reporting. The data model 120 may be considered as an abstract collection of data marts.

The components of the data warehouse system 100 may apply different updating rules to different tables depending on the nature of the component data. By tailoring the data-loading process to the data, the data warehouse system 100 updates information faster with less demand on the target system. For instance, tables defined as "static" contain data that changes infrequently and therefore needs refreshing only on an ad hoc basis. Tables that require more frequent refreshing can be treated differently as well, according to the characteristics of their data. Users 20 may perform a complete refresh, a changed-data capture, or a slowly changing dimension.

The data warehouse also includes stop-recover strategy, which allows extraction jobs that have been interrupted to be restarted. This feature saves administrators time and helps ensure data integrity.

To help ensure that an integrated data warehouse accurately captures changes to dimensions 112 that vary infrequently, such as product hierarchies, sales regions, and so on, the data warehouse system 100 may accommodate slowly changing dimensions. This feature offers two primary benefits. First, it may allow users 20 to go back and find out what was going on at a point in corporate history. In other words, although employees may have moved or sales territories may have been redrawn, the system 100 may present information about these slowly changing dimensions as they existed at the time of interest. This may allow users 20 to derive consistent, repeatable results, solidifying the value of their decision support system by preserving history.

Second, users 20 may see values or changes over time. This capability furnishes the insight to uncover longer-term trends and business impacts. If users 20 have incomplete historical information, they may end up making improper assumptions and compromising the quality of their decisions. Whereas ERP systems 10 may typically archive all but the most recent year or two's worth of data without access to supporting details, the data warehouse system 100 allows users 20 to dig into an issue's past several years or more to gain revealing perspectives about its present. This trend-analysis capability allows companies to track the impact of decisions over time.

In the data warehouse system 100, if a sales person transfers to a different region in mid year, the data marts may allow an organization to record the move and reflect the change in their database. Without record of this slowly changing dimension, a year-end revenue summary by region may allocate their entire year's sales to the new regional manager, overstating their accomplishments and understating the previous manager's performance. Companies that make decisions based on this type of misleading information may end up making incorrect assumptions and that can result in costly mistakes.

With slowly changing dimensions, the revenue that the sales person generated before their departure will properly accrue to the previous regional sales manager, and the revenue that they generate after the move will be credited to the new manager. Over time, certain dimensions such as employees, products, and customers may change, and the data warehouse system 100, by creating another dimension record, has the flexibility to accommodate these changes and produce an accurate view of business performance.

The data warehouse system 100 handles slowly changing dimensions so that the integrated data warehouse accurately captures infrequent but important data changes. Users 20 can rely on the integrity of the data.

The data warehouse system 100 may also include changed-data capture, the capacity to periodically update the data marts with current information without rebuilding them from the ground up. Changed-data capture detects new, modified, or deleted records in source systems 10 and updates the data marts with those changes.

To improve updating speed, the data warehouse system 100 splits the changed-data capture function into two. One inserts new data incrementally in bulk, a quick and efficient approach that eases the pressure on processing resources. The other step updates changes to existing data, a process that involves going into the database, finding the modified row, updating it, and then saving the change. Given that changes are less voluminous than new data, the data warehouse system 100 handles the majority of updating with the more efficient and speedier process. Updating may therefore be conducted successfully even in the face of continually shrinking update windows.

To further its efficiency, the data warehouse system 100 may look only at the data that has changed in the ERP system 10. Recognizing the date and time of the last update, the ETL tool 140 requests only records from that update forward. Asking what records have changed and determining whether the changed records are of interest may filter this subset further. This approach demands far fewer CPU (central processing unit) resources than may be required to extract all the ERP 140 data, to compare it to the data mart, and to load the difference; a process that would involve examining every row in the ERP 140 system. Consequently, changed-data capture improves system performance and speeds updates. Changed-data capture allows users to periodically update data marts without reloading them from scratch.

The Operational Framework 130

The operational framework 130 of the data warehouse system 100 reflects how the data warehouse system 100 may be productized. The operational framework 130 allows the administrator 21 to:

Customize the data warehouse system 100 to reflect their unique ERP 10 environment;
Controls the operation of the data warehouse system 100 in a production environment, and contains a component which includes stop-recover strategy; and
Handles exceptions during data mart updates.

The operational framework 130 provides functionality that makes the data warehouse system 100 responsive to the variations of ERP 10 implementations. The operational framework 130 uses information stored in the operational framework schema to adjust the business-driven extractions and source-to-target mappings business rules of the connectors to reflect the requirements of the particular ERP 10 implementation. The operational framework 130 uses information stored in placeholders in the operational framework schema to determine the status of the extracts that load the data mart and to determine what new data needs to be extracted to the data mart.

The data warehouse system console 133 employs easy-to-use configuration parameters to help administrators 21 tailor components of the data warehouse system 100 to their environment. As has been stated above, the system console 133 assists in the configuration of the dimensional framework.

As has been described, the operational framework may include a configuration unit 135. An administrator 21 may likely customize their SAP, Oracle, or J. D. Edwards source system. If so, their hierarchies, hierarchy types, status codes, charts of accounts, exchange rates types, and other fields may differ from the source system defaults. The system console 133 has parameters which help users configure the data warehouse system 100 to reflect these changes. This convenience saves an administrator 21 effort, speeds configuration, and delivers business performance management value faster.

Figure 18:
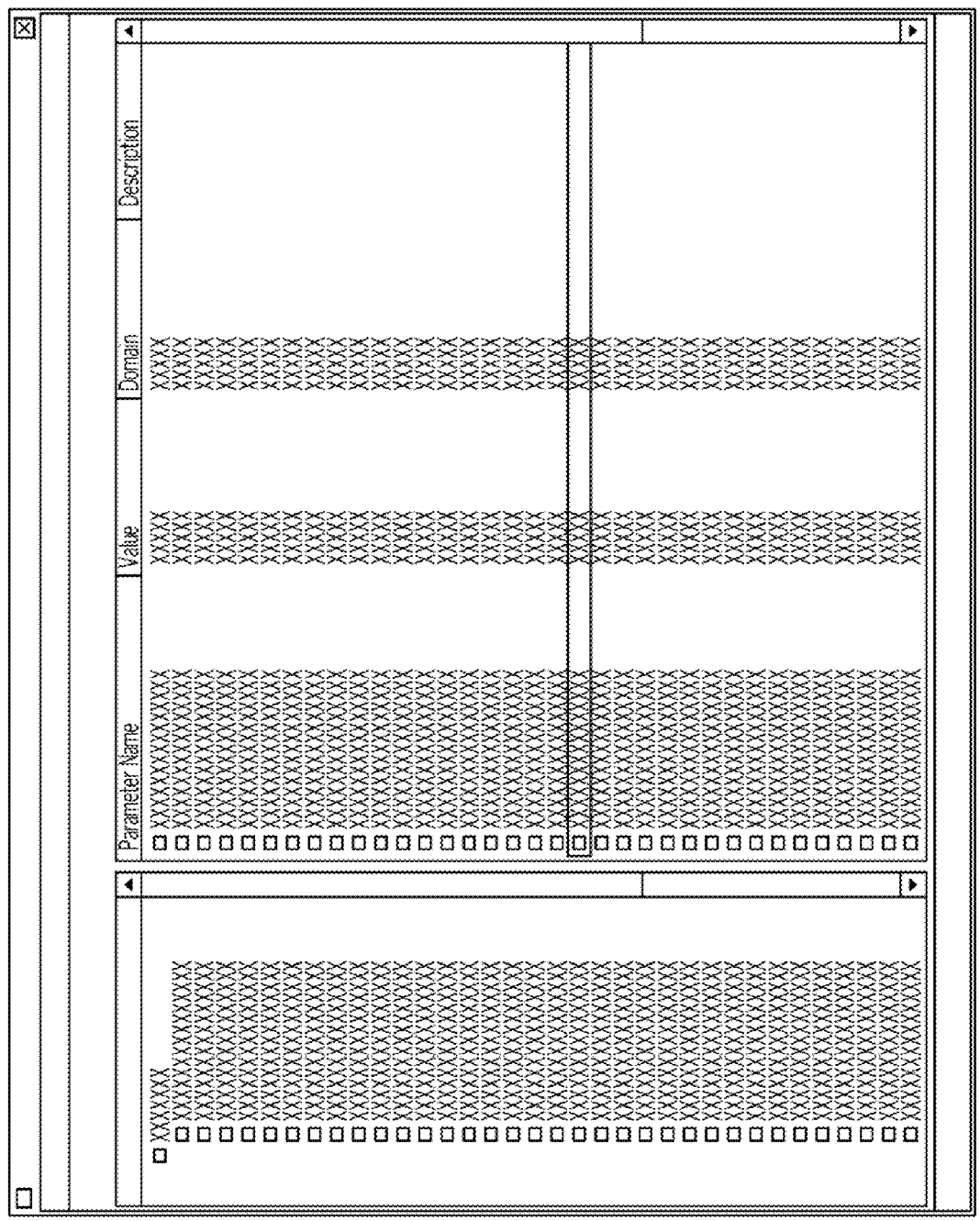
FIG. 18 is a screen shot of a data warehouse system console.

FIG. 18 is a screen shot of the system console 133 which enables administrators 21 to augment the data warehouse system 100 to reflect their particular implementation through configuration parameters. The system console 133 matches the configuration to the user's 20 target database and equipment. For example, whether Oracle RBDMS™ or Microsoft SQL Server™ on NT or Unix platforms are used, the data warehouse system console 133 may tailor its implementation to the physical environment.

The system console 133 enables users to import historical ERP 10 data at a pace convenient to their business. This initial load job may take a long time, a potential problem if administrators 21 attempt to import all this data during a single extended window. Using the system console 133, however, administrators 21 may schedule the loading to occur in phases which users set and populate the data marts during slow network activity periods. This convenience avoids saddling users with degraded network performance while the loading occurs.

Administrators 21 may also use the system console 133 to simplify the ongoing ETL processes 140. It may help administrators 21 sequence jobs and determine which are to run, what data they are to extract, and when they are to run (i.e., date ranges). The system console 133 may also enable administrators 21 to run ad hoc jobs or put scheduled jobs on hold.

Moreover, the system console 133 may equip administrators 21 to maintain their system. In the data warehouse system 100, administrative tables within the relational database store information pertaining to the system's 100 operation. The console 133 uses this information to generate job status reports and error reports, giving administrators 21 a firm handle on their system at all times.

The engine behind the data warehouse system 100 resides within the system console 133, an easy-to-use production control environment that simplifies the up front installation, configuration, and loading of the data warehouse system 100. It also makes maintaining the data marts easier once they are up and running Administrators 21 may use the system console 133 to set extraction sequences, and establish dependencies and priorities. It may also enable organizations to implement co-ordinated analytic applications incrementally and manage them centrally.

Figure 19:
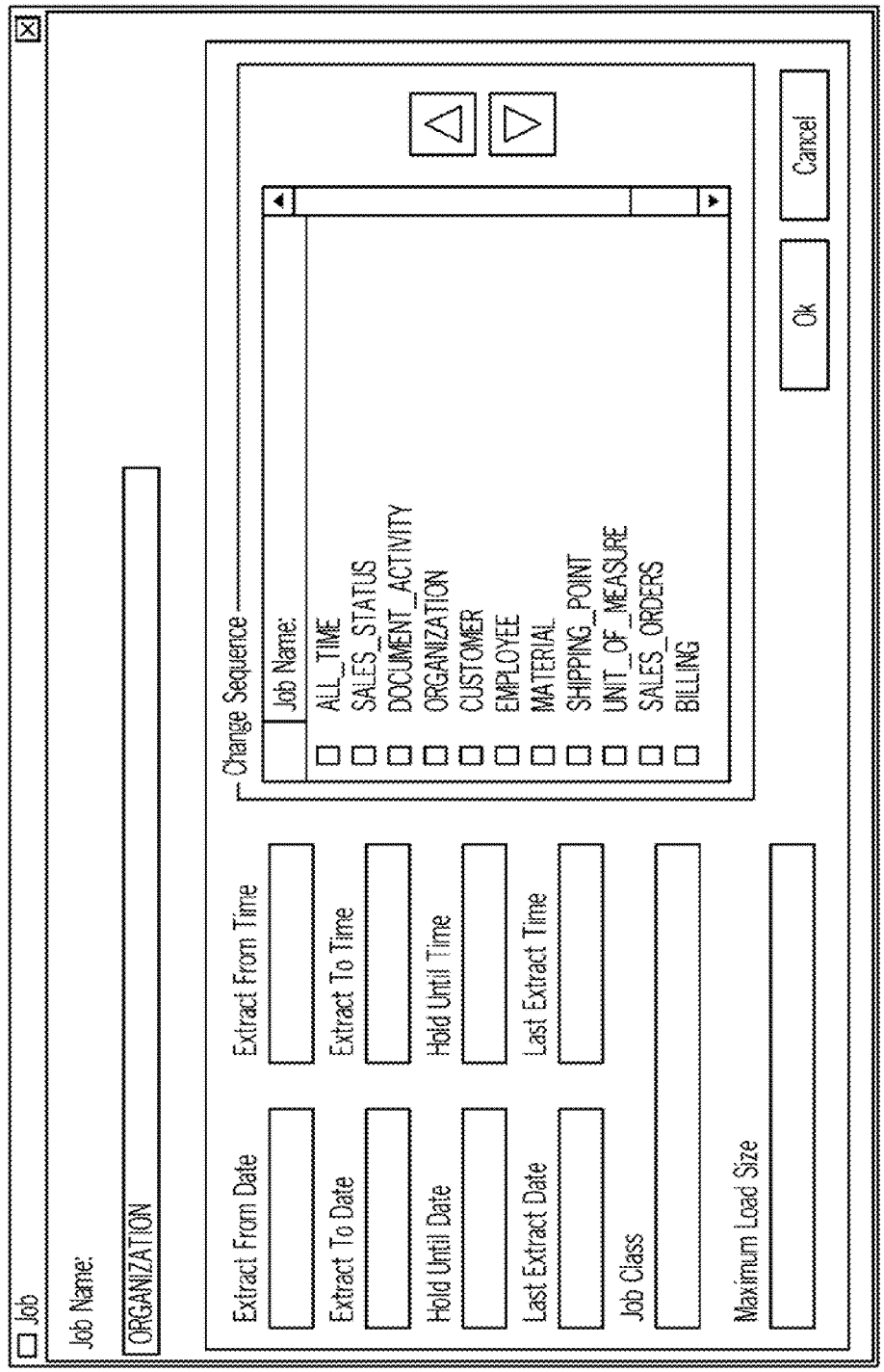
FIG. 19 is another screen shot of a data warehouse system console.

As has been stated, the system console 133 may be considered part of the operational framework 130. The system console 133 provides intelligent connector 140 job control for ad hoc or scheduled data loads, sequences extraction jobs, and defines extract dates. It allows an administrator 21 to set configuration parameters so that the data warehouse system 100 reflects ERP 10 site-specific configurations. FIG. 19 is a screen shot of the system console 133 that manages connector 140 processes automatically.

The Content Explorer 150

The data warehouse system 100 may also provide packaged reports, OLAP cubes, and catalogs 151 that offer business insight and reflect the information and KPIs used to manage, measure, and improve business performance in each functional area. These reports may be included in the content explorer 150.

Users 20 may generate an array of reports, such as OLAP, relational, standard, ad hoc, time trend, etc., to meet information requirements, for positions in the organization. Moreover, these reports are also easy to change. Decision makers can easily adapt them to manage, measure, and improve business performance in their functional areas, greatly reducing the burden on IT. Either way, knowledge workers gain key business insight and derive immediate productivity gains.

Furthermore, the data warehouse system 100, which may be extended to include scorecarding and visualizations, provide the right report for the right users on the client platform of choice: e.g., Windows, Excel, or Web browser, whether users are LAN-based or working remotely.

Figure 20:
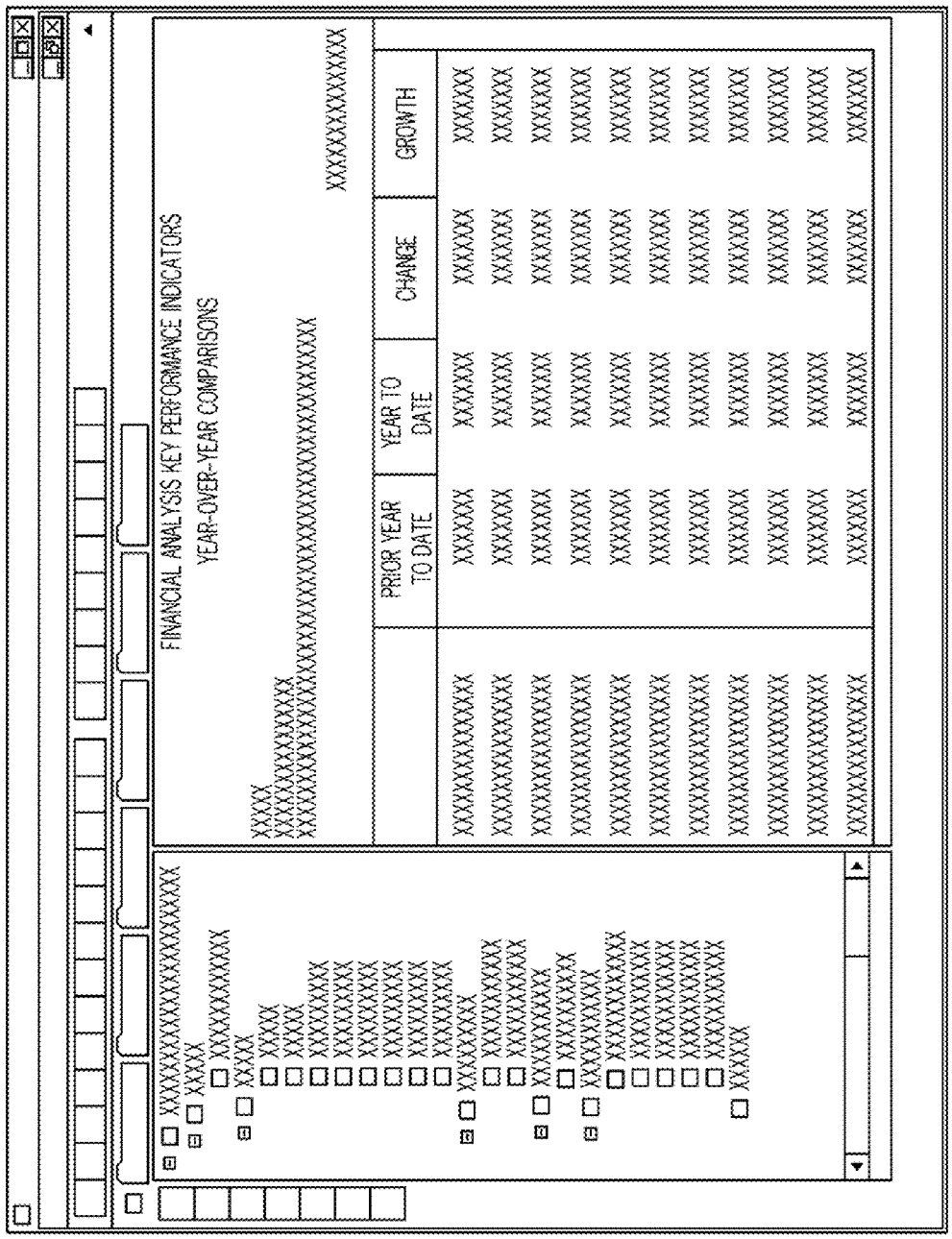
FIG. 20 is a diagram showing a screen-shot of financial analysis in a data warehouse application.

The data warehouse system 100 contains a number of packaged reports that reflect the business requirements for important areas such as finance, sales, and inventory. FIG. 20 is a screen shot of an example of a report of the financial (or GL) analysis 403 functional area. This report helps speed reconciliations, period-end closings, and financial reporting and distribution by giving managers the information they use to analyze income statements, balance sheets, cash flows, key financial ratios, or currency rate conversions.

Types of financial reports available to end users include:
Overview reports, such as income statement and balance sheet;
Income statement analysis;
Balance sheet analysis;
Budget analysis;
Analysis by legal entity;
Analysis by management entity; and
Operational reports, such as cost center and GL Analysis 303.

Figure 21:
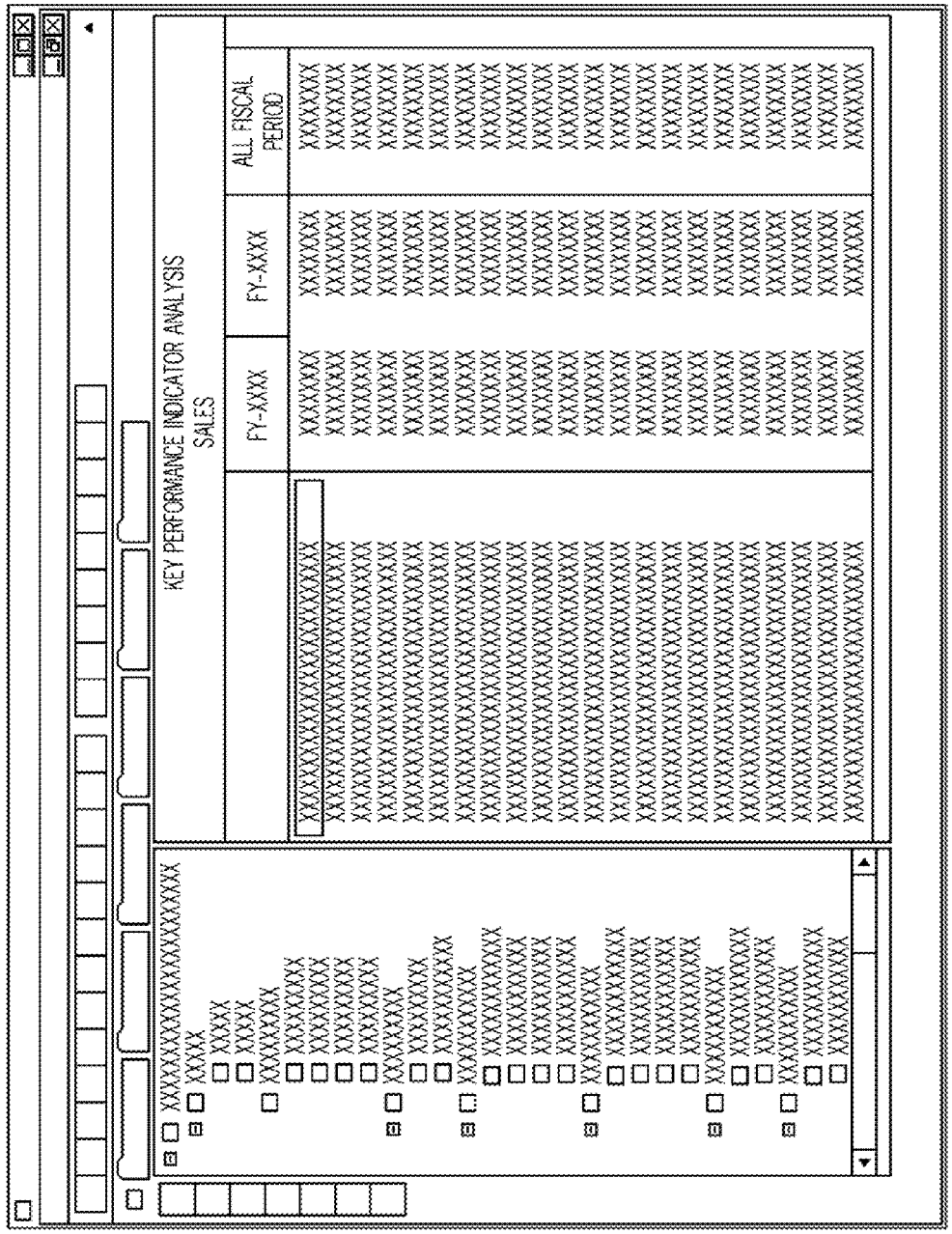
FIG. 21 is a diagram showing a screen-shot of sales analysis in a data warehouse application.

FIG. 21 is a screen shot of an example of a report of the sales analysis 401 functional area. This report allows users to analyze forecast accuracy and sales volume, calculate average deal size, and examine revenues and profitability, etc.

Types of sales reports available to end users 20 include:
Reports by customer, such as customer sales ranking or customer sales by region;
Reports by product, such as order summary, or product sales ranking;
Reports by sales organization, such as orders by reps or by country;
Reports by profit; and
Reports by quantity sold.

Figure 22:
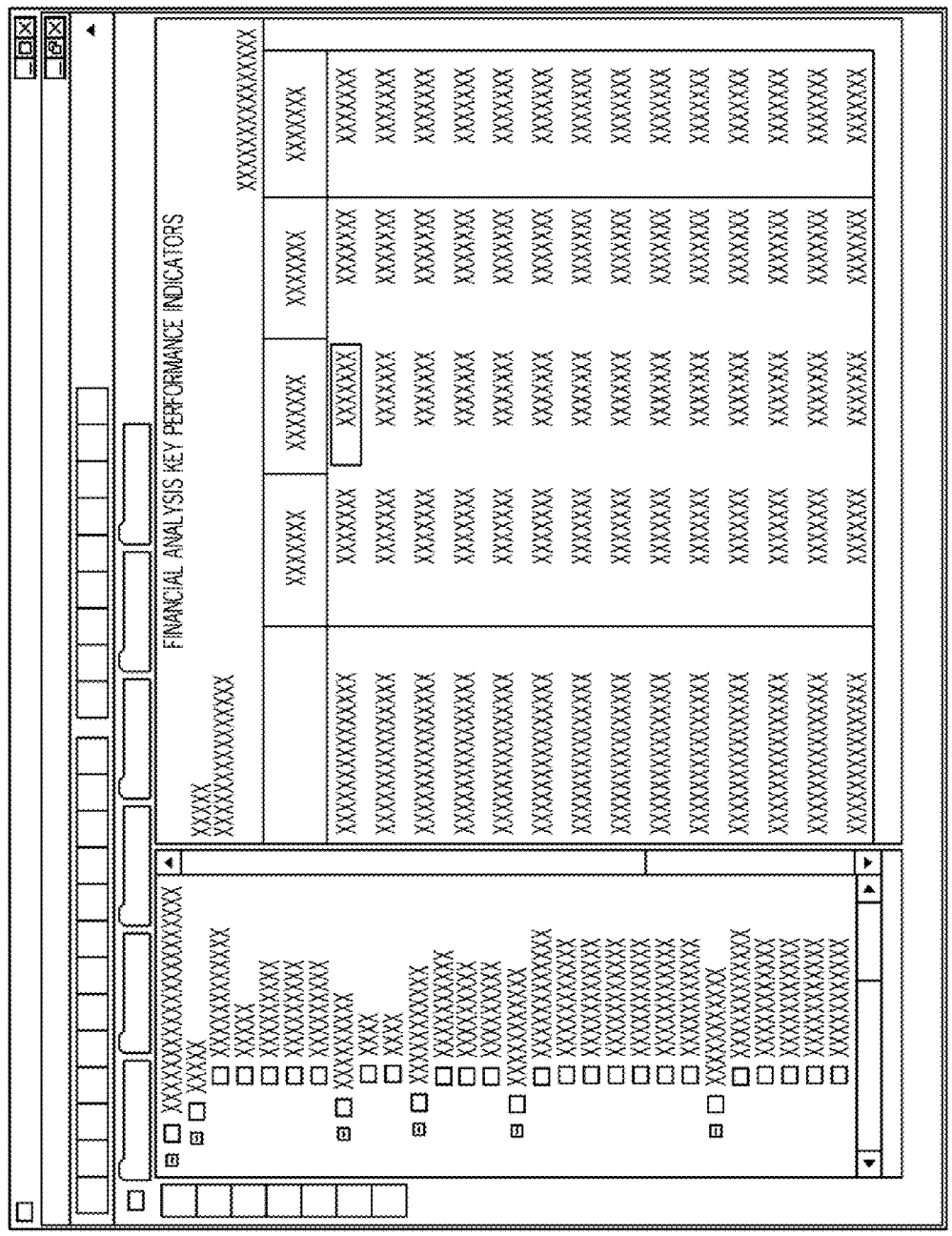
FIG. 22 is a diagram showing a screen-shot of inventory analysis in a data warehouse application.

FIG. 22 is a screen shot of an example of a report of the inventory analysis 405 functional area. This report provides inventory managers with the information they use to understand supply chains and assess demand forecasting accuracy, inventory carrying costs, supplier performance, and warehouse performance, etc.

Types of inventory reports available to end users include:
Inventory performance, such as stock level overview or profile of plants by stock level;
Demand analysis, such as stock usage comparisons, or materials profile of demand;
Material tracking;
Vendor analysis by stock movements; and
Resource activity, such as activity comparisons or plant/employee analysis.

Figure 23:
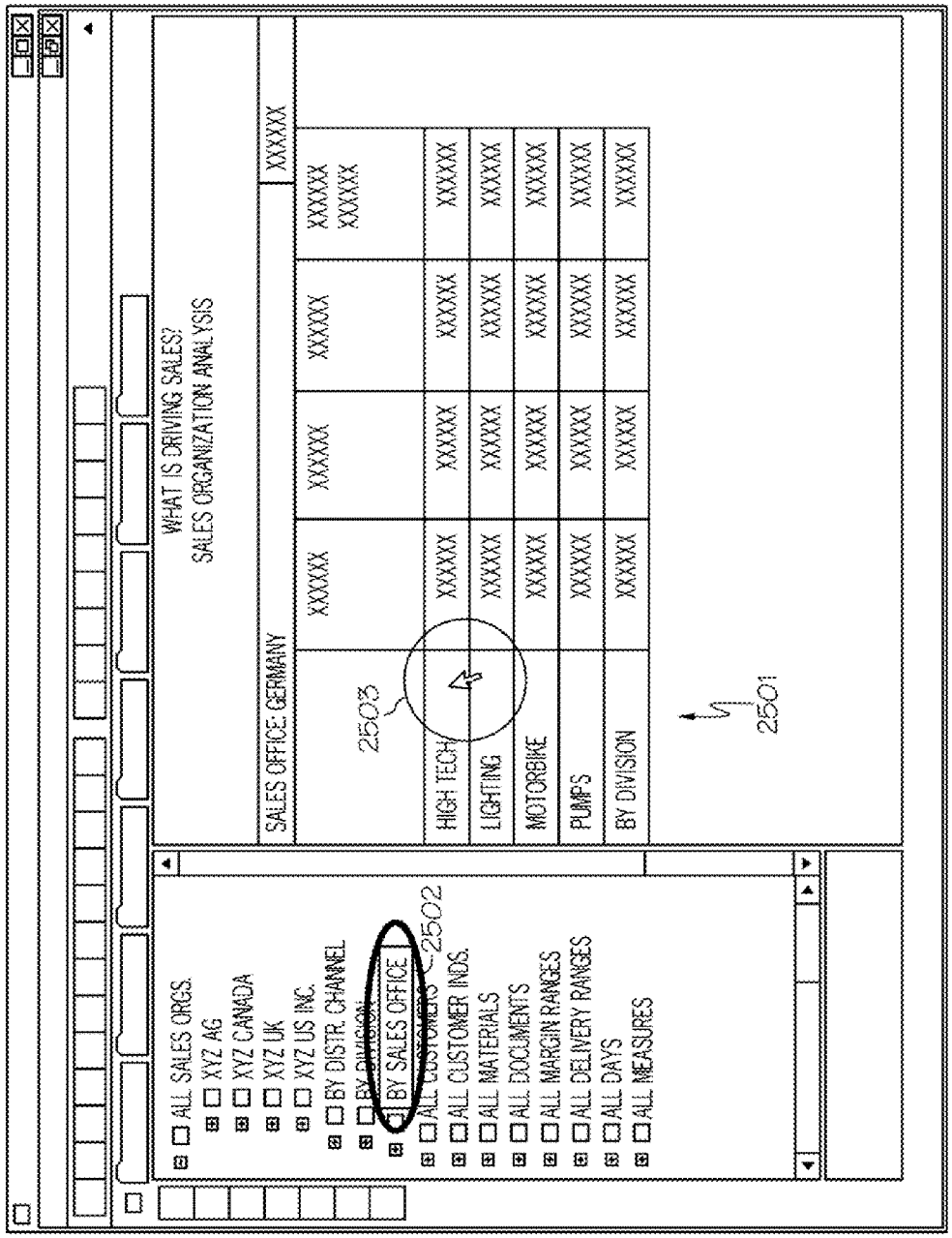
FIG. 23 is a screen shot illustrating a step of generating a report in a data warehouse system.
Figure 24:
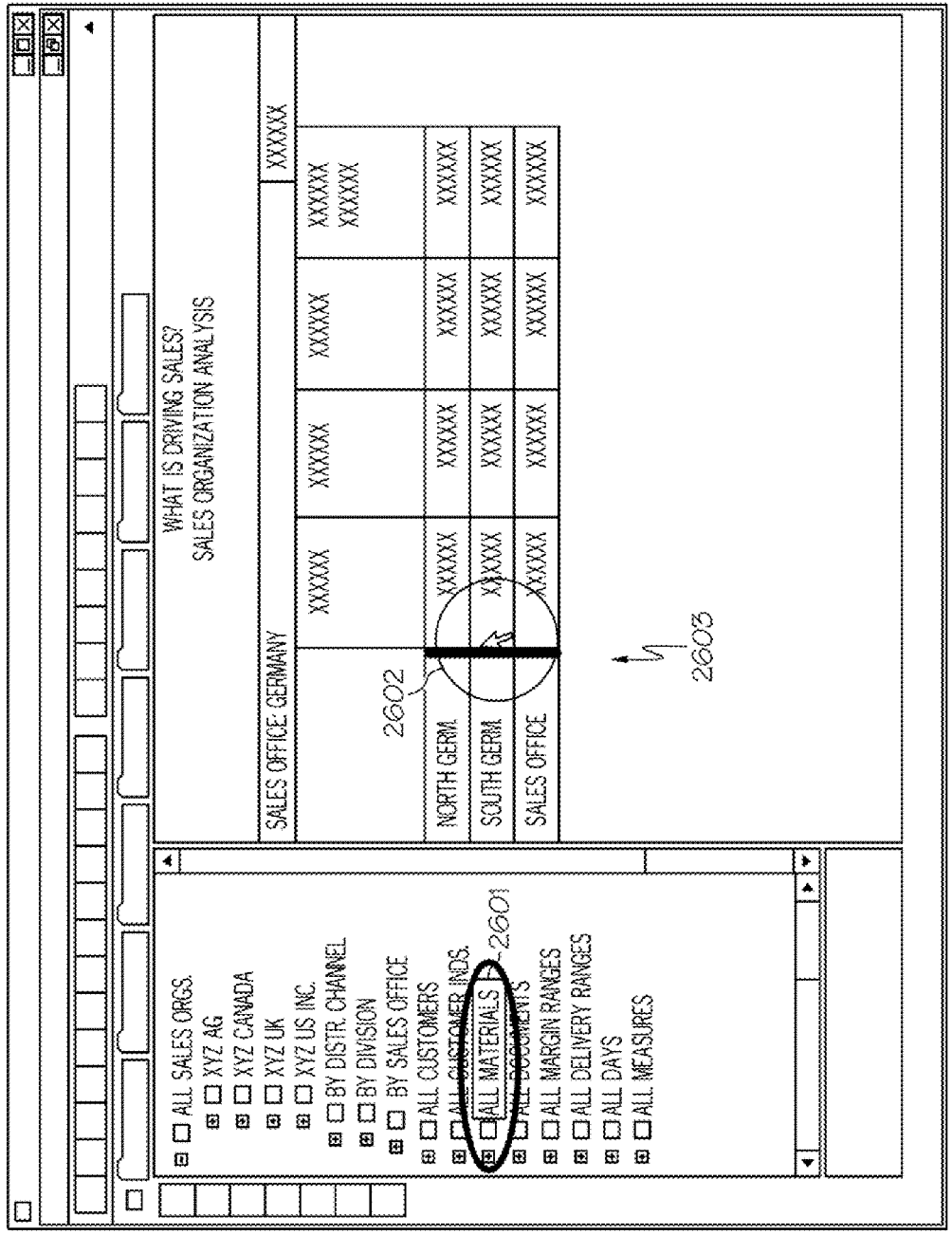
FIG. 24 is a screen shot illustrating another step of generating a report in a data warehouse system.

The data warehouse system 100 also allows for ease of report generation. FIGS. 23 to 24 illustrate the ease with which a series of reports may be generated from any starting point. For example, FIG. 23 shows a screen shot of a report highlighting sales revenues over the past several years By Division (identified by arrow 2501). A user 20 may decide that it would be interesting to view revenues over these periods by sales office within the sales organization. To generate this report, the user 20 would simply move the cursor over the Sales Office folder, shown by circle 2502, then drag and drop it on the Divisions column shown within circled 2503.

Figure 25:
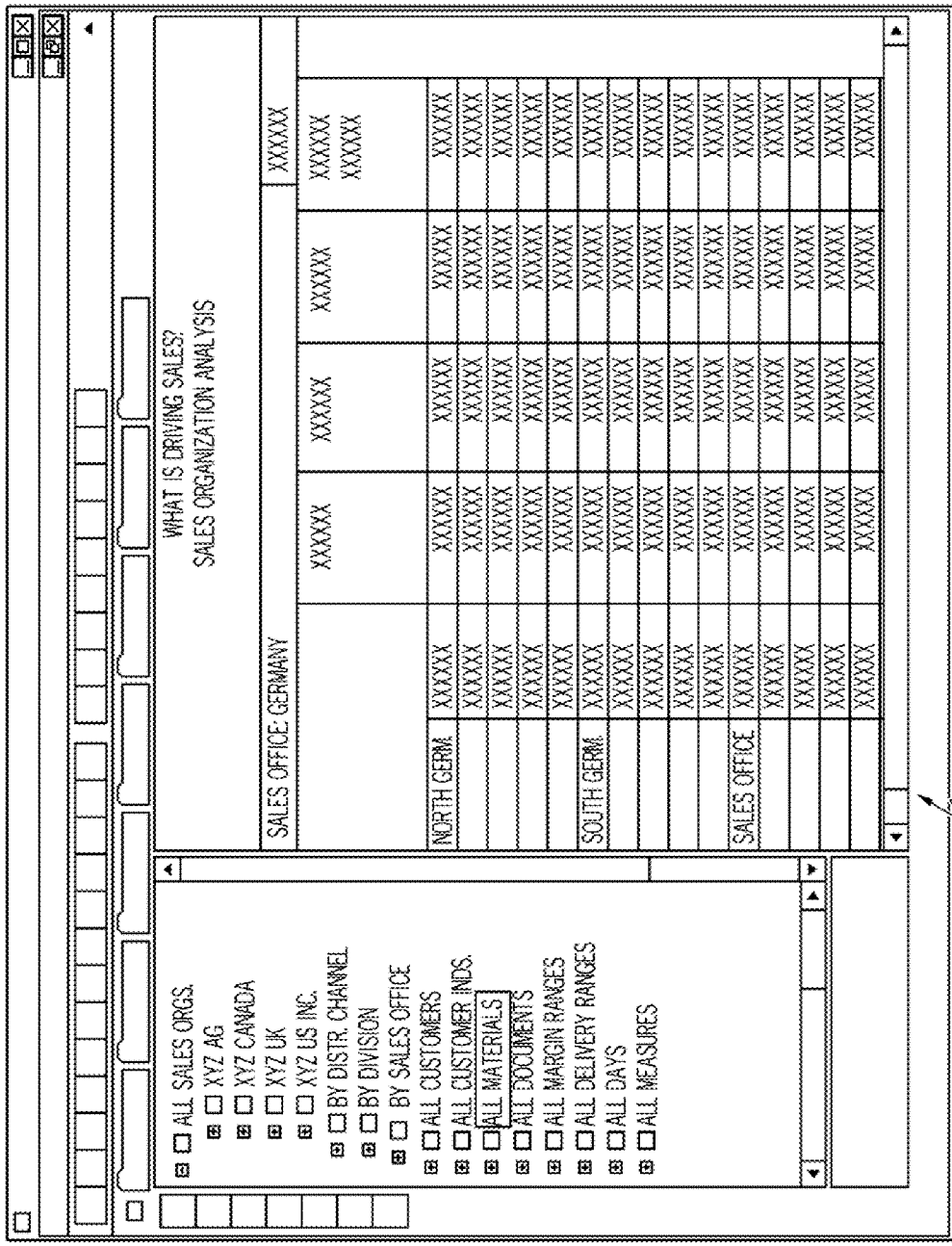
FIG. 25 is a screen shot illustrating another step of generating a report in a data warehouse system.

This single step presents the user with a new report which represents sales revenues over time by sales office within, in this example, the Germany Sales Organization. This analysis may be taken one step further by dragging and dropping the materials file (identified by circle 2601 in FIG. 24) to the nested row position in the report, (identified by thick vertical line 2602 within circle 2603). FIG. 25 shows a screen shot of the result: a new report, identified by arrow 2701, highlighting how revenues are distributed by material groups across sales offices within, in this example, the German sales organization.

Thus, with three clicks, a user 20 is able to view three reports, each of which offer sales related information. Similarly, each of these reports are only clicks away from more varied and valuable analysis.

Other components can be added to the data warehouse system 100 environment.

Methodology for Creating the Data Warehouse System

Creating and implementing a successful traditional integrated data warehouse involves a lengthy series of complex steps and activities, and requires expertise in numerous highly specialized areas.

Despite the substantial hurdles, some information technology (IT) departments elect to build data warehouses themselves. It is not unusual for these projects to end up over budget, miss major milestones, or even fail due to the unanticipated complexity of extracting, transforming, and loading the right data.

The data warehouse system 100 offers an integrated analytic solution, rich and complete enough for multiple organizations to use it, that allows IT departments to provide users with high quality cross-functional business performance management in a short time, freeing up specialized IT resources for immediate impact. The data warehouse solution puts robust decision-making solutions in the hands of users quickly and cost-effectively.

A data warehouse system 100 rich and complete enough to be used by multiple organizations may save users a complete business cycle in deploying and extending their integrated data warehouse solution. A complete business cycle can be spent on establishing end-user needs, data mart design, source system analysis, data mart creation, target system and configuration environment, data mart operation, and business analysis and report. The data warehouse system 100 (including the initial load, user acceptance, and implementation) requires considerably less time to install than conventional solutions creating an integrated data warehouse from scratch.

The development of an effective data warehouse system 100 includes several key components, such as:
  Business decision maker requirements (both functional and cross-functional) defining the type of analysis required based on best practices
  A technical design which ensures consolidated data from across the organization (i.e., ERPs and other data sources), delivering consistent and reliable results
  A strategic architecture which allows for incremental implementation business performance management by functional area
  Enterprise Business Intelligence (EBI) designed to deliver rich analysis and reporting, with the functionality to share information across the organization, as well as across corporate intranets and extranets with key business partners The data warehouse system 100 may be viewed as a series of business analytical solutions designed to deliver key information to an organization's core business functions, including sales, accounts receivable (AR), general ledger (GL), accounts payable (AP), inventory management and procurement. While each application includes rich functional analysis, applications can be used together to join other operational data from across the demand and supply sides of the organization for a coordinated enterprise view of performance.

Each data warehouse system 100 business analytical solution may be built on three pillars:
  Rich business content with predefined BI reports based on best practices as defined through research with industry experts
  Robust technical architecture, ERP source analysis, installation wizards, and production system management
  Conforming design allowing for the combination of multiple applications based on common dimensions (e.g., customers, products, vendors)

The data warehouse system 100 brings together the components used to deliver the important business analysis required for effective decision making. This includes source ERP system 10 analysis, data extraction and transformation, best practices, data architecture and EBI.

Before attempting to build an integrated data warehouse, IT departments should fully assess the obstacles and risks involved. An integrated data warehouse project uses a diverse array of skills and experience. The following six skill-sets are important to a successful implementation.

1. Business Requirements Analyst:
  Acts as liaison between the data warehouse project team and the warehouse's end users. This person identifies and documents the needs of the business and produces a plan for addressing these needs using the data warehouse. The Business Requirements Analyst should have excellent communications skills and an ability to assess business information needs.

2. Subject Matter Experts:
  Typically end users who are familiar with the information and business needs of the internal groups or areas that they represent and who have significant knowledge of the data. These people help standardize on different aspects related to the data and work to resolve issues across business areas.

3. Source Systems Experts:
  Identifies source fields based on the requirements specified for the warehouse. Also identifies the source hurdles that will need to be overcome in order to implement.

4. Data Architect:
  The Data Architect develops and maintains the logical and physical data models of the warehouse, and is able to identify the most valuable data, integrate it, and develop the correlating data model. Also responsible for recommending the optimal system of record, the Data Architect should ensure the company's business needs are incorporated into a technical solution.

5. Data Acquisition Developer and Architect:
  Responsible for extracting data from a source system, performing associated transformations, and making the data available for loading into the data warehouse. The Data Acquisition Developer and Architect should understand extraction and transformation, identify transformations, and define source-to-target mappings.

6. Business Intelligence (BI) Developer:
  Develops solutions that allow end users to easily and consistently access the data warehouse. The BI Developer should understand the business needs, be able to incorporate these into technical solutions, and be skilled in end-user access, reporting, and analysis tools.

Assembling the necessary skills and expertise is the first step of many involved in the process of successfully developing an integrated data warehouse. Building an integrated data warehouse includes the following process.

1. Establishing End-User Needs
   Business requirements analysis
2. Data Mart Design
   Logical data model
   Physical data model
3. Source System Analysis
   Source system analysis and mappings
4. Data Mart Creation
   Data acquisition process design
   Data acquisition construction
5. Target System and Configuration Environment
   Technical architecture design
6. Data Mart Operation
   Maintenance and administration
7. Business Performance Management (which includes Business Analysis and Reporting) (Business Intelligence) and other features described herein
   Data access design
   Data access construction Establishing end user needs through assessing business requirements may take up to 50% of the entire effort of building a warehouse.

An IT department should know its users' business requirements. How will people use information? What questions do they need answered? Do they want high-level views or transaction details? Will they use this information in their offices or on the road? By exploring users' business requirements, and fully understanding how the departments of the enterprise interact, a user will be ready to create the appropriate metrics and business rules an effective analysis and reporting solution requires. Including the content in the warehouse that effectively supports business goals is a key to achieving maximum return on investment.

Designing data marts involves turning the business needs that have been identified into useful data. The process involves designing the data mart logical data model and the subsequent physical data model. Many questions should be answered at this stage: Which end users should be involved during the design sessions? Do data sources exist for some or all of the intended data? Have they chosen an ETL tool? Will the initial design include metadata? If so, will it comprise technical metadata, business metadata, or both?

Once these questions are addressed, to optimize the solution for business performance management, a high-speed star schema data marts that logically arrange data and allows for cross-functional views of business operations should be designed. Simply put, the star schema data marts, based on relational data, use shared, conformed dimensions to achieve a unified view of traditional processes. In effect, a Sales data mart would define "Product X" the same way that the Inventory data mart does. These marts should also be scalable and contain embedded knowledge of the data warehouse applications they will serve.

The next step, source system analysis, should be undertaken by someone who is familiar with the user's ERP, e-commerce, and other source systems as well as any modifications that they have made to them. This expertise is used to identify which data to extract and how to extract it.

The source system expert should understand the unique parameters, fields, hierarchies, and technical approaches that characterize each ERP solution. Many organizations outsource the initial design of their ERP and e-commerce systems to consultants who take their source expertise with them once the contract is completed. This, coupled with the high rate of movement of in-house IT resources leaves companies with a knowledge gap regarding these complex source systems. The solution is typically to retain consulting expertise, which can become prohibitively costly and, depending on a consultant's availability, even delay the solution delivery date.

Once one knows where to look for data in the source systems, their next step is to develop source to target mappings and ensure that they extract, transform, and load ERP and other data into their data marts. Poor source data quality, missing source data, and redundant source data, among other challenges, can complicate this process.

Ultimately, the ETL system should flag errors during the ETL process, minimize computing resources, maximize automation, and incorporate best warehousing practices such as slowly changing dimensions, history preservation, and changed-data capture. Delivering these capabilities will ensure that the process runs as smoothly as possible and that the data generated is accurate.

One should also know how to incrementally add data marts. For instance, if a user adds an inventory mart to their existing sales and finance marts, the user should be careful to avoid creating data definition conflicts between the marts. Synchronization and coordination are key because problems at this stage can sabotage data integrity.

The target system and configuration environment need to be checked. For example, is one using an NT application server to run an ETL code and populating an Oracle database on a Unix platform? Or are they running their ETL code on Unix and populating a Microsoft SQL server on NT? Depending on the platform and database, one will have to vary the way that they install and configure their solution.

Tasks associated with operating, managing, and maintaining the integrated data warehouse include loading data marts from operational systems, troubleshooting the system, restarting failed jobs, and scheduling jobs so that they minimize impact on source systems. Building an integrated data warehouse from scratch requires substantial IT expertise, not to mention substantial time and money.

Figure 26:
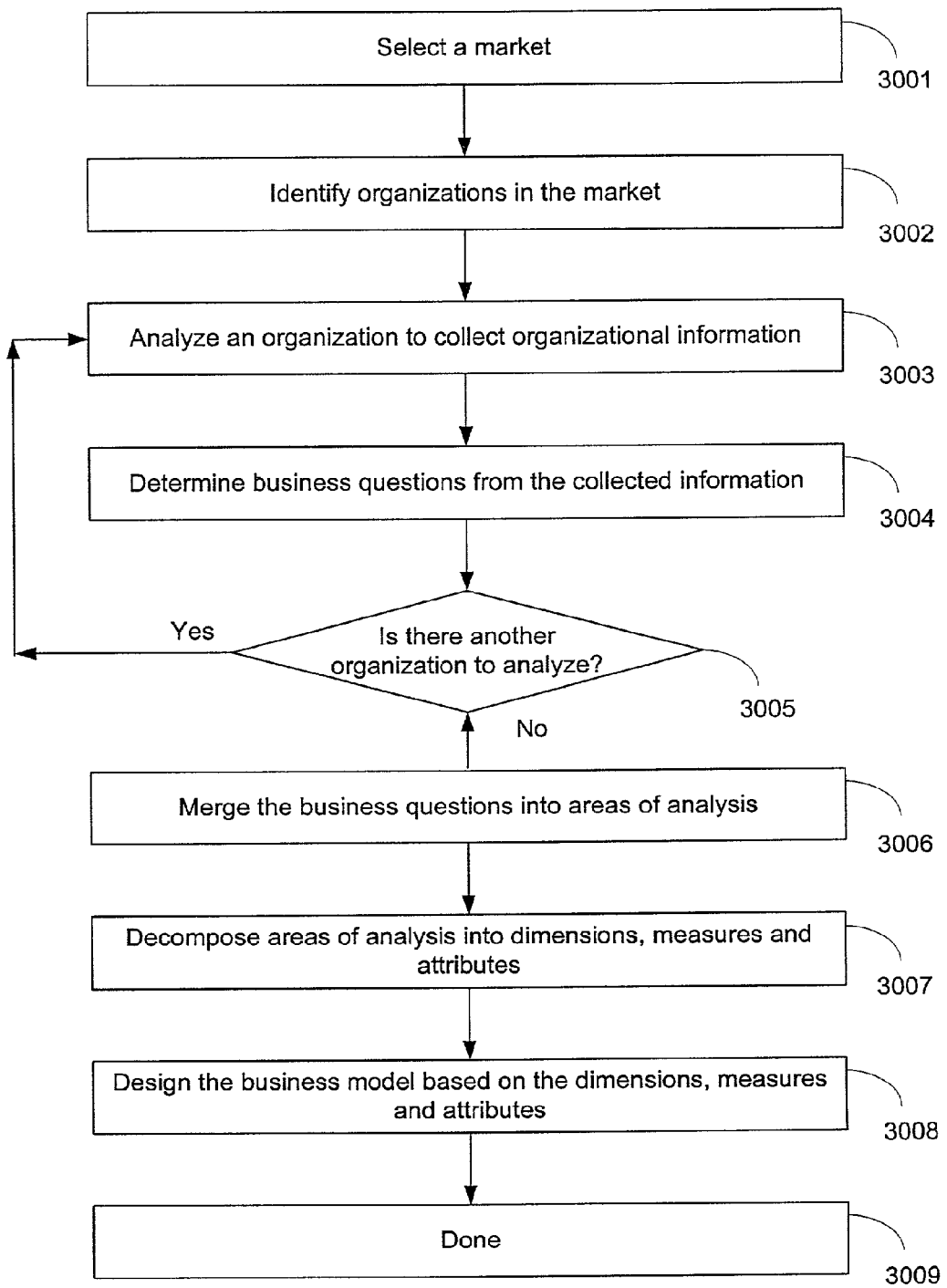
FIG. 26 is s flow chart showing the creation of a business model of a data warehouse system.
Figure 27A:
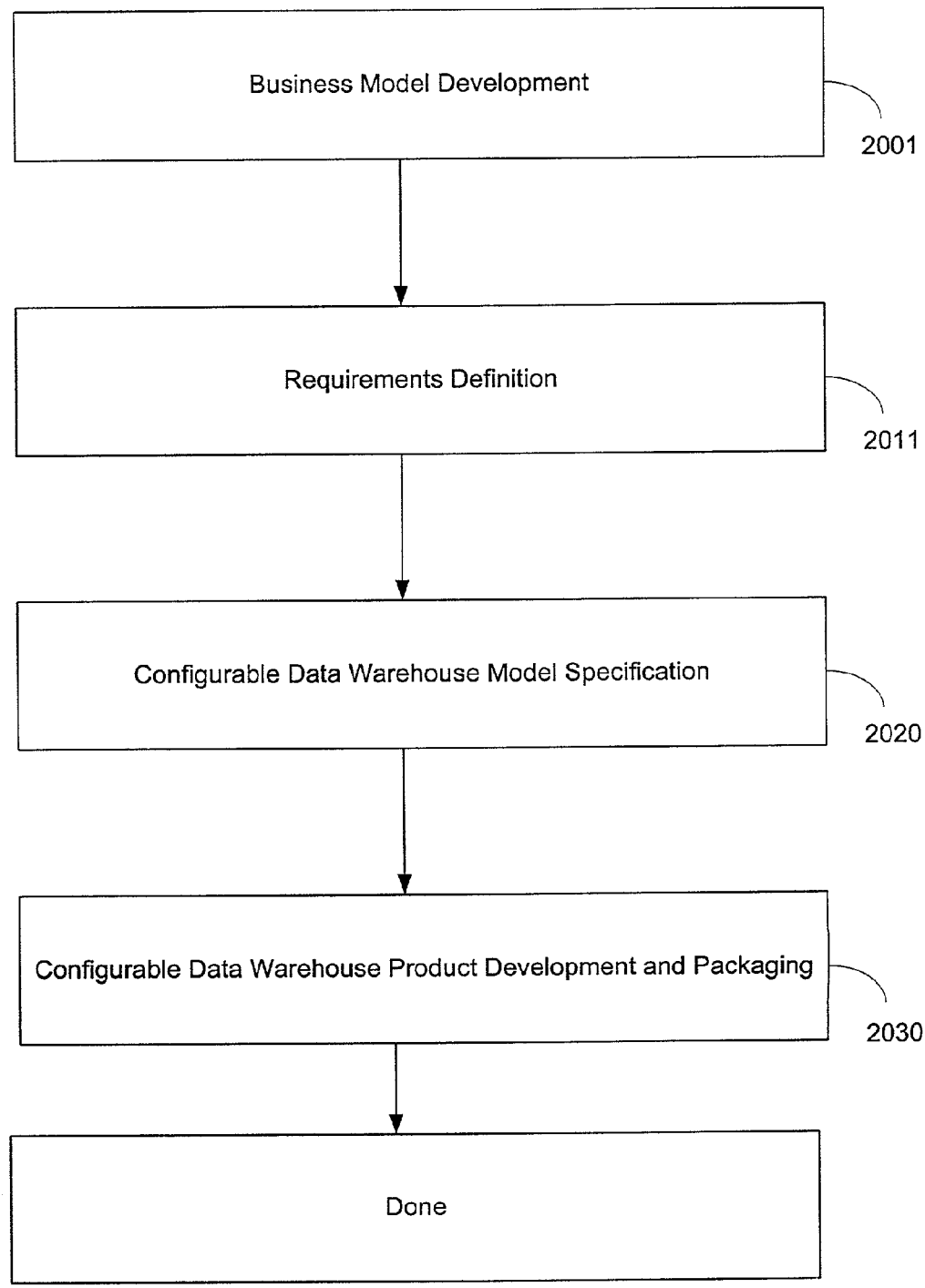
FIGS. 27A to 27E are flow charts showing the creation of a data warehouse system.
Figure 27B:
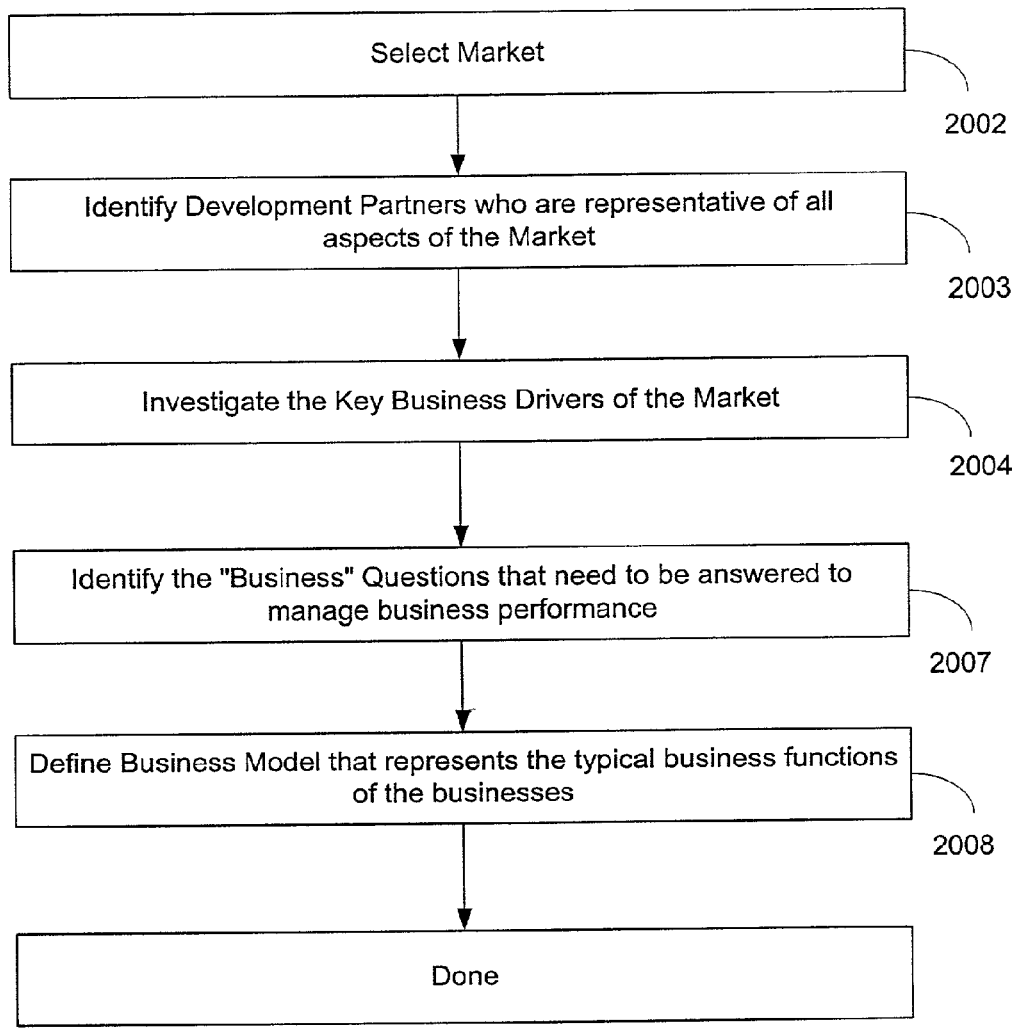
Figure 27C:
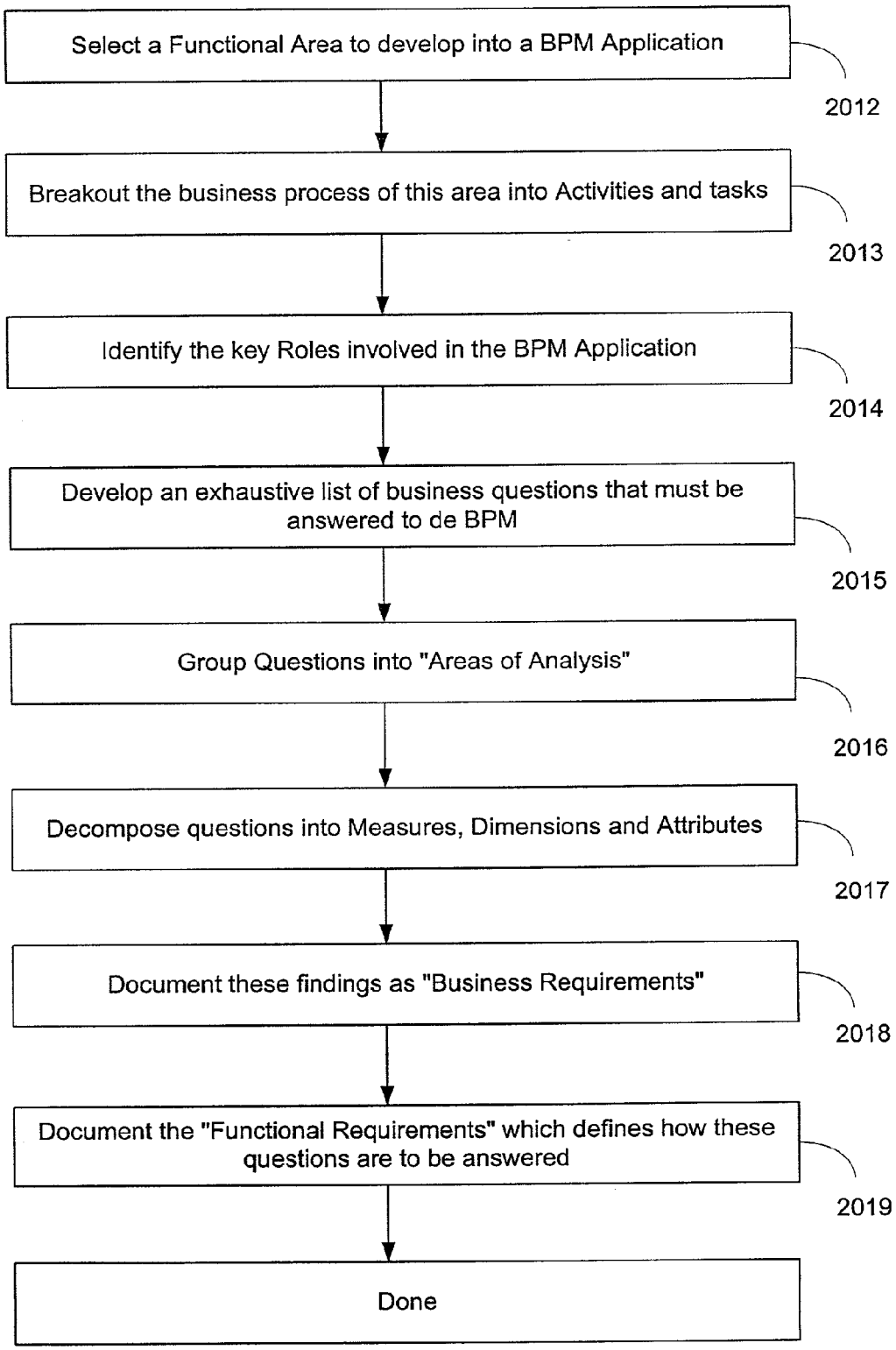
Figure 27D:
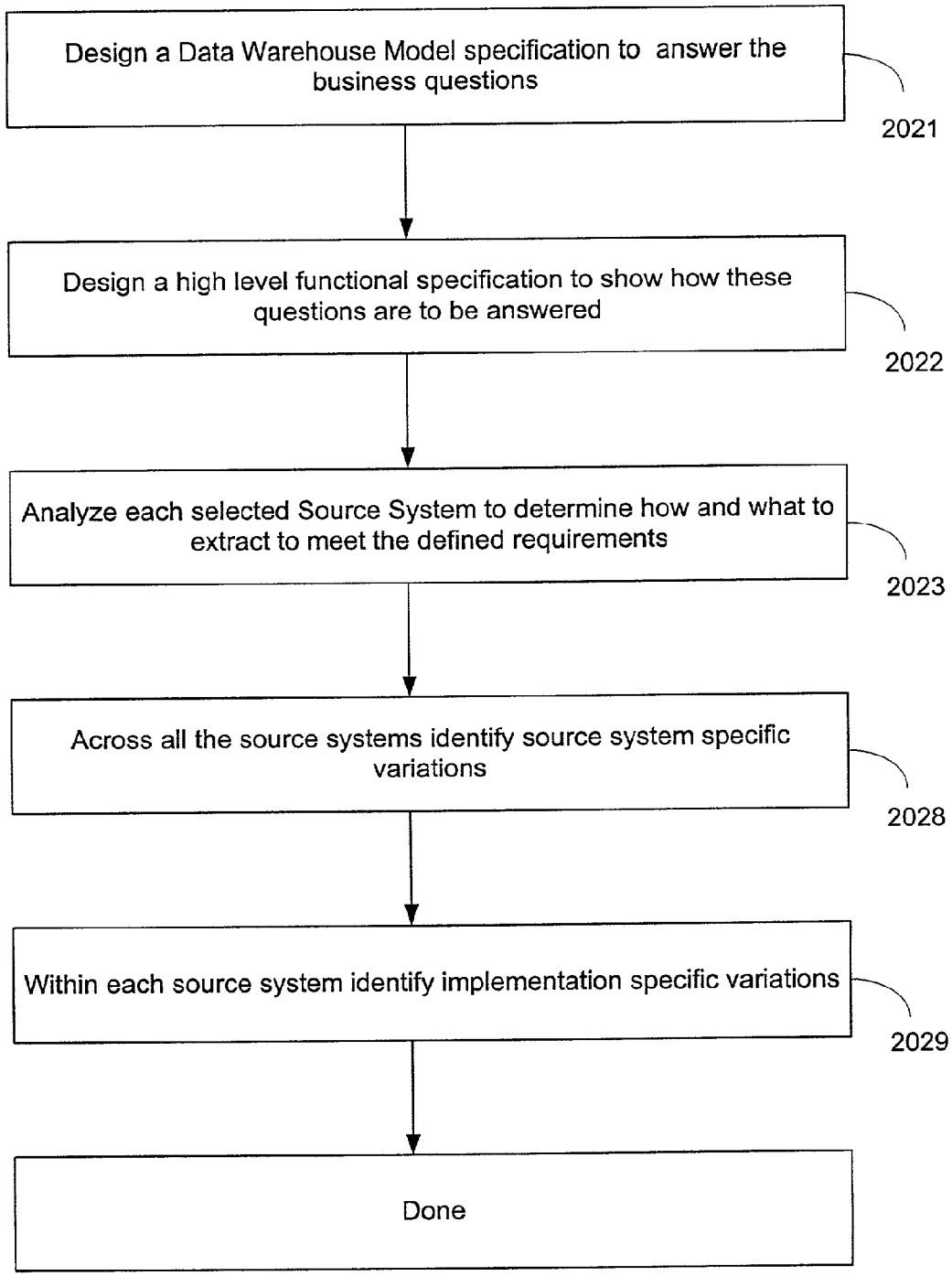
Figure 27E:
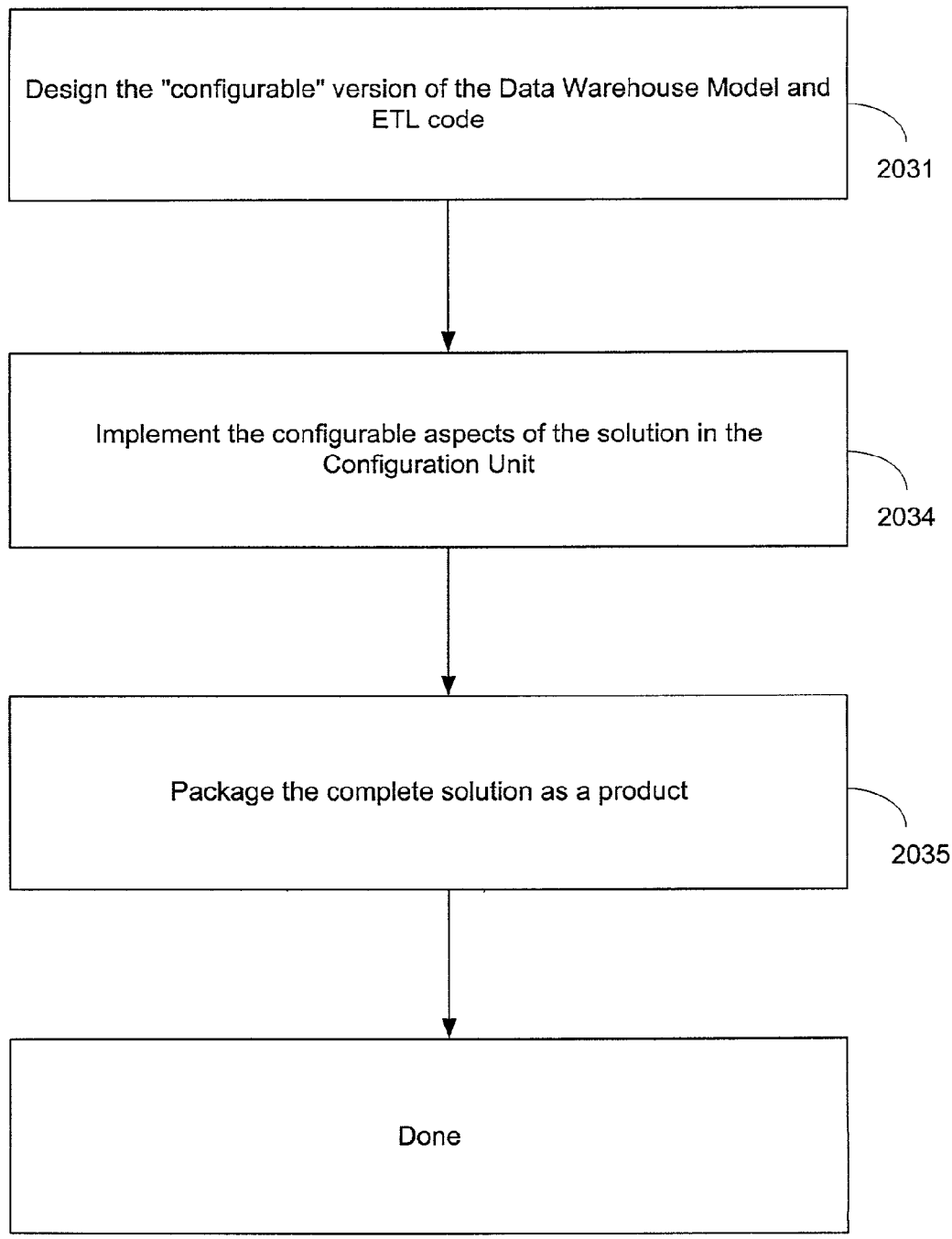

A preferred methodology 3000 for creating a business model 110 in accordance with the present invention will be described referring to FIG. 26. The first step involves selecting a market (3001). In this market, organizations to which the business model 110 will apply are identified (3002). An identified organization in the market is analyzed to collect organizational information (3003). Then business questions are determined based on the collected organizational information (3004). This collection of organizational information and determination of business questions is performed for each identified organization in the selected market (3005). The business questions of the organizations in the selected market are then merged into areas of analysis (3006). The areas of analysis are then decomposed into dimensions, measures and attributes to help answer the business questions (3007). The business model may now be designed based on the dimensions, measures and attributes (3008).

A preferred methodology 2000 for creating a data warehouse system 100 in accordance with the present invention is described referring to FIGS. 27A to 27E. There are four main steps in this methodology: business model development (2001), requirements definition (2011), configurable data warehouse model specification (2020), and configurable data warehouse product development and packaging (2030).

The first two main steps (2001) and (2011) create the business model 110. The first main step is to develop an organizational model (2001). The second main step is to define requirements of an organization (2011). In the development of an organizational model (2001), many organizations in a selected market are analysed to determine their requirement in a business model 110. In the requirements definition (2011), the requirements determined in the first main step (2001) are defined into components of a business model 110, i.e., dimensions 112 and areas of analysis 111.

The first main step establishes the correct framework for analyzing, grouping and managing business performance measurements. This framework is responsive to a "horizontal" view of the industries of interest. The first step in developing an organizational model is to select a market (2002). The selected market will help to define the set of characteristics that will determine the types of organizations to which the business model 110 will apply, i.e., define the target sectors and industries. The next step is to identify development partners who are representative of aspects of the selected market (2003). Development partners include end user companies, industry experts, and related professional associations and/or organizations.

The next step is to investigate the key business drivers of the selected market (2004). This step may be broken down into investigating the corporate imperatives and investigating best business practices of organizations in the selected market. Identifying the key business drivers and best business practices defines the highest level of the "metric" framework. This process provides focus and scope to the set of measures that are necessary to the successful data warehouse system solution.

The next step is to identify the "big" questions (i.e., business questions) that should be answered to manage the business performance of organizations in the selected market (2007). This establishes the high level "areas of analysis" within the business model 110. An area of analysis 203 can represent the set of metrics required to answer one or more business questions.

The next step is to define an organizational model that represents the typical business functions of the organizations in the selected market (2008). This step may involve defining the main functions as well as the main business functions of the organizations. This step combines all the findings of the previous steps into a business model 110 that represents the core functional areas 202 typical to a company within the target market industries and sectors.

As has been stated above, once the requirements of the organizations in the selected market have been determined (2001), the requirements may be defined into components of a business model 110. Each functional area of the organizations, determined in the organizational model development (2001) should be developed into a data warehouse system 100 application. The first step in the requirements definition is to select a functional area to develop into a data warehouse system 100 application (2012). The business process of the selected area may be divided into activities and tasks (2013). The decomposition of the functional area 202 is used to understand the workflow, business process and roles that are to be measured and managed in a data warehouse system 100. Then key roles involved in the data warehouse system 100 application should be identified (2014). Next, a list of business questions to be answered during business performance management may be developed (2015). Steps (2012) to (2015) are repeated for each functional area determined in the first main step (2001). The set of business questions represents the questions that should be answered to determine if the objectives and goals of performance (typically established in the corporate imperatives) are being met. Each question should be stated according to a standard specification. A question should contain one and only one metric, and may contain one or more dimensions, and attributes.

The business questions determined in step (2015) may now be grouped into areas of analysis 111 (2016). The business questions (often hundreds) are grouped into their related area of analysis 203. The areas of analysis 203 were defined during the creation of the business model 110. Grouping business questions this way can be used to verify the business model 110 and establish the corresponding data model 120 parameters. The business questions may also be decomposed into measures, dimensions and attributes (2017) and documented as business requirements (2018). Finally, functional requirements which define how the questions are to be answered may be documented (2019). Documenting the functional requirements includes the identification of configuration options necessary to support multiple organizations.

Referring back to FIG. 10, the functional areas determined in step (2001) are denoted as $A_1$ to $A_y$. The dimensions determined in step (2017) are denoted as $D_1$ to $Dn$. Multiple areas of analysis determined in step (2016) are included in the functional areas $A_1$ to $A_y$. Multiple measures and attributes determined in step (2017) are also included in the functional areas $A_1$ to $A_y$. The connecting lines 390 show which dimensions 112 are used with each functional area 111 to answer the business questions determined in step (2015). Finally, the boxes outlining the different organizations show which dimensions are functional areas are needed by a particular organization.

The creation of the business model 110 was the first two steps in the methodology of the development of the data warehouse system 100. Once the business model 110 has been created, a data model 120 may be created to implement the business model 110. Moreover, the data model 120 may be configurable and joined to a data warehouse system 100.

The third main step in the development of a data warehouse system 100 is to create a configurable data warehouse model specification (2020). In this main step, a data warehouse model specification is designed (2021) to answer the business questions determined in step (2015). A high level functional specification may also be designed to show how these business questions are to be answered (2022). The next step is to analyze selected source systems 10 to determine how and what to extract to meet the defined requirements (2023) for: business concepts, business processes, data entities, and data life cycle information. The source system analysis step is used to identify the configuration options used to support the possible implementation specific variations of multiple organizations. Then source system 10 specific variations should be identified for each source system 10 (2028). Finally, implementation specific various should be identified within each source system 10 (2029).

The last main step in the development of a data warehouse system 100 takes all the information and analysis performed thus far and develops a product. This last main step involves the configurable data warehouse product development and packaging (2030). This first step in this last main step is to design the configurable version of the data model 120 and connectors 140 (i.e., ETL code) (2031). This involves designing the configurable target elements (i.e., the fact tables 121 and dimension tables 122) and designing the configurable extraction code used by the ETL. Next, the configurable aspects of the solution are implemented in the configuration unit 135 (2034). Finally, the complete solution may be packaged as a product (2035). This last step results in the specification for the configuration unit 135 which enables the selection of the various configure options in the data model 120 and the connectors 140.

Further Information Regarding an Example of an Embodiment of a Data Warehouse System 100

Dimensions

The following is a listing of dimensions which may be used in a data warehouse system 100:

ACCOUNT CATEGORY PARTY
ACCOUNTING DOCUMENT CLASS
ALL TIME
AP ACTIVITY DETAIL
AP ACTIVITY DOCUMENT
AP DAILY ACTIVITY SUMMARY
AP INVOICE SUMMARY
AP MONTHLY ACCOUNT SUMMARY
AP MONTHLY ACTIVITY SUMMARY
AP PAYMENT SUMMARY
AR ACTIVITY DETAIL
AR ACTIVITY DOCUMENT
AR DAILY ACTIVITY SUMMARY
AR INVOICE SUMMARY
AR MONTHLY ACCOUNT SUMMARY
AR MONTHLY ACTIVITY SUMMARY
AR PAYMENT SUMMARY
BATCH
BUDGET VERSION
BUSINESS AREA
CHART OF ACCOUNT
COMMITMENT ACTIVITY DETAIL
COMMITMENT ACTIVITY DOCUMENT
COMPANY CONSOLIDATION
CONTRACT ACTIVITY DETAIL
CONTRACT ACTIVITY DOCUMENT
CONTRACT DOCUMENT SUMMARY
CONTROLLING COST OBJECT
CONTROLLING COST OBJECT GROUP MEMBER
COST ACCOUNT ACTUAL
COST ACCOUNT ACTUAL DOCUMENT
COST ACCOUNT PLAN ITEM
COST ACCOUNT PLAN ITEM HEADER
COST ACCOUNT PLAN VERSION
COST CENTER
COST CLASS
COST ELEMENT
COST ELEMENT GROUP MEMBER
COSTING GROUP
COSTING PROJECT
CUSTOMER
CUSTOMER DEMOGRAPHIC
EMPLOYEE
EURO CURRENCY RATE
FINANCIAL CURRENCY CONVERSION
FISCAL
FLEXIDIM
GL ACTIVITY DETAIL
GL ACTIVITY DOCUMENT
GL BALANCE
GL BUDGET
MATERIAL
MATERIAL MOVEMENT
MATERIAL MOVEMENT DOCUMENT
MATERIAL MOVEMENT DOCUMENT CLASS
MATERIAL MOVEMENT DOCUMENT SERIAL NUMBER
MATERIAL RESERVATION
MATERIAL STORAGE
ORGANIZATION
PHYSICAL INVENTORY
PLANT
PROCUREMENT ACTIVITY PERIODIC SUMMARY
PROCUREMENT DOCUMENT CLASS
PROCUREMENT STATUS
PROFIT CENTER
PROMOTION
PURCHASE ORDER ACTIVITY DETAIL
PURCHASE ORDER ACTIVITY DOCUMENT
PURCHASING ORGANIZATION GROUP
QUOTATION ACTIVITY DETAIL
QUOTATION ACTIVITY DOCUMENT
RELEASE STRATEGY
REQUISITION ACTIVITY DETAIL
REQUISITION ACTIVITY DOCUMENT
SALES ACTIVITY PERIODIC SUMMARY
SALES BILLING
SALES BILLING DOCUMENT
SALES CONTRACT
SALES CONTRACT DOCUMENT
SALES DISTRIBUTION
SALES DISTRIBUTION DOCUMENT
SALES DOCUMENT CLASS
SALES ORDER
SALES ORDER DOCUMENT
SALES ORGANIZATION
SALES STATUS
SHIPPING POINT
STOCK CLASS
STOCK LEVEL DAY
STOCK LEVEL MONTH
STOCK LEVEL WEEK
STOCK OPENING BALANCE
STOCK OVERVIEW
STOCK USAGE FORECAST
STOCK USAGE FORECAST VERSION
STOCKOUT
STORAGE BIN
TIME
UNIT OF MEASURE
UNIT OF MEASURE CONVERSION
USER CATEGORY
VALUATION
VENDOR
VENDOR PROFILE
WORK ORDER

Functional Areas 203, Areas of Analysis 202, and Measures 111

Referring back to FIG. 16 and FIGS. 17A to 17AE, the following is a listing of areas of analysis 202 and their measures 111 which may be used in a data warehouse system 100:

Sales

The sales functional area 1703 data model component may include Sales Distribution Detail 1722, Sales Billing Detail 1723, and Sales Order Detail 1724 data structures. The sales functional area 1703 data model component may also include Slaes Contract Detail and Sales Activity Summary data structures.

The Sales Distribution Detail 1722 data structure may comprise:

Actual Delivered Base Unit Quantity
Actual Delivered Sale Unit Quantity
Company Code
Actual Goods Issue Date Sid
Changed Date
Complete Delivery Indicator Created Date
Delivered Date Sid
Distribution Channel Code
Document Currency Code
Group To Document Currency Conversion Rt
Document Currency Extended Cost Amount
Document Currency Extended Net Price Amt
Document Currency Extended Net Value Amt
Document Item Number
Document Number
Document Type Code
Group Currency Code
Group Currency Extended Net Price Amount
Group Currency Extended Net Value Amount
Loaded Date Sid
Local Currency Code
Group to Local Currency Conversion Rate
Local Currency Extended Net Price Amount
Local Currency Extended Net Value Amount
Next Planned Shipping Date Sid
Order Combination Indicator
Planned Goods Issue Date Sid
Priority Delivery Code
Requested Delivery Date Sid
Scheduled Transportation Date Sid The Sales Billing Detail 1723 data structure may comprise:
Adjustment Identifier
Changed Date
Created Date
Customer Transaction Line Number
Customer Transaction Number
Document Currency Code
Group to Document Currency Exchange Rate
Document Currency Extended Cost Amount
Document Currency Extended Price Amount
Document Currency Cash Discount Amount
Document Currency Freight Amount
Document Currency Tax Amount
Document Item Number
Document Number
Document Type Code
Group Currency Code
Group Currency Discount Amount
Group Currency Extended Price Amount
Group Currency Cash Discount Amount
Group Currency Freight Amount
Group Currency Profit Margin Amount
Group Currency Tax Amount
Local Currency Code
Group to Local Currency Exchange Rate
Local Currency Extended Price Amount
Local Currency Cash Discount Amount
Local Currency Freight Amount
Local Currency Tax Amount The Sales Order Detail 1724 data structure may comprise:
Changed Date
Created Date
Document Currency Code
Group To Document Currency Conversion Rt
Document Currency Discount Amount
Document Currency Extended Cost Amount
Document Currency Extended Price Amount
Document Currency Profit Margin Amount
Document Currency Freight Amount
Document Currency Tax Amount
Document Item Number
Document Number
Document Type Code
Group Currency Code
Group Currency Discount Amount
Group Currency Extended Cost Amount
Group Currency Extended Price Amount
Group Currency Freight Amount
Group Currency Profit Margin Amount
Group Currency Tax Amount
Local Currency Code
Group to Local Currency Conversion Rate
Local to Document Currency Conversion Rt
Local Currency Discount Amount
Local Currency Extended Cost Amount
Local Currency Extended Price Amount
Local Currency Freight Amount
Local Currency Profit Margin Amount

AR

The AR functional area 1705 data model component may include AR Activity Detail 1728, AR Daily Activity Summary 1729, AR Monthly Activity Summary 1730, and AR Monthly Account Summary 1731 data structures. The AR functional area 1705 data model component may also include AR Invoice Summary and AR Payment Summary data structures.

The AR Activity Detail 1728 data structure may comprise:
Debit Multiplier
Credit Multiplier
Local Currency Amount
Local Currency Net Amount
Local Currency Tax Amount
Local Currency Discount Amount
Local Currency Cost Amount
Local Currency Freight Amount
Local Currency Profit Margin Amount
Group Currency Amount
Group Currency Net Amount
Group Currency Tax Amount
Group Currency Discount Amount
Group Currency Cost Amount
Group Currency Freight Amount
Group Currency Profit Margin Amount
Created Date
Changed Date The AR Daily Activity Summary 1729 data structure may comprise:
Daily Open Transaction Count
Daily New Transaction Count
Daily Total Open Item Amount
Daily Total New Item Amount
Daily Total Transaction Amount
Daily Total Gross Sales Revenue Amount
Daily Total Net Sales Revenue Amount
Daily Total Revenue Amount
Daily Average Transaction Amount
Daily Average Gross Sales Revenue Amount
Daily Average Net Sales Revenue Amount
Daily New To Open Amount Ratio
Daily New To Open Count Ratio The AR Monthly Activity Summary 1730 data structure may comprise:
Monthly Open Transaction Count
Monthly New Transaction Count
Monthly Discount Taken Transaction Count
Monthly Discount Refused Transaction Count
Monthly Total Transaction Amount
Monthly Profit Amount Monthly Average Transaction Count
Monthly Average Transaction Amount
Monthly New to Open Transact Count Ratio
Monthly New to Open Transact Amount Ratio
Monthly Average Daily Sales Volume
Monthly Average Collection Period
Monthly Value Past Due Amount
Monthly Trade Discount Cost Amount
Monthly Effect on Bottom Line Amount
Monthly Collection Effectiveness Index
Dollar Weighted Avg Days Outstanding Amt
Dollar Weighted Avg Days Beyond Term Amt
Dollar Weighted Average Days to Pay Amt
Monthly Net Credit Period
Monthly AR Account Balance Amount
Created Date
Changed Date The AR Monthly Account Summary 1731 data structure may comprise:
  Monthly Average Cost To Serve Amount
  Monthly Avg Invoice Payment Day Count
  Monthly Cost to Serve Amount
  Monthly Average Daily Sales Volume
  Monthly Average Collection Period
  Monthly Value Past Due Amount
  Monthly Trade Discount Cost Amount
  Monthly Effect on Bottom Line Amount
  Monthly Average Delinquent Day Count
  Monthly Collection Effectiveness Index
  Dollar Weighted Avg Days Outstanding Amt
  Dollar Weighted Avg Days Beyond Term Amt
  Dollar Weighted Average Days to Pay Amt
  Monthly AR Account Balance Amount
GL The GL functional area 1704 data model component may include GL Activity Detail 1725, GL Balance 1726, and GL Budget 1727 data structures.

The GL Activity Detail 1725 data structure may comprise:
  Local Currency Amount
  Local Currency Credit Amount
  Local Currency Debit Amount
  Local Currency Net Amount
  Group Currency Credit Amount
  Group Currency Debit Amount
  Group Currency Net Amount
  Changed Date
  Created Date The GL Balance 1726 data structure may comprise:
  Changed Date
  Created Date
  Group Currency Close Bal Amount
  Group Currency Period Credit Amount
  Group Currency Period Debit Amount
  Group Currency Period Net Activity Amt
  Group Currency Period Open Bal Amount
  Group Currency Year Open Bal Amount
  Group Currency YTD Credit Amount
  Group Currency YTD Debit Amount
  Group Currency YTD Net Activity Amount
  Local Currency Close Bal Amount
  Local Currency Period Credit Amount
  Local Currency Period Debit Amount
  Local Currency Period Net Activity Amt
  Local Currency Period Open Bal Amount
  Local Currency Year Open Bal Amount
  Local Currency YTD Credit Amount
  Local Currency YTD Debit Amount
  Local Currency YTD Net Activity Amount
  Year End Indicator The GL Budget 1727 data structure may comprise:
  Changed Date
  Created Date
  Group Currency Close Bal Amount
  Group Currency Period Activity Amount
  Group Currency Period Open Bal Amount
  Group Currency Year Open Bal Amount
  Group Currency YTD Activity Amount
  Local Currency Close Bal Amount
  Local Currency Period Activity Amount
  Local Currency Period Open Bal Amount
  Local Currency Year Opening Bal Amount
  Local Currency YTD Activity Amount
AP The AP functional area 1706 data model component may include AP Activity Detail 1732, AP Monthly Activity Summary 1733, AP Monthly Account Summary 1734, and AP Daily Activity Summary 1735 data structures. The AP functional area 1706 data model component may also include AP Invoice Summary and AP Payment Summary data structures.

The AP Activity Detail 1732 data structure may comprise:
  Local Currency Amount
  Local Currency Net Amount
  Local Currency Tax Amount
  Local Currency Discount Taken Amount
  Local Currency Discount Allowed Amount
  Local Currency Freight Amount
  Group Currency Amount
  Group Currency Net Amount
  Group Currency Tax Amount
  Group Currency Discount Taken Amount
  Group Currency Discount Allowed Amount
  Group Currency Freight Amount
  Total Payment Days Count
  Payment Term Day Count
  Payment Discount Day Count
  Created Date
  Changed Date The AP Monthly Activity Summary 1733 data structure may comprise:
  New Transaction Count
  Open Transaction Count
  Discount Taken Transaction Count
  Discount Refused Transaction Count
  New Transaction Amount
  Open Transaction Amount
  Discount Taken Amount
  Discount Available Amount
  Created Date
  Changed Date The AP Monthly Account Summary 1734 data structure may comprise:
  AP Account Balance Amount
  Average Days Past Due Count
  Average Collection Period
  Bad Debt Amount
  Invoice Count
  Invoice Amount
  Payment Count
  Payment Amount
  Adjustment Count
  Adjustment Amount
  Best Possible DPI Ratio
  Bottom Line Effect Amount Payment Effectiveness Index
Cost To Serve Amount
Days of Purchases Instanding Ratio
Net Credit Purchases Amount
Past Due Amount
Trade Discount Profit Amount
Trade Discount Offered Amount
Dollar Weighted Avg Days Beyond Term Amt
Past Due Count
Dollar Weighted Avg Days Outstanding Amt The AP Daily Activity Summary 1735 data structure may comprise:
  Open Transaction Count
  New Transaction Count
  Discount Taken Transaction Count
  Discount Refused Transaction Count
  Discount Taken Amount
  Discount Available Amount
  Open Transaction Amount
  New Transaction Amount
  Total Gross Sales Revenue Amount
  Total Net Sales Revenue Amount
  Total Revenue Amount
  Past Due Amount
  Average Transaction amount
  Average Gross Sales Revenue Amount
  Average Net Sales Revenue Amount Inventory The Inventory functional area 1702 data model component may include Stock Usage Forecast 1713, Physical Inventory 1714, Material Reservation 1715, Stock Overview 1716, and Material Movement 1721 data structures.

The Stock Usage Forecast 1713 data structure may comprise:
  Forecast First Day Date
  Modified Forecast First Day Date
  Forecast Period Number
  Forecast Value
  Corrected Value
  Seasonal Index Value
  Created Date
  Changed Date The Physical Inventory 1714 data structure may comprise:
  Document Number
  Document Item Number
  Inventory Fiscal Year
  Book Stock Level Count
  Book Stock Document Cur Extndd Val Amt
  Book Stock Group Currency Extndd Val Amt
  Book Stock Local Currency Extndd Val Amt
  Physical Inventory Count
  Physical Inventory Grp Cur Extnd Val Amt
  Final Count Indicator
  Absolute Stock Accuracy Percentage
  Relative Stock Accuracy Percentage
  User Name
  Last Count Date Sid The Material Reservation 1715 data structure may comprise:
  Document Number
  Document Item Number
  Reservation Date
  Reserved Quantity
  Reserved Quantity Doc Cur Extndd Val Amt
  Reserved Quantity Grp Cur Extndd Val Amt
  Reserved Quantity Lcl Cur Extndd Val Amt
  Confirmed Quantity
  Withdrawn Quantity
  Confirmed Quantity Grp Cur Extnd Val Amt
  Withdrawn Quantity Grp Cur Extnd Val Amt
  Document Currency Code
  Document Currency Conversion Rate
  Group Currency Code
  Local Currency Code
  Local Currency Conversion Rate
  User Name
  Deletion Indicator
  Final Issue Indicator The Stock Overview 1716 data structure may comprise:
  Calendar Month
  Absolute Stock Accuracy Percentage
  Average Stock Level
  Average Unrestricted Stock Level
  Closing Stock Level
  Closing Unrestricted Stock Level
  Cumulative Usage Quantity
  Forecast Usage Quantity
  Last Used Date
  Maximum Stock Level
  Maximum Unrestricted Stock Level
  Minimum Stock Level
  Minimum Unrestricted Stock Level
  Moving Average Stock Level
  Moving Average Usage Quantity
  Moving Avg unrestricted Stock Level
  Opening Stock Level The Material Movement 1721 data structure may comprise:
  Purchase Order Number
  Purchase Order Item Number
  Document Date
  Expiration Date
  Group Currency Value
  Movement Quantity
  Created Date
  Changed Date Procurement The Procurement functional area 1701 data model component may include Procurement Activity Periodic Summary 1707, Requisition Activity Detail 1708, Quotation Activity Detail 1709, Purchase Order Activity Detail 1710, Contract Activity Detail 1711, and Contract Document Summary 1712 data structures.

The Procurement Activity Periodic Summary 1707 data structure may comprise:
  Open Entered Document Count
  Open Blocked Document Count
  Open Approved Document Count
  Completed Closed Document Count
  Completed Cancelled Document Count
  Total Document Open Days Count
  Remaining Document Dollar Amount
  Total Document Value
  Changed Date
  Created Date The Requisition Activity Detail 1708 data structure may comprise:
  Group To Local Exchange Rate
  On Hold Quantity
  Open Quantity
  Received Quantity
  Relieved Quantity
  Requested Transaction Quantity Group Currency Estimated Unit Price Amt
Group Currency Extended Price Amount
Group Currency Other Expenses Amount
Group Currency Total Landed Cost Amount
Group Currency Tax Amount
Group Currency Duty Amount
Group Currency Freight Amount
Touch Count
Correction Count
Adjustment Count
Created Date
Changed Date The Quotation Activity Detail 1709 data structure may comprise:
Transaction Quantity
On Hold Quantity
Open Quantity
Received Quantity
Relieved Quantity
Group Currency Unit Price Amount
Group Currency Extended Price Amount
Group Currency Other Expenses Amount
Group Currency Total Landed Cost Amount
Group Currency Tax Amount
Group Currency Duty Amount
Group Currency Freight Amount
Group To Local Exchange Rate
Touch Count
Correction Count
Adjustment Count
Created Date
Changed Date The Purchase order Activity Detail 1710 data structure may comprise:
Transaction Quantity
On Hold Quantity
Open Quantity
Received Quantity
Relieved Quantity
Group Currency Unit Price Amount
Group Currency Extended Price Amount
Group Currency Other Expenses Amount
Group Currency Total Landed Cost Amount
Group Currency Tax Amount
Group Currency Duty Amount
Group Currency Freight Amount
Group To Local Exchange Rate
Touch Count
Correction Count
Adjustment Count
Created Date
Changed Date The Contract Activity Detail 1711 data structure may comprise:
Transaction Quantity
On Hold Quantity
Open Quantity
Relieved Quantity
Cumulative Received Quantity
Received Quantity
Group Currency Unit Price Amount
Group Currency Target Commitment Amount
Group To Local Exchange Rate
Touch Count
Correction Count
Adjustment Count
Created Date
Changed Date The Contract Document Summary 1712 data structure may comprise:
Total Contract Dollar Value
Remaining Dollar Value
Created Date
Changed Date Reports The following is a listing of some of the reports and groupings of reports for some functional areas:
Procurement Reporting:
MATERIAL DEMAND ANALYSIS
Internal Customer Profile and Ranking
Material Demand Analysis and Trends
Demand Rationalization
VENDOR PROFILE
Vendor Ranking
Vendor Expenditure Overview
Contract Activity Analysis
Contract Analysis
Vendor—Material Rationalization
Vendor Profiling
OPERATIONAL EFFECTIVENESS
Procurement Activity Overview
Buyer Account Management Status
Buyer Comparisons
Procurement Process Efficiency
Buyer Activity Overview
Contract Usage Analysis
Release Strategies
OPERATIONAL REPORTING
Document Lists
Inventory Reporting:
INVENTORY PERFORMANCE
Stock Level Overview and Comparisons
Stock Level Analysis (Plant, Material)
Detailed Storage Stock Levels
DEMAND ANALYSIS
Stock Usage Overview and Comparisons
Stock Usage Analysis
Detailed List of Usage
MATERIAL TRACKING
Material Movement Overview and Comparisons
Movements Analysis
RESOURCE ACTIVITY
Resource Activity Overview
Activity Comparisons
Plant/Employee Analysis
STOCK ACCURACY
Stock Overview
Stock Comparisons
Stock Analysis
RESERVATIONS
Reservations Overview
Reservations Comparisons
Reservations Analysis
FORECASTS
Stock Forecast Overview and Comparisons
Stock Forecast Analysis
Stock Forecasts Profile
VENDOR ANALYSIS (MOVEMENTS)
Vendor Overview and Comparisons
Vendor Analysis
Vendor Activity Profile
AP Reporting:
AP MANAGEMENT OVERVIEW
Ageing Overview Payments Analysis
Quality of Accounts Receivable
Bad Debt Analysis
VENDOR ACCOUNT MANAGEMENT
Vendor A/P Overview
Vendor Ageing
Top Ten Vendor Activity Report
Overdue Accounts
Vendor Account Overview
Vendor Transaction Summary
Vendor Activity Analysis
Analysis of Adjustments
Vendor Profile Status
VENDOR PAYABLES SCORECARDING
Vendor Cost Analysis
Discount Analysis
OPERATIONAL EFFECTIVENESS
Organizational Overview
Account Management Status
Analyst Activity Overview
Analyst Profile Overview
Analyst Profile Status
Document Flow Report
CASH OUTFLOW MANAGEMENT
Payment Schedule
Cash Outflow Forecasts
GL Reporting:
INCOME STATEMENT ANALYSIS
Income Statement Time Comparisons
Vertical Analysis
Detailed Income Statement
Income Statement Budget Variances
BALANCE SHEET ANALYSIS
Balance Sheet Time Comparisons
Balance Sheet Time Trends
Detailed Balance Sheet
Balance Sheet Budget Variance
FINANCIAL/LEGAL ENTITY ANALYSIS
Company, Profit and Cost Center Comparison of Financial Reports
Company, Profit Center and Cost Center Rankings and Comparisons
Ratio Trends
BUDGET ANALYSIS
Customer Profitability Analysis
Customer Cost Analysis
Discount Analysis
OPERATIONAL REPORTS
Cost Center Analysis
Account Analysis
Trial Balance
General Ledger Detail
KEY FINANCIAL RATIOS
   Multi-dimensional analysis of key financial ratios:
Leverage Ratios including Debt to Asset and Times Interest Earned
Liquidity Ratios including Current, Quick Ratio, Fixed Asset Turnover, Total Asset Turnover
Profitability or Efficiency Ratios including Profit Margin, Inventory Turnover, Return on Assets, Return on Equity
Sales Reporting:
SALES ORDER LIFE CYCLE
Sales Orders Overview and Comparison
Sales Orders Analysis
Sales Order List By Customer
Customer Order Profiles
CUSTOMER BUYING TRENDS
Customer Buying Overview and Comparisons
Trends Analysis
Billings List By Customer
Customer Ranking
SALES/PRODUCT PERFORMANCE
Sales and Product Overview/Comparison
Sales and Product Performance Analysis
Sales Office and Sales Rep Performance Profiles
Product Sales List
Product Performance Profile
SHIPPING CHANNEL TREND/DRIVERS
Shipping Overview and Analysis
Shipping Channel Comparisons
Shipping Performance Overview/Comparisons
Shipping Profile and Document List by Product
CHANNEL PERFORMANCE
Channel Overview and Comparisons
Channel Performance Analysis
Billing List by Channel; Channel Profile
DELIVERY/ON-TIME DELIVERY ANALYSIS
Delivery Effectiveness Overview and Comparisons
Delivery Effectiveness Analysis
Shipping Point Profile
AR Reporting:
AR MANAGEMENT OVERVIEW
Ageing Overview
Collection Analysis
Quality of Accounts Receivable
Bad Debt Analysis
CUSTOMER COLLECTION MANAGEMENT
Customer A/R Overview
Customer Ageing
Top Ten Customer Activity Report
Overdue Accounts
CUSTOMER ACCOUNT MANAGEMENT
Customer Account Overview
Customer Transaction Summary
Customer Activity Analysis
Analysis of Adjustments
Customer Profile Status
CUSTOMER SCORECARDING
Customer Profitability Analysis
Customer Cost Analysis
Discount Analysis
OPERATIONAL EFFECTIVENESS
Organizational Overview
Account Management Status
Analyst Activity Overview
Analyst Profile Overview
Analyst Performance Comparison
Document Flow Report
AR AND SALES ANALYSIS
Accounts Receivable and Sales Related KPIs
Customer AR Sales Overview The data warehouse system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While specific embodiments of the present invention have been described, various modifications and substitutions may be made to such embodiments. Such modifications and substitutions are within the scope of the present invention, and are intended to be covered by the following claims.

The invention claimed is:

1. A data warehouse system for managing performance of organizations, the data warehouse system comprising:
    a database;
    a business model comprising:
        a set of common dimensions representing business reference aspects related to a plurality of organizations; and
        a set of measures representing measurements of business activity aspects applicable to the plurality of organizations, wherein the set of measures is grouped into areas of analysis related to the plurality of organizations; and
    a data model corresponding to the business model, the data model including fact tables and dimension tables, wherein the dimension tables correspond to the set of common dimensions, and wherein the fact tables include the set of measures; and
    a hardware-based processor configured to execute a configuration unit to configure the data model to represent a particular organization and to configure the database according to the configured data model, wherein to configure the data model, the hardware-based processor is configured to:
        determine a subset of dimensions from the set of common dimensions that are related to the particular organization;
        extract the subset of dimensions from the common dimensions such that only dimensions of the set of common dimensions that are related to the particular organization are included in the data model for the particular organization;
        determine a subset of measures of the set of measures that are related to the particular organization; and
        extract the subset of measures from the set of measures such that only measures of the set of measures that are related to the particular organization are included in the data model for the particular organization, and
    wherein the hardware-based processor is further configured to configure the database to conform to the configured data model such that the database includes the dimensions that are related to the particular organization and the measures that are related to the particular organization.

2. The data warehouse system of claim 1, wherein a dimension of the set of common dimensions includes a placeholder settable to reflect at least one of:
    a fiscal pattern of the particular organization;
    a common currency used by the data warehouse data model;
    one or more categories defined by a user, the categories usable to analyze information in the data warehouse data model; and
    one or more multipliers usable by the data warehouse data model.

3. The data warehouse system of claim 1, wherein the configuration unit comprises at least one of:
    a fiscal pattern settor configured to set a placeholder in the data model to reflect a fiscal pattern of the particular organization;
    a currency settor configured to set a placeholder in the data model to reflect a common currency used by the data model;
    a user category settor configured to set a placeholder in the data model to reflect a category defined by a user, the category used to analyze information in the data model; and
    a multiplier settor configured to aggregate amounts loaded into the data model.

4. The data warehouse system of claim 1, further comprising a connector module configured to extract data from at least one of a plurality of data source systems and load the data into the data model, the connector module having configurable parameters for extracting data from a particular one of a plurality of data source systems.

5. The data warehouse system according to claim 4, wherein the particular one of the plurality of data source systems comprises an enterprise resource planning (ERP) system.

6. The data warehouse system of claim 1, further comprising an operational framework for managing the data warehouse system, the operational framework comprising a console for providing user configuration options for configuring the data warehouse system, wherein the configuration unit is provided in the operational framework.

7. The data warehouse system according to claim 1, further comprising a content explorer for generating reports based on the analysis performed by the data warehouse data model.

8. The data warehouse system according to claim 1, wherein the fact tables are grouped into functional areas.

9. The data warehouse system according to claim 1, wherein the dimension tables are connected to the fact tables in a star schema.

10. The data warehouse system according to claim 1, wherein the functional areas are selected from a group consisting of: sales analysis, AR analysis, GL analysis, AP analysis, inventory analysis, and procurement analysis.

11. The data warehouse system according to claim 1, wherein the business model is extendible by including additional areas of analysis.

12. The data warehouse system according to claim 1, wherein the set of measures represents a union of measures used to perform analysis for the plurality of organizations.

13. The data warehouse system according to claim 12, wherein the union of measures comprises a minimum set of measures needed to perform analysis for all of the plurality of organizations.

14. The data warehouse system according to claim 1, wherein the areas of analysis comprise Key Performance Indicator (KPI) or attributes.

15. The data warehouse system according to claim 1, wherein the areas of analysis are grouped into a plurality of functional areas.

16. The data warehouse system according to claim 15, wherein the areas of analysis are configured to jointly use a dimension of the predefined set of shared common dimensions.

17. A method comprising:
    generating, by a processor, a business model comprising:
        a set of common dimensions representing business reference aspects related to a plurality of organizations; and
        a set of measures representing measurements of business activity aspects applicable to the plurality of organizations, wherein the set of measures is grouped into areas of analysis related to the plurality of organizations;

generating, by the processor, a data model corresponding to the business model, the data model including fact tables and dimension tables, wherein the dimension tables correspond the set of common dimensions, and wherein the fact tables include the set of measures; and configuring, by the processor, the data model to represent a particular organization by configuring at least one of:
 a fiscal pattern settor to set a placeholder in the data model to reflect a fiscal pattern of the particular organization;
 a currency settor to set a placeholder in the data model to reflect a common currency used by the data model;
 a user category settor to set a placeholder in the data model to reflect a category defined by a user, the category used to analyze information in the data model; and
 a multiplier settor to aggregate amounts loaded into the data model, wherein configuring the data model comprises:
 determining a subset of dimensions from the set of common dimensions that are related to the particular organization;
 extracting the subset of dimensions from the common dimensions such that only dimensions of the set of common dimensions that are related to the particular organization are included in the data model for the particular organization;
 determining a subset of measures of the set of measures that are related to the particular organization; and
 extracting the subset of measures from the set of measures such that only measures of the set of measures that are related to the particular organization are included in the data model for the particular organization;

the method further comprising configuring a database to conform to the configured data model such that the database includes the dimensions that are related to the particular organization and the measures that are related to the particular organization.

18. The method of claim 17, wherein configuring the data model further comprises providing an operational framework for managing the data warehouse system, the operational framework comprising a console for providing user configuration options for configuring the data warehouse system.

19. The method of claim 17, further comprising executing a connector module to extract data from at least one of a plurality of data source systems and to load the extracted data into the data model, the connector module having configurable parameters for extracting data from a particular one of the plurality of data source systems.

* * * * *